US012707236B2

(12) United States Patent
Xu et al.

(10) Patent No.: US 12,707,236 B2
(45) Date of Patent: Aug. 11, 2026

(54) CHARGING METHOD, APPARATUS, AND SYSTEM

(71) Applicant: Huawei Technologies Co., Ltd., Shenzhen (CN)

(72) Inventors: Yishan Xu, Shanghai (CN); Hualin Zhu, Shanghai (CN); Haoren Zhu, Shanghai (CN); Yu Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 435 days.

(21) Appl. No.: 18/344,051

(22) Filed: Jun. 29, 2023

(65) Prior Publication Data

US 2023/0345212 A1 Oct. 26, 2023

Related U.S. Application Data

(63) Continuation of application No. PCT/CN2021/117836, filed on Sep. 10, 2021.

(30) Foreign Application Priority Data

Dec. 31, 2020 (WO) ................ PCT/CN2020/142373

(51) Int. Cl.
*H04W 4/24* (2024.01)
*H04M 15/00* (2024.01)

(52) U.S. Cl.
CPC ............. *H04W 4/24* (2013.01); *H04M 15/58* (2013.01); *H04M 15/67* (2013.01)

(58) Field of Classification Search
CPC ....... H04W 4/24; H04M 15/58; H04M 15/67; H04M 15/41; H04M 15/44; H04M 15/51; H04M 15/8016; H04M 15/8207; H04M 15/93; H04L 12/1407; H04L 12/14
See application file for complete search history.

(56) References Cited

U.S. PATENT DOCUMENTS

2015/0111532 A1 4/2015 Cai et al.
2020/0118112 A1* 4/2020 Jardany ............ G06K 19/07762
2020/0267786 A1* 8/2020 Qiao ....................... H04W 4/24
2022/0053306 A1* 2/2022 Yang ..................... H04M 15/62
(Continued)

FOREIGN PATENT DOCUMENTS

EP 2953386 A1 12/2015

OTHER PUBLICATIONS

Liu, Xuan, et al. "Receive only necessary: Efficient tag category identification in large-scale RFID systems." IEEE Transactions on Mobile Computing 22.2 (2021): 1157-1169. (Year: 2021).*
(Continued)

*Primary Examiner* — Sharad Rampuria
(74) *Attorney, Agent, or Firm* — Slater Matsil, LLP

(57) ABSTRACT

A first network element or an access network device determines, based on identification information of one or more terminals on which a first operation is performed and type information of the first operation, quantity information of the first operation that is performed, and the first network element sends charging information including the type information and the quantity information to a charging function network element.

20 Claims, 20 Drawing Sheets

(56) References Cited

U.S. PATENT DOCUMENTS

2022/0109759 A1* 4/2022 Bhoria .................... H04W 4/24
2022/0141630 A1* 5/2022 Agarwal ................. H04W 4/24
455/406

OTHER PUBLICATIONS

Lu, Guanlin, Yu Jin, and David HC Du. "Frequency based chunking for data de-duplication." 2010 IEEE International Symposium on Modeling, Analysis and Simulation of Computer and Telecommunication Systems. IEEE, 2010. (Year: 2010).*
3GPP TS 23.502 V15.12.0, (Dec. 2020), "3rd Generation Partnership Project; Technical Specification Group Services and System Aspects; Procedures for the 5G System (5GS); Stage 2 (Release 15)", total 365 pages.
Ji, Haijin et al. "The Accounting System Design based on RFID", Intelligent Computer and Applications vol. 1 No. 4, Dec. 2011, total 2 pages.

* cited by examiner

CHARGING METHOD, APPARATUS, AND SYSTEM

CROSS-REFERENCE TO RELATED APPLICATIONS

This application is a continuation of International Application No. PCT/CN2021/117836, filed on Sep. 10, 2021, which claims priority to International Patent Application No. PCT/CN2020/142373, filed on Dec. 31, 2020. The disclosures of the aforementioned applications are hereby incorporated by reference in their entireties.

TECHNICAL FIELD

This application relates to the communication field, and in particular, to a charging method, an apparatus, and a system.

BACKGROUND

A radio frequency identification (RFID) technology, also referred to as a radio frequency identification technology, is an automatic identification technology in wireless communication. A passive internet of things (Passive IoT) technology is similar to the RFID technology. Both can implement an inventory operation, a read operation, or a write operation on a terminal through radio frequency. The RFID technology is used as an example for description in this application. For example, the terminal is an RFID tag in the RFID technology. The "RFID tag" is briefly referred to as a tag in the following description. When the tag is within readable coverage of a reader, the reader may read data information in the tag, to identify a target and exchange data. In a scenario in which the write operation is used, the reader may further have a write function. The RFID has advantages of easy operation, easy reading, high flexibility, and being dynamic and real-time. The technology is widely used in various fields. Most common application scenarios include, for example, warehouse management, logistics transportation, or fixed asset management. The logistics transportation is used as an example. The RFID technology can help management personnel automatically collect goods information. The management personnel can quickly query the goods information in a system to improve a speed and accuracy of goods handover. If there is an abnormal situation such as goods loss, the management personnel can also learn of and handle the situation immediately. A business or service applying the RFID technology is characterized by small signaling traffic and non-continuous services.

Because signaling traffic transmitted through the RFID or the passive internet of things is small, it is not suitable to charge by collecting statistics on traffic. An RFID or passive internet of things service is non-continuous. Consequently, it is not suitable to charge by collecting statistics on time, nor is it suitable to charge by collecting statistics on traffic and time. In addition, for the RFID or passive internet of things service, network resources occupied by the RFID or passive internet of things service cannot be properly quantified by using a quantity of request messages. Consequently, the RFID also cannot be properly charged by collecting statistics on the quantity of messages.

SUMMARY

This application provides a charging method, to implement proper charging in a network deployment architecture in which RFID converges with cellular, or proper charging in a network deployment architecture in which passive internet of things converges with cellular. To achieve the foregoing objectives, embodiments of this application use the following technical solutions.

According to a first aspect, an embodiment of this application provides a charging method. A first network element obtains charging information. The charging information includes type information and first quantity information. The type information indicates a type of a first operation. The first quantity information indicates a first quantity of one or more terminals on which the first operation is performed. The first network element sends the charging information. According to the foregoing solution, the first network element obtains the type information of the first operation and quantity information of the one or more terminals on which this type of operation is performed. The charging information can properly indicate a resource occupied by the first operation, and charging is performed based on the charging information in a charging process, so that the charging process better matches the first operation, and a charging behavior is more reasonable.

It may be understood that the first quantity herein is an obtained quantity of one or more terminals on which a specific operation is performed that are not repeatedly calculated, or a quantity obtained by deduplicating and integrating repeatedly calculated quantities when terminals on which a specific operation is performed are reported for a plurality of times.

In a possible implementation, that a first network element obtains charging information includes: The first network element receives the type information and second quantity information from a first access network device. The second quantity information indicates a second quantity of one or more terminals on which the first operation is performed in a first set. For example, the first quantity is equal to the second quantity. That is, the first access network device may deduplicate and integrate the terminals on which the first operation is performed in the first set, and report a quantity, namely, the second quantity, of terminals on which the first operation is performed that are not repeatedly calculated in the first set to the first network element. In this way, the first network element may directly determine the received second quantity information as the charging information. According to this implementation, the first network element directly obtains the quantity information, and the first network element does not need to perform deduplication and integration.

In a possible implementation, that a first network element obtains charging information includes: The first network element receives the type information and first identification information from a first access network device, where the first identification information identifies one or more terminals on which the first operation is performed in a first set. The first network element determines the first quantity information based on the first identification information. For example, the first access network device may deduplicate an identifier of the one or more terminals on which the first operation is performed in the first set, and report, to the first network element, an identifier of one or more terminals on which the first operation is performed that are not repeatedly calculated in the first set. In this way, the first network element may determine the quantity information based on the received identification information of the one or more terminals in the first set. According to this implementation, the first network element does not need to perform deduplication and only needs to perform integration.

In a possible implementation, that a first network element obtains charging information includes: The first network element receives the type information and first identification information from a first access network device, where the first identification information identifies one or more terminals on which the first operation is performed in a first set. The first network element receives the type information and second identification information from a second access network device, where the second identification information identifies one or more terminals on which the first operation is performed in a second set. The first network element determines the first quantity information based on the first identification information and the second identification information. For example, the first access network device may deduplicate an identifier of the one or more terminals on which the first operation is performed in the first set, and report, to the first network element, an identifier of one or more terminals on which the first operation is performed that are not repeatedly calculated in the first set. The second access network device may deduplicate an identifier of the one or more terminals on which the first operation is performed in the second set, and report, to the first network element, an identifier of one or more terminals on which the first operation is performed that are not repeatedly calculated in the second set. In this way, the first network element deduplicates a received identifier of the one or more terminals in the first set and a received identifier of the one or more terminals in the second set, to obtain identification information of one or more terminals on which the first operation is performed that are not repeatedly calculated. The first network element may determine the quantity information based on the deduplicated identification information. According to this implementation, the first access network device and the second access network device perform deduplication, and respectively report identification information of non-redundant terminals to the first network element, so that complexity of deduplication by the first network element can be reduced.

In a possible implementation, that a first network element obtains charging information includes: The first network element receives first information and second information, where the first information indicates the type of the first operation and an identifier of the one or more terminals on which the first operation is performed, and the second information indicates the type of the first operation and an identifier of the one or more terminals on which the first operation is performed. The first network element determines the charging information based on the first information and the second information. For example, the first network element receives the first information and the second information from a first access network device. Alternatively, the first network element receives the first information from a first access network device. The first network element receives the second information from a second access network device. The first network element determines the charging information based on the first information and the second information. That is, the first network element performs deduplication based on the identifiers of the terminals in the received first information and second information, to obtain identification information of one or more terminals on which the first operation is performed that are not repeatedly calculated. The first network element may determine the quantity information based on the deduplicated identification information.

In a possible implementation, the first network element supports a charging trigger function. That the first network element sends the charging information includes: The first network element sends the charging information to a charging function network element. That is, the first network element supporting the charging trigger function directly exchanges the charging information with the charging function network element responsible for charging. In this implementation, the charging information is not forwarded by using another network element. This reduces signaling overheads on a network side and reduces changes to another network element.

In another possible implementation, that the first network element sends the charging information includes: The first network element sends the charging information to a network element supporting a charging trigger function. For example, the network element supporting the charging trigger function includes a session management function network element or an access and mobility management function network element. That is, regardless of how the first network element is deployed, the first network element sends obtained charging information to the network element supporting the charging trigger function, and the network element supporting the charging trigger function interacts with the charging function network element to complete charging.

For example, the first network element and a user plane function network element are co-located, and the first network element sends the charging information to the session management function network element supporting the charging trigger function. The first network element (which may also be understood as the user plane function network element) may interact with an access network device by using a user plane channel. In this implementation, the first network element does not need to support the charging trigger function. This further reduces changes to a core network side caused by the addition of a charging function.

For another example, the first network element is independently deployed as a control plane network element, and the first network element sends the obtained charging information to the session management function network element supporting the charging trigger function or the access and mobility management function network element supporting the charging trigger function. For example, the first network element may interact with the session management function network element or the access and mobility management function network element by using a service-based interface. In this implementation, the first network element does not need to support the charging trigger function. This further reduces changes to a core network side caused by the addition of a charging function.

According to a second aspect, an embodiment of this application provides a charging method. An access network device obtains type information and identification information, where the type information indicates a type of a first operation, and the identification information identifies a terminal on which the first operation is performed. The access network device sends a first message to a first network element based on the type information and the identification information. The first message includes the type information and the identification information, and the identification information is used to determine a quantity of the one or more terminals on which the first operation is performed. Alternatively, the first message includes the type information and quantity information determined based on the identification information, and the quantity information indicates a quantity of the one or more terminals on which the first operation is performed. According to the foregoing solution, the first message reported by the access network device is used by the first network element to obtain the type information of the first operation and the quantity information of the one or more terminals on which this type of operation is performed. The charging information can properly indicate a resource occupied by the first operation, and charging is performed in a charging process based on the charging information, so that the charging process better matches the first operation, and a charging behavior is more reasonable.

In a possible implementation, that an access network device obtains type information and identification information includes: The access network device obtains first identification information and second identification information, where the first identification information indicates an identifier of one or more terminals on which the first operation is performed in a first set, and the second identification information indicates an identifier of one or more terminals on which the first operation is performed in a second set. The access network device determines the identification information based on the first identification information and the second identification information. In other words, the access network device deduplicates repeatedly calculated identification information based on the obtained first identification information and the obtained second identification information, determines the identification information not repeatedly calculated, and sends the first message accordingly. According to the foregoing solution, the first message reported by the access network device is used by the first network element to obtain the type information of the first operation and the quantity information of the one or more terminals on which this type of operation is performed, and the first message reported by the access network device does not have redundant information. This reduces signaling overheads.

In a possible implementation, the access network device determines the quantity information based on the type information and the identification information, and sends the first message to the first network element, where the first message includes the type information and the quantity information. In other words, the access network device performs deduplication based on the identification information, removes repeatedly calculated identification information, calculates a quantity of one or more terminals based on the identification information not repeatedly calculated, to obtain the quantity information, and sends the first message accordingly. According to the foregoing solution, the first message reported by the access network device is used by the first network element to obtain the type information of the first operation and the quantity information of the one or more terminals on which this type of operation is performed, and the first message reported by the access network device does not have redundant information. This reduces signaling overheads. Moreover, the first network element does not need to perform deduplication and integration on the first message.

According to a third aspect, an embodiment of this application provides a charging method. A policy control function network element receives a policy and charging control rule request message from a session management function network element, and delivers a policy and charging control rule related to a first operation to the session management function network element. The policy and charging control rule includes a type parameter and a quantity parameter. The type parameter and the quantity parameter indicate the session management function network element to indicate a user plane function network element to report a type of the first operation and a quantity of one or more terminals on which the first operation is performed. For example, the method is applicable to an implementation in which a first network element and the user plane function network element are co-located, and the session management function network element supports a charging trigger function. According to the foregoing solution, use of the policy and charging control rule in the method can help reduce changes to a core network side apparatus caused by the addition of a charging function.

According to a fourth aspect, an embodiment of this application provides a charging method. A session management function network element receives a policy and charging control rule from a policy control function network element. The session management function network element sends a usage reporting rule to a user plane function network element according to the policy and charging control rule. The usage reporting rule indicates the user plane function network element to report a type of a first operation and a quantity of one or more terminals on which the first operation is performed. For example, the session management function network element generates an N4 rule according to the policy and charging control rule sent by the policy control function network element, where the N4 rule includes the usage reporting rule, and the usage reporting rule includes the type of the first operation and the quantity of one or more terminals on which the first operation is performed. The session management function network element sends the N4 rule to the user plane function network element, where the N4 rule indicates the user plane function network element to report the type of the first operation and the quantity of one or more terminals on which the first operation is performed. For example, the method is applicable to an implementation in which a first network element and the user plane function network element are co-located, and the session management function network element supports a charging trigger function. According to the foregoing solution, the first network element may report the usage reporting rule to the session management function network element, where the usage reporting rule includes the type of the first operation and the quantity of one or more terminals on which the first operation is performed. This reduces changes to a core network side apparatus caused by the addition of a charging function.

For example, the first network element in the foregoing several aspects may be a middleware apparatus, the access network device may be a RAN apparatus, and the terminal may be a tag.

According to a fifth aspect, an embodiment of this application provides a charging method. The method may include: A first device obtains charging information. The charging information indicates one or more of identification information of one or more terminals on which a first operation is performed, quantity information of the one or more terminals on which the first operation is performed, operation type information corresponding to the first operation, an accumulated quantity of operation times, an accumulated quantity of operation times that corresponds to the first operation, an operation performing frequency, a frequency for performing the first operation, an amount of signaling exchanged in a process of performing the first operation, and an operation requester that performs the first operation. The first device sends the charging information.

Based on the method according to the fifth aspect, information related to passive or semi-active internet of things is obtained for charging. For example, the charging is performed based on the operation type information, a quantity (a quantity after repeated calculation or deduplication) of one or more terminals on which the operation is performed, the identification information (identification information that may be repeated or is deduplicated) of the one or more terminals on which the operation is performed, the amount of signaling exchanged in the operation process, the operation frequency information, information about the accumulated quantity of operation times, and information about the operation requester (identifying which operation requester is requesting the operation). The charging information is more comprehensive and specific, and the charging is more reasonable and accurate.

In a possible implementation, that a first device obtains charging information includes: The first device obtains the charging information according to a charging rule.

In a possible implementation, the charging rule indicates to obtain the charging information. Alternatively, the charging rule indicates to obtain one or more of the following information: the identification information of the one or more terminals on which the first operation is performed, the quantity information of the one or more terminals on which the first operation is performed, the accumulated quantity of operation times, the accumulated quantity of operation times that corresponds to the first operation, the information about the operation requester, the operation type information, the amount of signaling exchanged in the operation process, the operation performing frequency, the frequency for performing the first operation, and time of obtaining the charging information. Based on this possible design, the charging information is obtained according to the charging rule, and charging is standardized.

In a possible implementation, the identification information of the one or more terminals on which the first operation is performed includes identification information of one or more terminals obtained by deduplicating terminals on which the first operation is repeatedly performed, or identification information of terminals that are not deduplicated. The quantity information of the one or more terminals on which the first operation is performed includes quantity information of one or more terminals obtained by deduplicating terminals on which the first operation is repeatedly performed, or quantity information of terminals that are not deduplicated.

In a possible implementation, that a first device obtains charging information includes: The first device receives charging related information from at least one second device. The first device determines the charging information based on the charging related information of the at least one second device. That the first device determines the charging information based on the charging related information of the at least one second device includes: The first device deduplicates identification information and/or quantity information of terminals on which the first operation is repeatedly performed in the charging related information of the at least one second device, and uses deduplicated charging related information of the at least one second device as the charging information. That is, the first device deduplicates the charging related information reported by the second device to obtain finally required charging information, to avoid repeated calculation performed on the terminals on which the operation is repeatedly performed, thereby deduplicating redundant information, and avoiding repeated charging.

In a possible implementation, the charging related information of the second device is obtained according to a charging rule or is obtained according to charging related information received by the second device and from at least one third device. In this way, the charging related information is flexibly and effectively obtained.

In a possible implementation, the second device is a reader or a use plane device. The third device is a reader. In other words, a device for performing this application is flexibly designed, to expand an application scenario of the charging method in this application.

In a possible implementation, the first device supports a charging trigger function. That the first device sends the charging information includes: The first device sends the charging information to a charging function device. Alternatively, the first device sends the charging information to a charging function device by using a device supporting a charging trigger function, where the device supporting a charging trigger function includes an access network device, a control plane device, or a user plane device.

In a possible implementation, the first device is a terminal, an access network device, a control plane device, or a user plane device. Alternatively, the first device is a reader, a mobility management device, a user plane device, or a session management device. In other words, a device for performing the charging method in this application is flexibly designed, to expand an application scenario of the charging method in this application.

According to a sixth aspect, an embodiment of this application provides a communication apparatus, including a processor. The processor is configured to read a program from a memory and run the program, to implement the method according to any one of the first aspect or the possible implementations thereof (for example, when the communication apparatus is a first network element), to implement the method according to any one of the second aspect or the possible implementations thereof (for example, when the communication apparatus is an access network device), to implement the method according to the third aspect (for example, when the communication apparatus is a policy control function network element), to implement the method according to the fourth aspect (for example, when the communication apparatus is a session management function network element), or to implement the method according to any one of the fifth aspect or the possible implementations of the fifth aspect (for example, when the communication apparatus is a first device).

According to a seventh aspect, an embodiment of this application provides a communication system, including a first network element and an access network device. The first network element may perform the method according to any one of the first aspect or the possible implementations thereof, and the access network device may perform the method according to any one of the second aspect or the possible implementations thereof.

According to an eighth aspect, an embodiment of this application provides a communication system, including a policy control function network element and a session management function network element. The policy control function network element may perform the method according to the third aspect, and the session management function network element may perform the method according to the fourth aspect.

According to a ninth aspect, an embodiment of this application provides a computer program product including instructions. When the computer program product runs on a computer, the computer is enabled to perform the method according to any one of the first aspect or the possible implementations thereof, the method according to any one of the second aspect or the possible implementations thereof, the method according to the implementations of the third aspect, the method according to the implementations of the fourth aspect, or the method according to any one of the fifth aspect or the possible implementations of the fifth aspect.

According to a tenth aspect, an embodiment of this application provides a computer-readable storage medium. The computer-readable storage medium stores instructions. When the instructions run on a computer, a processor is enabled to perform the method according to any one of the first aspect or the possible implementations thereof, the method according to any one of the second aspect or the possible implementations thereof, the method according to the implementations of the third aspect, the method according to the implementations of the fourth aspect, or the method according to any one of the fifth aspect or the possible implementations of the fifth aspect.

DETAILED DESCRIPTION OF ILLUSTRATIVE EMBODIMENTS

Figure 1:
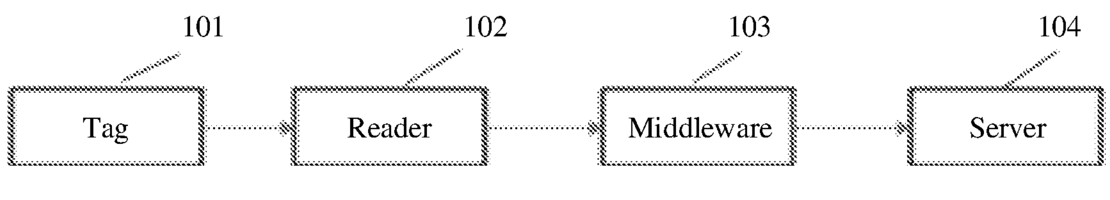
FIG. 1 is a diagram of a structure of an RFID communication system.

A radio frequency identification technology, also referred to as a radio frequency identification technology, is an automatic identification technology in wireless communication. A middleware apparatus is referred to as a middleware below. As shown in FIG. 1, an RFID system architecture includes a tag 101, a reader 102, a middleware 103, and a server 104.

The tag 101 is attached to an object to identify a target object, and the tag stores information about the object. In addition, each tag has a globally unique electronic product code (EPC). Tags are classified into two types: a passive tag and an active tag. There are two cases for a working mode in an RFID technology. In one case, when the tag enters a valid identification range of the reader, the tag receives a radio frequency signal sent by the reader, and uses an induced current to obtain energy to send out information stored in a chip (where the tag is the passive tag). In the other case, the tag actively sends stored information (where the tag is the active tag). The reader receives and decodes the information and then sends the information to the server for data processing.

The reader 102 reads, by using the radio frequency signal and according to an instruction delivered by the server, information stored in a specified tag. If a read operation is to perform, the reader reads data in a storage area of the tag. Optionally, in some scenarios in which the information stored in the tag needs to be rewritten, the reader may further have a write function. In other words, in this case, the reader 102 may also be referred to as a reader/writer. If a write operation is to perform, the reader/writer writes data into the storage area of the tag. For details, refer to the description in FIG. 5. Details are not described again.

The middleware 103 is a functional component separately connected to the reader and the server, and has functions of filtering information and collecting information. In addition, the middleware can reduce a security risk in a case in which the server is attacked.

The server 104 delivers an RFID operation instruction according to a requirement, and obtains a final result after an operation is performed on RFID tags, including but not limited to a type of a read tag, a quantity of tags, and whether a read operation succeeds. The server 104 may be located in a local network. In addition, the server 104 may also be referred to as an application system.

It may be understood that the middleware 103 and the server 104 may be co-located, or the middleware 103 may be independently deployed from the server 104. The two deployment modes do not affect respective functions of the middleware and the server. It should be understood that, when the middleware 103 and the server 104 are co-located, for details, reference may be made to the architecture in FIG. 20 in this application.

Main RFID application scenarios include warehouse management, inventory, logistics, and the like. Processes related to the RFID technology include an inventory process and a read and write process.

Figure 2:
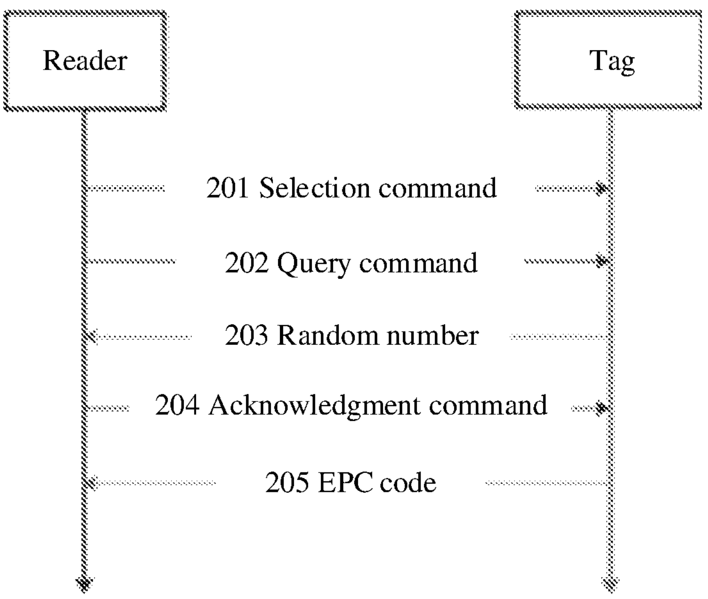
FIG. 2 is a flowchart of an inventory operation on a tag in RFID communication.

The inventory process is used for management of tags. The inventory process for the tags is to inventory existing tags. FIG. 2 shows an inventory process for a tag.

As shown in FIG. 2, in step 201, a reader (the reader 102 in FIG. 1) sends a selection command to a tag (the tag 101 in FIG. 1).

For example, when the reader receives an inventory command sent by a server (or the inventory command may be sent by the server to the reader through a middleware), the selection command is generated, where the selection command carries a tag range (for example, an EPC code in a specific range). After receiving the selection command, the tag determines whether the tag belongs to a tag range indicated by the selection command. If the tag belongs to the indicated tag range, the tag feeds back information after subsequently receiving a query command. If the tag does not belong to the tag range that should be determined, the tag does not need to feed back information after receiving a query command.

In step 202, the reader sends the query command to a tag within the specified range.

In step 203, the tag feeds back a random number to the reader when finding that the tag belongs to the tag range in the selection command.

For example, the tag may feed back a random number to the reader in a contention manner. For example, the random number may be a 16-bit random number (16-bit random number, RN16).

In step 204, the reader sends an acknowledgment command to the tag after receiving the random number sent from the tag, where the command includes the random number received in step 203.

In step 205, the tag feeds back an EPC code of the tag to the reader after receiving the acknowledgment command sent by the reader and verifying that the random number is correct. The foregoing is the inventory process for a tag in a specific range.

Figure 3:
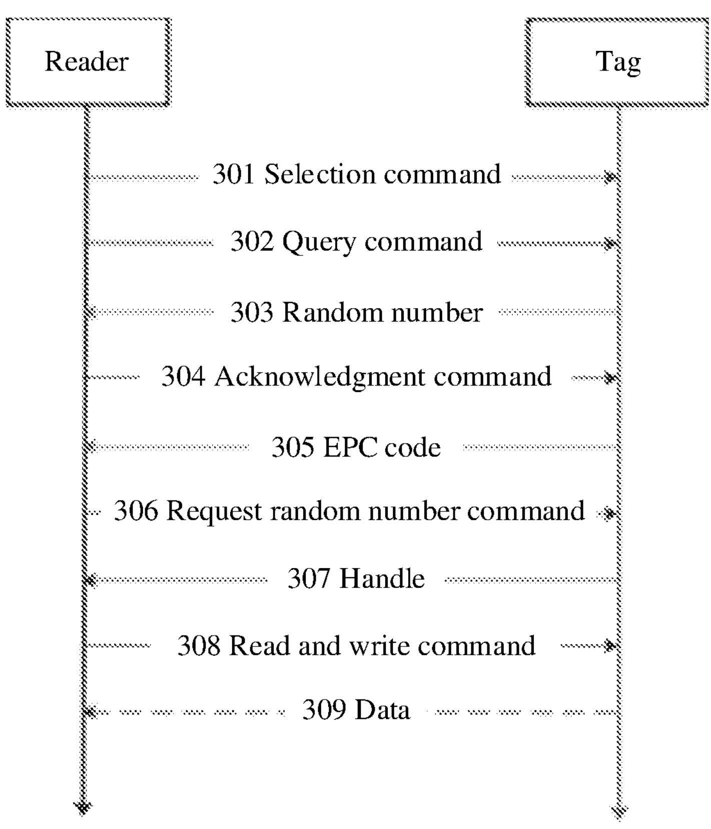
FIG. 3 is a flowchart of a read and write operation on a tag in RFID communication.

FIG. 3 shows a read and write process for a tag. For step 301 to step 305 in the process, refer to descriptions of step 201 to step 205 in FIG. 2. This belongs to an inventory operation process. A difference between step 302 and step 202 in FIG. 2 lies in that a tag for receiving the query command in step 302 is a tag with a specific EPC code. In addition, the read and write process further includes the following steps.

In step 306, a reader sends a request random number command (Req_RN) to the tag, where the request random number command carries a random number, such as RN16, received in step 303.

In step 307, the tag verifies that the random number is correct and sends a handle to the reader. The handle identifies identifiers of different readers. In a subsequent read and write process, both a read command and a write command carry the handle.

In step 308, the reader sends the read command or the write command to the tag, where the read command or the write command carries the handle. If the write command is sent, the write command further carries data to be written into a storage area of the tag.

In step 309, the tag feeds back data in the storage area of the tag and carries the handle in step 307 if the read command is sent in step 308. If the write command is sent in step 308, this step may not be required.

Figure 4:
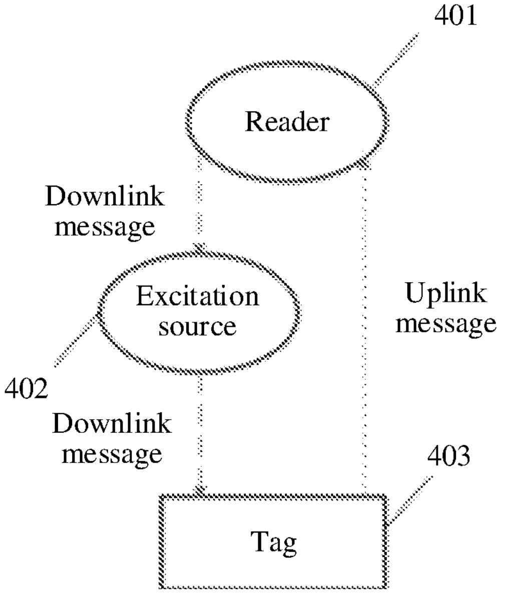
FIG. 4 is a schematic diagram of an architecture in which RFID sending and receiving are separated.

FIG. 4 shows an architecture in which RFID sending and receiving are separated. The reader 102 in the RFID system shown in FIG. 1 may be split into two components: a reader 401 and an excitation source 402. The excitation source 402 may be integrated into user equipment (user equipment, UE). In this architecture, where the scenarios shown in FIG. 2 and FIG. 3 are used as an example, the reader 401 sends a downlink message of a tag to the excitation source 402 by using a dedicated spectrum, and then the excitation source 402 sends the message to the tag 403. The tag 403 directly sends an uplink message to the reader 401 through an RFID air interface. Usually, the farthest communication distance between a reader and a tag is only 10 meters. However, in the architecture shown in FIG. 4, a distance between the reader 401 and the excitation source 402 is increased, so that a range of the covered tag is extended to one hundred meters. This further reduces interference between an uplink and downlink message links on the reader 401 side. In addition, the excitation source 402 does not receive the uplink message compared with the reader that receives both the uplink message and the downlink message. This can further reduce power consumption. In this case, continuous working time of the excitation source 402 is longer than that of a common reader.

Figure 5:
FIG. 5 is a schematic diagram of an architecture of a 5G communication system to which an embodiment of this application is applicable.
Figure 5:
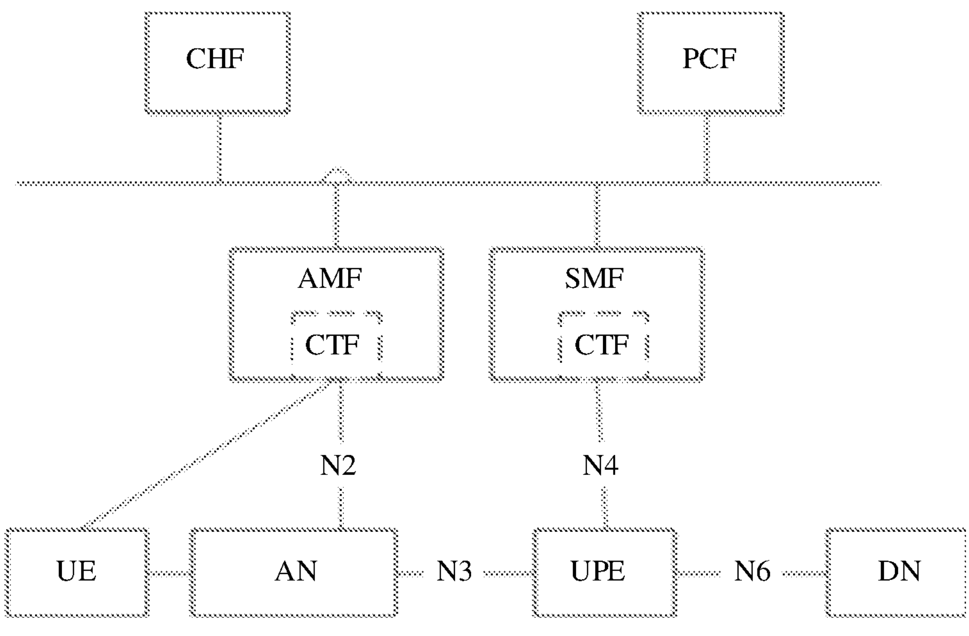

FIG. 5 is a schematic diagram of a network architecture of a 5G system. The network architecture includes user equipment (UE), an access network (AN) device, a core network element, and a data network (DN).

The user equipment in this application is a device with a wireless transceiver function, and may be deployed on land, including indoors or outdoors, handheld, or vehicle-mounted, may further be deployed on a water surface (such as a ship), or may further be deployed in the air (for example, on aircraft, a balloon, or a satellite). The user equipment may also be referred to as a terminal, and may be a mobile phone, a tablet computer (pad), a computer with a wireless transceiver function, a virtual reality (VR) terminal, an augmented reality (AR) terminal, a wireless terminal in industrial control (industrial control), a wireless terminal in self driving, a wireless terminal in remote medical, a wireless terminal in a smart grid (smart grid), a wireless terminal in transportation safety (transportation safety), a wireless terminal in a smart city, a wireless terminal in a smart home, and the like. A tag in this application may exist in an independent form, may be integrated into the foregoing terminal, or may be integrated into a sensor, or the like. A form of the tag is not limited in this application, and the tag may be in any terminal form. When the terminal is a passive or semi-active terminal, the terminal may obtain energy to receive or send data. Energy can be obtained by radio or obtained as solar energy, light energy, wind energy, water energy, heat energy, kinetic energy, and the like. A manner in which the passive or semi-active terminal obtains energy is not limited in this application. The term "tag" and "terminal" in the following may be interchanged, which does not affect substance of this application.

A reader interacts with the tag by using a radio frequency signal or a wireless signal. The reader obtains information stored in a specified tag according to an instruction delivered by a server. If an inventory operation (or may be referred to as a stocktaking operation) is performed, the reader obtains identification information of the tag. The identification information may be a unique identifier of the tag or may be a temporary identifier of the tag. If a read operation is performed, the reader reads data in a storage area of the tag. Optionally, in some scenarios in which the information stored in the tag needs to be rewritten, the reader may further have a write function. If the write operation is performed, the reader writes data into the storage area of the tag. In addition, the reader can further invalidate the tag. After the invalidate operation is performed, the tag becomes invalid and an operation such as the inventory operation, the read operation, or the write operation cannot be performed on the tag. In this application, the reader may be a terminal device, or may be an access network device, a pole station, an eNodeB, a gNodeB, an integrated access and backhaul (integrated access and backhaul, IAB) node, or the like. A form of the reader is not limited in this application.

It should be understood that a name of the reader is not limited in this application. Alternatively, the reader may be named a reader/writer or another name, that is, it may be understood as that titles of the reader/writer and the reader are exchanged. The reader/writer herein has functions related to the reader in this application. For example, the reader/writer has a function of performing the operations (for example, the inventory operation, the read operation, the write operation, or the invalidate operation) described in this application on the terminal (for example, the tag), a function of obtaining charging related information and/or charging information, a function of sending charging information to a CHF, and the like.

The access network device may alternatively be a radio access network (RAN) device. A main function of the RAN device is to control a user to access a mobile communication network through radio. The RAN is a part of a mobile communication system, and implements a wireless access technology. Conceptually, the RAN resides in a device (such as a mobile phone, a computer, or any remote controller) and provides connectivity to a core network thereof. The RAN device includes but is not limited to: a gNodeB (gNB) in 5G, an evolved NodeB (eNB), a radio network controller (RNC), a NodeB (NodeB, NB), a base station controller (BSC), a base transceiver station (base transceiver station, BTS), a home base station (for example, a home evolved NodeB, or a home Node-B, HNB), a baseband unit (BBU), a transmitting and receiving point (TRP), a transmitting point (TP), a mobile switching center, and the like. In addition, a wireless fidelity (Wi-Fi) access point (AP) and the like may be further included. The RAN device may also be referred to as a RAN apparatus, and is briefly referred to as a RAN below.

The core network element may include at least one of the following network elements: a user plane function (UPF) network element, an access and mobility management function (AMF) network element, a session management function (SMF) network element, a policy control function (PCF) network element, and a charging function (CHF) network element. The UPF network element, the SMF network element, the AMF network element, the CHF network element, and the PCF network element may also be respectively referred to as a UPF apparatus, an SMF apparatus, an AMF apparatus, a CHF apparatus, and a PCF apparatus, and are respectively briefly referred to as a UPF, an SMF, an AMF, a CHF, and a PCF.

Core network elements are classified into a control plane network element and a user plane network element. The user plane network element is the UPF, and is mainly responsible for packet data packet forwarding, quality of service (QoS) control, charging information statistics collection, and the like. The charging information may also be referred to as charging data, a charging message, charging content, or the like, and is collectively referred to as charging information in this application. The control plane network element is responsible for service procedure interaction, and delivering a data packet forwarding policy, a QoS control policy, and the like to a user plane. The control plane network element in embodiments of this application mainly includes these network elements: the AMF, the SMF, the PCF, and the CHF. The AMF is mainly responsible for user access and mobility management. The SMF is responsible for managing creation, deletion, and the like of a user protocol data unit (PDU) session, and maintaining a PDU session context and user plane forwarding channel information. The PCF is configured to generate and manage user, session, and QoS flow processing policies. The CHF is responsible for user charging, quota credit, and the like, and further supports convergent online and offline charging. A charging trigger function (CTF) is embedded in a charging-related network element, such as the SMF and the AMF, and collects, in the charging-related network element, charging information related to network resource usage by UE. In actual deployment, network elements may be co-located. For example, the access and mobility management network element may be co-located with the session management network element. The session management network element may be co-located with the user plane network element. When two network elements are co-located, interaction between the two network elements provided in embodiments of this application becomes an internal operation of the co-located network element or may be omitted.

A communication interface between network elements is further marked in the network architecture shown in FIG. 5. Communication interfaces in embodiments of this application include: N2: a communication interface between the access network device and the AMF; N3: a communication interface between the access network device and the UPF, configured to transmit user data; N4: a communication interface between the SMF and the UPF, configured to perform policy configuration and the like on the UPF; and N6: a communication interface between the DN and the UPF. Certainly, the communication interface between the network elements may also have another name. This is not limited in this application.

It should be further understood that the foregoing naming is merely used to distinguish between different functions, and does not represent that these network elements are separate physical devices. Specific forms of the foregoing network elements are not limited in this application. For example, the network elements may be integrated into a same physical device, or may be separately different physical devices. In actual deployment, the network elements or devices may be co-located. For example, the access and mobility management network element may be co-located with the session management network element. The session management network element may be co-located with the user plane network element. When two network elements are co-located, interaction between the two network elements provided in embodiments of this application becomes an internal operation of the co-located network element or may be omitted.

An RFID technology or a passive internet of things technology may converge with a network architecture of a 5G system. If an enterprise uses a conventional RFID technology or passive internet of things technology, a dedicated network system should be deployed. Therefore, the convergence of the RFID technology and a cellular network or the convergence of the passive internet of things technology and a cellular network can reduce deployment costs and operation and maintenance costs of the two systems. In a scenario in which the RFID technology converges with a network architecture of a 5G system, RFID charging is completed by the CHF. After charging is triggered, a network element supporting the CTF sends charging data to a charging function network element by using charging information. The charging function network element stores the charging information and creates a charging data record (charging data record, CDR). After the charging is completed, the charging function network element sends a message corresponding to the charging information to the network element supporting the CTF.

Because signaling traffic transmitted through the RFID or the passive internet of things is small, it is not suitable to charge by collecting statistics on traffic. An RFID or passive internet of things service is non-continuous. Consequently, it is not suitable to charge by collecting statistics on time, nor is it suitable to charge by collecting statistics on traffic and time. In addition, for the RFID or passive internet of things service, network resources occupied by the RFID or passive internet of things service cannot be properly quantified by using a quantity of request messages. Consequently, the RFID also cannot be properly charged by collecting statistics on the quantity of messages.

When an RFID system or a passive internet of things system is integrated into the cellular network, an architecture in which the RFID converges with the cellular is used as an example for description. For the passive internet of things system, refer to the description of the architecture in which the RFID converges with the cellular. Details are not described again subsequently. The reader shown in FIG. 1 or FIG. 4 further converges into the RAN. There may be a plurality of selections for a deployment position of the middleware in the network architecture of the 5G system.

Figure 6:
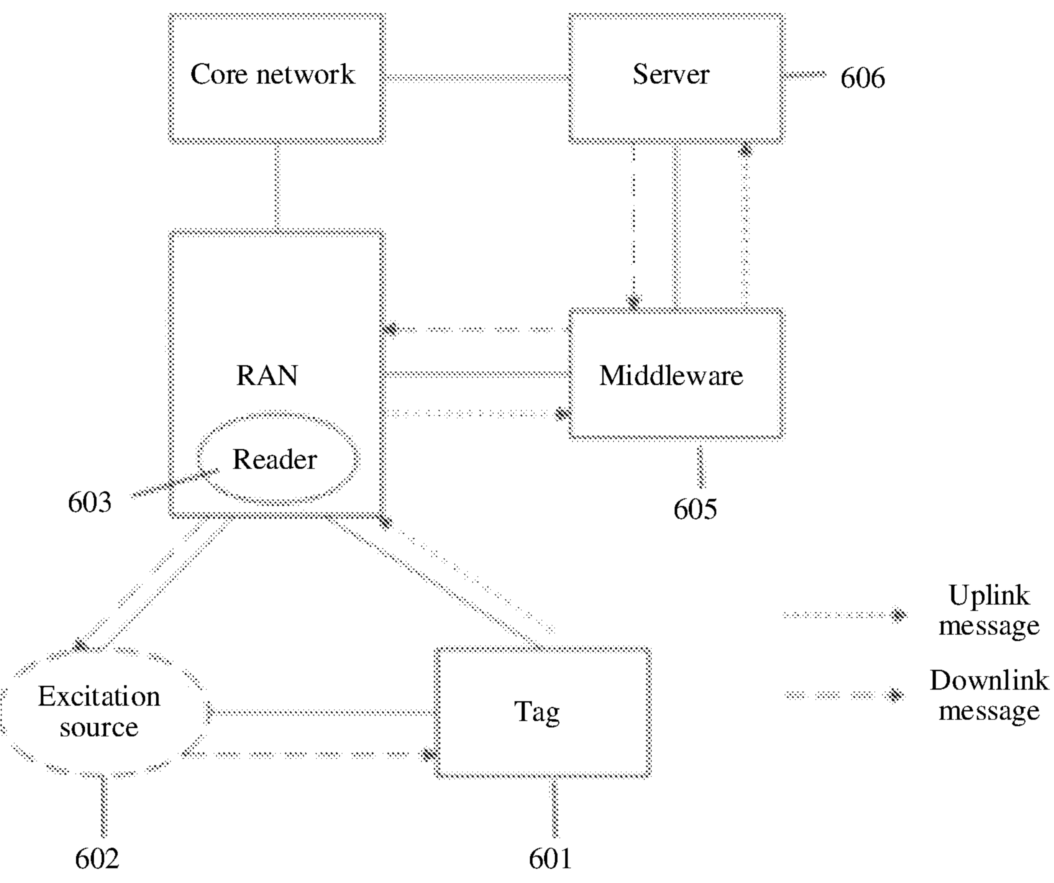
FIG. 6 is a schematic diagram of a network architecture in which RFID converges with cellular to which an embodiment of this application is applicable.

FIG. 6 is a schematic diagram of a network architecture in which RFID converges with cellular to which an embodiment of this application is applicable. In the network architecture shown in FIG. 6, a middleware 605 is separately connected to a RAN and a server, and the middleware is independent of a core network. Optionally, the middleware 605 is connected to a plurality of RANs. The RAN is integrated with a function of a reader 603 (for example, the reader 102 in FIG. 1 or the reader 401 in FIG. 4). For an RFID downlink message, the server 606 sends the downlink message to the middleware 605, and then the middleware 605 sends the downlink message to the RAN (the reader 603). Then, the RAN (the reader 603) sends the downlink message to a tag 601 (where if an excitation source 602 is deployed, the RAN first sends the downlink message to the excitation source 602, and then the excitation source 602 sends the downlink message to the tag 601). For an RFID uplink message, the tag 601 sends the uplink message to the RAN (the reader 603), the RAN sends the uplink message to the middleware, and then the middleware 605 sends the uplink message to the server 606. In this architecture, the core network does not participate in RFID communication.

Figure 7:
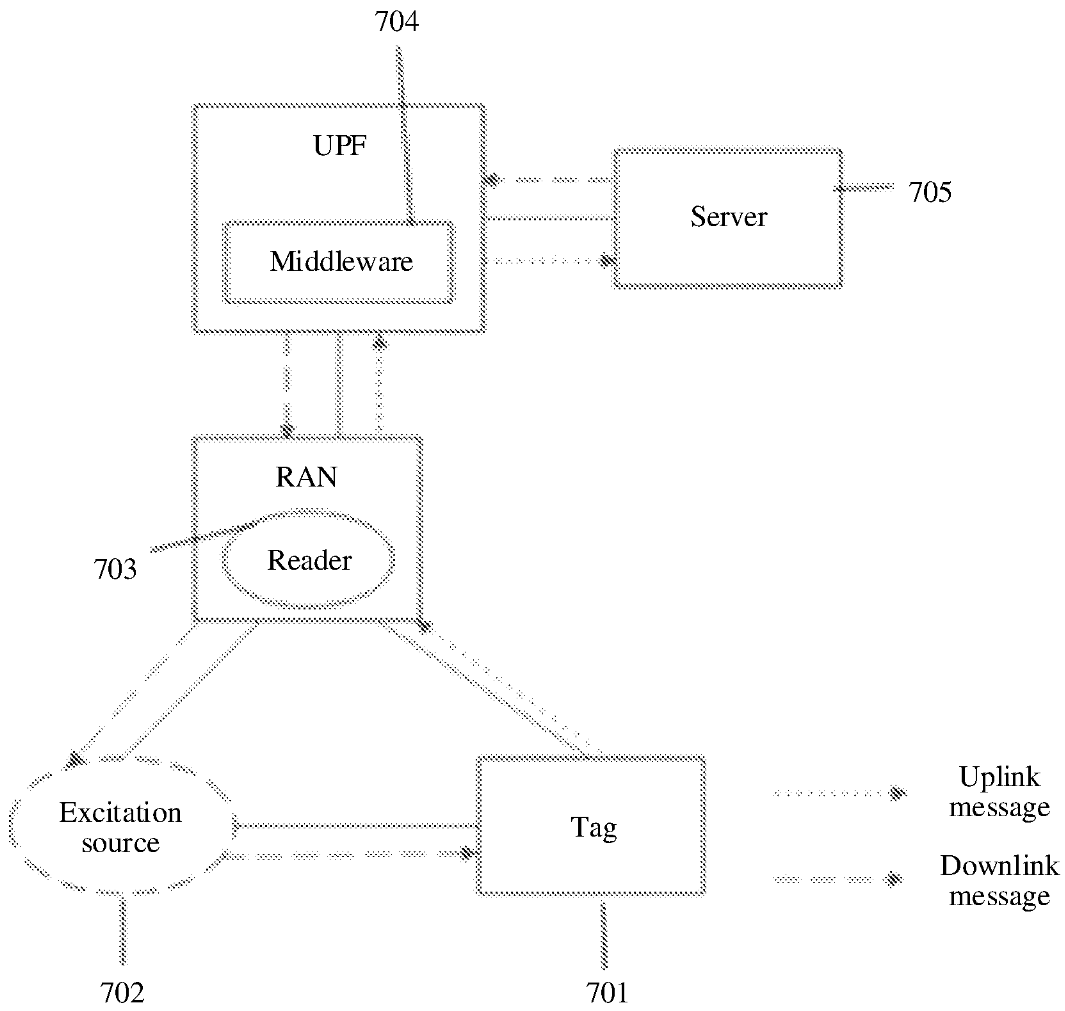
FIG. 7 is a schematic diagram of another network architecture in which RFID converges with cellular to which an embodiment of this application is applicable.

FIG. 7 is a schematic diagram of another network architecture in which RFID or passive internet of things converges with cellular to which an embodiment of this application is applicable. In the network architecture shown in FIG. 7, a middleware 704 and a UPF are co-located. When the middleware 704 and the UPF are co-located, the middleware 704 serves as a function of the UPF. In this case, RFID data is transmitted through a user plane channel, and data is transmitted between a server and the UPF through an N6 interface. In an architecture in which the two are co-located, the server 705 sends a downlink message to the UPF (that is, the co-located middleware 704) through the N6 interface, and then the UPF sends the downlink message to a RAN (a reader 703). Finally, the RAN (the reader 703) sends the downlink message to a tag 701 (where if an excitation source 702 is deployed, the RAN first sends the downlink message to the excitation source 702, and then the excitation source 702 sends the downlink message to the tag 701). For an uplink message, the tag 701 directly sends the uplink message to the reader 703, then the RAN (the reader 703) sends the uplink message to the UPF (the middleware 704) through the user plane channel, and then the UPF (the middleware 704) sends the uplink message to the server through the N6 interface.

Figure 8:
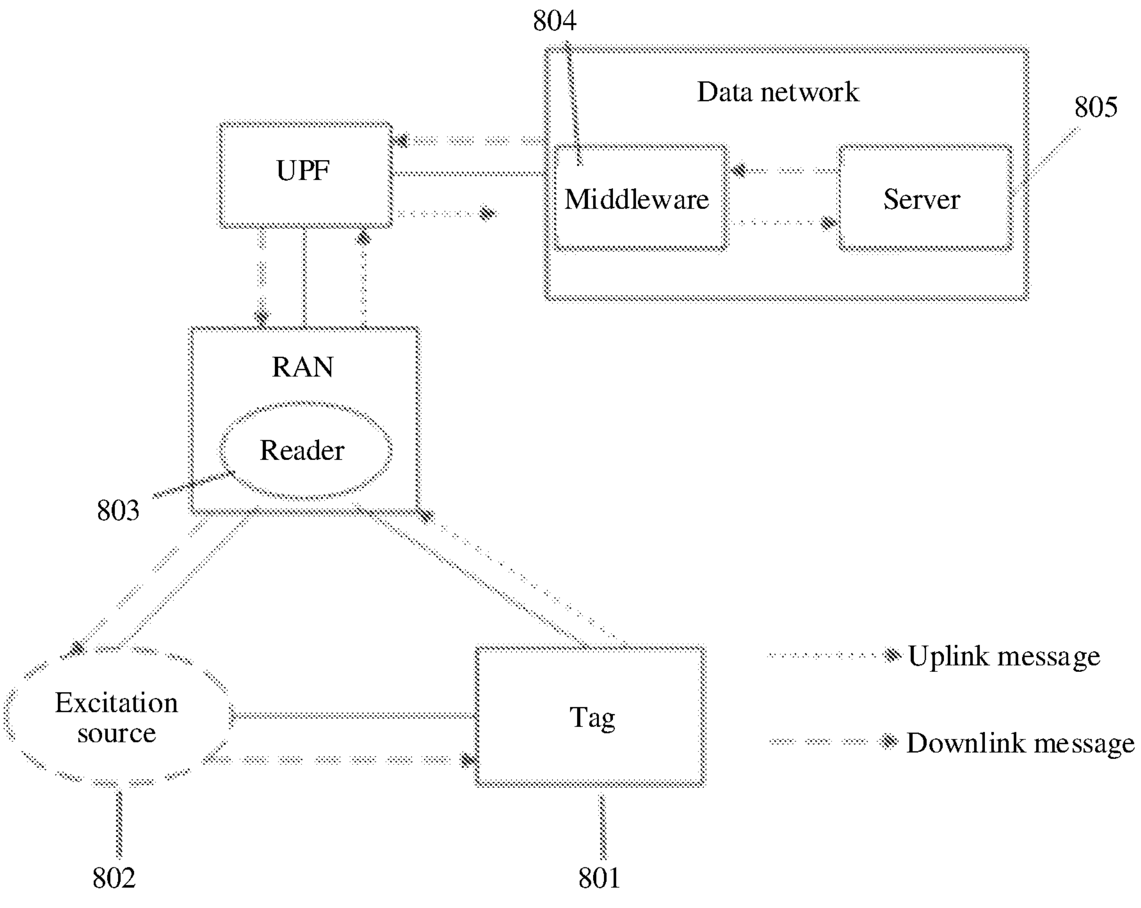
FIG. 8 is a schematic diagram of still another network architecture in which RFID converges with cellular to which an embodiment of this application is applicable.

FIG. 8 is a schematic diagram of still another network architecture in which RFID converges with cellular to which an embodiment of this application is applicable. In the network architecture shown in FIG. 8, a middleware 804 is deployed in a data network, that is, a UPF communicates with the middleware 804 by using an N6 interface. In the architecture shown in FIG. 8, a server 805 sends a downlink message to the middleware 804, the middleware 804 sends the downlink message to the UPF through the N6 interface, and then the UPF sends the downlink message to a RAN (a reader 803). Finally, the RAN (the reader 803) sends the downlink message to a tag 801 (where if an excitation source 802 is deployed, the RAN first sends the downlink message to the excitation source 802, and then the excitation source 802 sends the downlink message to the tag 801). For an uplink message, the tag 801 directly sends the uplink message to the RAN (the reader 803), then the RAN (the reader 803) sends the uplink message to the UPF through a user plane channel, and then the UPF sends the uplink message to the middleware 804 through the N6 interface. Finally, the middleware 804 sends the uplink message to the server 805. In actual deployment, the middleware and the server may be co-located. When the middleware and the server are co-located, interaction between the two apparatuses provided in this embodiment of this application becomes an internal operation of the co-located apparatus or may be omitted.

Figure 9:
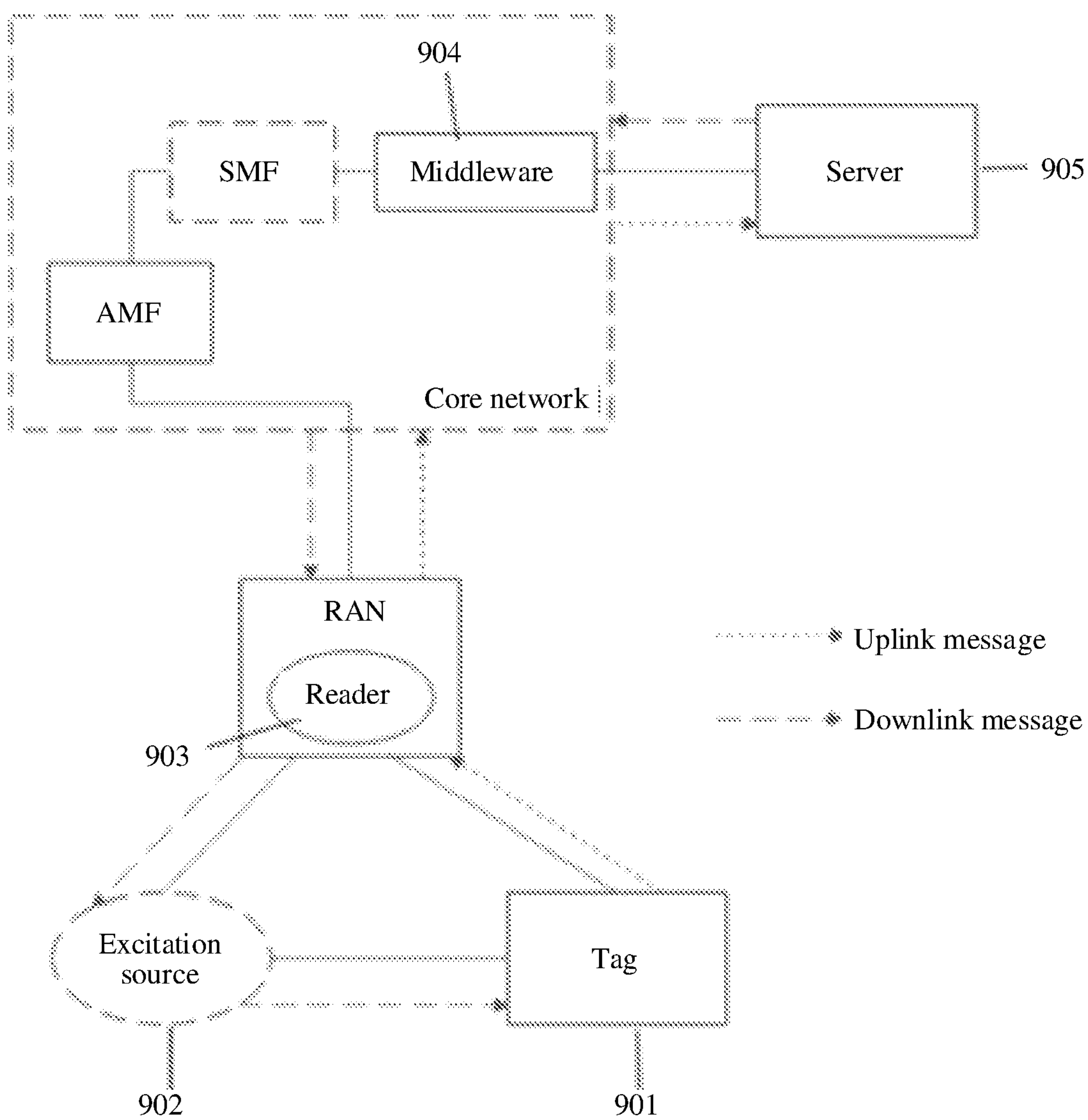
FIG. 9 is a schematic diagram of yet another network architecture in which RFID converges with cellular to which an embodiment of this application is applicable.

FIG. 9 is a schematic diagram of yet another network architecture in which RFID converges with cellular to which an embodiment of this application is applicable. In the network architecture shown in FIG. 9, a middleware 904 is deployed as a network element in a core network and is independently deployed. For example, the middleware 904 may be a control plane network element deployed in the core network. A downlink message is sent by a server 905 to the middleware 904. Then, the middleware 904 sends the downlink message to a RAN (a reader 903). For example, the middleware 904 may first send the downlink message to an AMF, and then the AMF sends the downlink message to the RAN (the reader 903). Alternatively, optionally, the middleware 904 may first send the downlink message to an SMF, then the SMF sends the downlink message to an AMF, and then the AMF sends the downlink message to the RAN (the reader 903). Regardless of the foregoing manners, after the RAN receives the downlink message, the RAN (the reader 903) sends the downlink message to a tag 901. If an excitation source 902 is deployed, the RAN (the reader 903) first sends the downlink message to the excitation source 902, and then the excitation source 902 sends the downlink message to the tag 901. However, for an uplink message, the tag 901 directly sends the uplink message to the RAN (the reader 903), and then the RAN (the reader 903) sends the uplink message to the middleware 904. Similarly, for example, the RAN (the reader 903) may first send the uplink message to the AMF, and then the AMF sends the uplink message to the middleware 904. Alternatively, the RAN (the reader 903) may first send the uplink message to the AMF, then the AMF sends the uplink message to the SMF, and then the SMF sends the uplink message to the middleware 904. Finally, the middleware 904 sends the uplink message to the server 905.

To make the objectives, technical solutions, and advantages of the present invention clearer, the following further describes the present invention in detail with reference to the accompanying drawings. It is clearly that the described embodiments are merely some rather than all of embodiments of the present invention.

The network architecture described in embodiments of the present invention is intended to describe the technical solutions in embodiments of the present invention more clearly, but does not constitute a limitation on the technical solutions provided in embodiments of the present invention. A person of ordinary skill in the art may know that, with evolution of the network architecture and emergence of a new service scenario, the technical solutions provided in embodiments of the present invention are also applicable to similar technical problems.

The following describes the charging method by using the RFID technology as an example. However, the charging method in this application is not limited to the RFID technology, and may also be applicable to a technology such as the passive internet of things.

Figure 10:
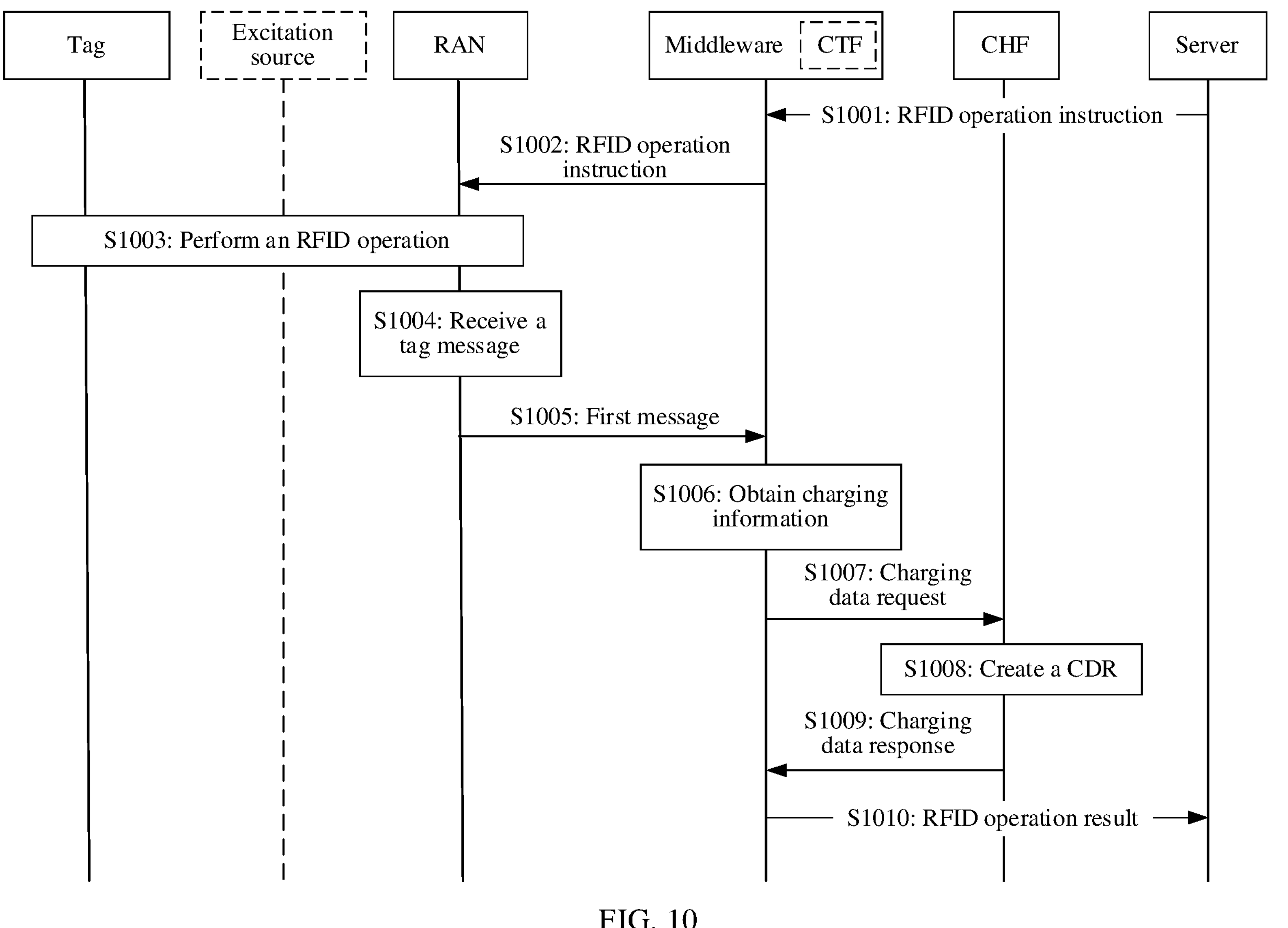
FIG. 10 is a schematic flowchart of RFID charging according to an embodiment of this application.

FIG. 10 shows a charging method in a network architecture in which RFID converges with cellular according to an embodiment of the present invention. In the method, a middleware obtains charging information, where the charging information includes type information and quantity information, the type information indicates an operation type, and the quantity information indicates a quantity of tags on which an operation of this operation type is performed. The middleware reports the charging information to a CHF. In the solution provided in FIG. 10, the middleware supports a CTF, and the middleware directly interacts with the CHF to complete charging.

The embodiment shown in FIG. 10 may be applicable to the cellular convergence architecture in FIG. 6, FIG. 8, or FIG. 9. As shown in FIG. 10, the method includes the following steps.

S1001: A server sends an RFID operation instruction to the middleware.

For example, the operation instruction may indicate an operation type of the RFID. For example, the operation type includes an inventory operation, a read operation, a write operation, or the like. In addition, the operation instruction includes an identifier of a tag on which an RFID operation should be performed. The tag identifier may be an EPC code set or may be a number or a character string identifying the tag. For example, if a tag identifier set is 1 to 100, the tag identifier of the tag on which the RFID operation is performed should belong to 1 to 100. For example, the tag identifier is 1. In this case, the tag identifier of the tag on which the RFID operation is performed is 1. For another example, the tag identifier is the EPC code set. The EPC code set may be urn:epc:id:sgtin:0614141.112345.400-urn:epc:id:sgtin:0614141.112345.600, where urn:epc:id is a fixed character start of an EPC code, sgtin represents that an object identified by the tag is a commodity, 0614141 represents a manufacturer that manufactures the tag, 112345 represents a specific commodity type, such as clothing, and 400 and 600 are serial numbers identifying the tag.

S1002: After receiving the RFID operation instruction, the middleware parses the operation instruction, and sends the RFID operation instruction to a RAN corresponding to the tag identified by the tag identifier in step S1001.

For example, when the method is applicable to the network architecture shown in FIG. 6, because the RAN is directly connected to the middleware, the middleware directly sends the operation instruction to the RAN. When the method is applicable to the network architecture shown in FIG. 8, the middleware forwards the operation instruction to the RAN by using the UPF. When the method is applicable to the network architecture shown in FIG. 9, the middleware serves as a control plane network element of the core network. In this case, the middleware may send the operation instruction to the RAN by using the AMF or by sequentially using the SMF and the AMF.

S1003: The RAN performs an RFID operation after receiving the operation instruction.

For example, the RAN interacts with the tag to complete an inventory operation, a read operation, or a write operation. For the inventory operation, refer to the description in FIG. 2. For the read operation or the write operation, refer to the description in FIG. 3. Details are not described herein again. Optionally, the RFID operation further relates to interaction between the RAN and an excitation source.

If the excitation source exists, the RAN sends a downlink message to the tag by using the excitation source. However, the tag directly sends an uplink message to the RAN. If the excitation source does not exist, the RAN directly exchanges uplink and downlink messages with the tag.

S1004: The RAN receives a tag message. The tag message may be an uplink message sent by a tag to the RAN. There may be one or more tags.

For example, the tag message includes a tag identifier. Optionally, the uplink message sent by the tag may further include a type of an operation performed on the tag.

For example, the operation may be periodically performed on the tag. In this case, the RAN may periodically receive the tag message during the performed RFID operation. Alternatively, if the operation is performed on the tag only once during the RFID operation performed by the RAN, the RAN may receive the tag message from the tag during the performed RFID operation.

S1005: The RAN sends a first message to the middleware.

In this step, when this embodiment is applicable to the network architecture shown in FIG. 6, the RAN directly sends the first message to the middleware. When this embodiment is applicable to the network architecture shown in FIG. 8, the RAN sends the first message to the middleware by using the UPF. When this embodiment is applicable to the network architecture shown in FIG. 9, the RAN sends the first message to the middleware by using the AMF or by sequentially using the AMF and the SMF.

In addition, optionally, the RAN may further send a second message to the middleware.

S1006: The middleware obtains charging information based on the message (for example, the first message, optionally, the second message) received from the RAN. The charging information includes type information and quantity information, the type information indicates an operation type of a first operation, and the quantity information indicates a quantity of tags on which the first operation is performed.

It may be understood that the quantity information in this application is obtained quantity information of one or more tags on which a specific operation is performed that are not repeatedly calculated, or quantity information obtained by deduplicating and integrating repeatedly calculated quantities when tags on which a specific operation is performed are reported for a plurality of times.

That is, a quantity indicated by the quantity information obtained by the middleware is processed in two steps. The first step is deduplication, and the second step is integration. The two steps may be both performed by the RAN, separately performed by the RAN and the middleware, or both performed by the middleware. For example, step S1004 to step S1006 may be implemented in the following three specific manners, which are described in detail below.

In a first optional implementation, both the deduplication step and the integration step are performed by the RAN.

For example, after step S1004, the RAN deduplicates and integrates a received tag message reported by the tag, to obtain the type information of the first operation and the quantity information indicating the tag on which the first operation is performed, and sends the type information and the quantity information to the middleware by using the first message in step S1005. Therefore, in step S1006, the middleware may directly obtain the charging information based on the type information and the quantity information that are included in the first message.

For example, the foregoing implementation may be applicable to a scenario in which the middleware is connected to one RAN.

For example, the RAN may inventory tags in a specific time period in an inventory operation process. Therefore, the RAN may obtain at least two pieces of information from the tag message in step S1004. It is assumed that the RAN receives two pieces of information in step S1004, where a first piece of information indicates that tags on which the inventory operation is performed include a tag 1, a tag 3, and a tag 4, and a second piece of information indicates that tags on which the inventory operation is performed include the tag 1, a tag 2, the tag 3, and a tag 5. The RAN removes the tag 1 and the tag 3 that are repeatedly calculated from the two pieces of information, and integrates the tag 1, the tag 2, the tag 3, the tag 4, and the tag 5 after the deduplication, to obtain a quantity 5 of tags on which the inventory operation is performed. Therefore, the type information reported by the RAN in step S1005 indicates that the operation type is the inventory operation, and the quantity information is 5, thereby indicating that the inventory operation is performed on five tags in total.

It may be understood that the integration may also be referred to as summarization, statistics collection, or counting. This is not limited in this application.

Optionally, in a scenario in which the middleware is connected to a plurality of RANs, the first message may further include an identifier of a tag on which the first operation is performed, and the middleware further performs deduplication and integration based on the tag identifiers. That is, the plurality of RANs (for example, a first RAN and a second RAN) send respective first messages thereof to the middleware in step S1005 based on tag messages received from respective ranges thereof (where it may also be considered as that the first RAN sends a first message, and the second RAN sends a second message). Each of first messages sent by the plurality of RANs includes type information of a first operation and information indicating non-repetitive tag identifiers on which the first operation is performed that are reported by tags within respective ranges. It may be understood that although a tag identifier in a first message reported by each RAN is not repeated, tag identifiers reported by the plurality of RANs may be repeated. For example, when a specific tag is within coverage of both the first RAN and the second RAN, both the first RAN and the second RAN report an identifier of the tag. Therefore, in step S1006, the middleware further performs deduplication and integration based on the type information of the first operation and the non-repetitive tag identifiers on which the first operation is performed that are obtained from the plurality of RANs, to obtain the charging information.

For example, it is assumed that a first piece of information sent by the first RAN indicates that tags on which an inventory operation is performed include a tag 1, a tag 3, and a tag 4, and a second piece of information sent by the second RAN indicates that tags on which the inventory operation is performed include the tag 1, a tag 2, the tag 3, and a tag 5. The tag 1 and the tag 3 exist within coverage of both the first RAN and the second RAN. The middleware removes the tag 1 and the tag 3 that are repeatedly calculated from the two pieces of information, and integrates the tag 1, the tag 2, the tag 3, the tag 4, and the tag 5 after the deduplication, to obtain a quantity 5 of tags on which the inventory operation is performed. Therefore, in step S1006, the type information obtained by the middleware in the charging information indicates that the operation type is the inventory operation, and the quantity information is 5, to indicate that the inventory operation is performed on five tags in total.

In a second optional implementation, the RAN performs the deduplication step, and the middleware performs the integration step.

For example, after step S1004, the RAN deduplicates a received uplink message sent by the tag, to obtain the type information of the first operation and identification information indicating the tag on which the first operation is performed, and sends the type information and the identification information to the middleware by using the first message in step S1005. Therefore, in step S1006, the middleware may determine, based on the type information and the identification information that are included in the first message, a quantity of tags on which the first operation is performed, to obtain the charging information.

For example, the foregoing implementation may be applicable to a scenario in which the middleware is connected to one RAN.

For example, the RAN may inventory tags in a specific time period in an inventory operation process. Therefore, the RAN obtains at least two pieces of information from the tag message in step S1004. It is assumed that the RAN receives two pieces of information in step S1004, where a first piece of information indicates that tags on which the inventory operation is performed include a tag 1, a tag 3, and a tag 4, and a second piece of information indicates that tags on which the inventory operation is performed include the tag 1, a tag 2, the tag 3, and a tag 5. The RAN removes the tag 1 and the tag 3 that are repeatedly calculated from the two pieces of information, to obtain identifiers, namely, the tag 1, the tag 2, the tag 3, the tag 4, and the tag 5, of tags on which the inventory operation is performed. Therefore, the type information reported by the RAN in step S1005 indicates that the operation type is the inventory operation, and the identification information is the tag 1, the tag 2, the tag 3, the tag 4, and the tag 5, thereby indicating that the inventory operation is performed on the tag 1, the tag 2, the tag 3, the tag 4, and the tag 5. The middleware determines the quantity information based on the type information and the identification information that are reported in step S1005. The type information in the charging information indicates that the operation type is the inventory operation, and the quantity information is 5, thereby indicating that the inventory operation is performed on five tags in total.

Optionally, in a scenario in which the middleware is connected to a plurality of RANs, the middleware performs deduplication and integration based on type information and identification information that are reported by the plurality of RANs (for example, a first RAN and a second RAN). That is, each of the first RAN and the second RAN sends the first message to the middleware in step S1005 based on tag messages received from respective ranges thereof, where the first message is the type information of the first operation and the information indicating the non-repetitive tag identifiers on which the first operation is performed within the respective ranges. Similarly, tag identifiers reported by the plurality of RANs may also be repeated. Therefore, in step S1006, the middleware further performs deduplication and integration based on the type information of the first operation and the information indicating the non-repetitive tag identifiers on which the first operation is performed that are obtained from the plurality of RANs, thereby obtaining the charging information. A deduplication operation of the middleware is similar to a deduplication operation of the RAN, and details are not described herein again.

For example, it is assumed that a first piece of deduplicated information sent by the first RAN indicates that tags on which an inventory operation is performed include a tag 1, a tag 3, and a tag 4, and a second piece of deduplicated information sent by the second RAN indicates that tags on which the inventory operation is performed include the tag 1, a tag 2, the tag 3, and a tag 5. The tag 1 and the tag 3 exist within coverage of both the first RAN and the second RAN. The middleware removes the tag 1 and the tag 3 that are repeatedly calculated from the two pieces of information, and integrates the tag 1, the tag 2, the tag 3, the tag 4, and the tag 5 after the deduplication, to obtain a quantity 5 of tags on which the inventory operation is performed. Therefore, in step S1006, the middleware determines that the type information in the charging information indicates that the operation type is the inventory operation, and the quantity information is 5, thereby indicating that the inventory operation is performed on five tags in total.

In a third optional implementation, both the deduplication and integration steps are performed by the middleware.

For example, the RAN directly sends the tag message received in step S1004 to the middleware by using the first message in step S1005, where the first message includes the type information of the first operation and identification information indicating the tag on which the first operation is performed. Optionally, the RAN further sends a second message. In step S1006, the middleware obtains the charging information based on the type information and the identification information that are included in the first message (optionally, the first message and the second message).

For example, the foregoing implementation may be applicable to a scenario in which the middleware is connected to one or more RANs.

For example, the middleware first obtains at least two pieces of information, where each piece of information includes the type information of the first operation and identification information indicating an RFID tag on which the first operation is performed. The at least two pieces of information may be obtained from one message (for example, the foregoing first message) sent by one RAN, may be obtained from a plurality of messages (for example, the foregoing first message and the foregoing second message) sent by a same RAN, or may be obtained from a plurality of messages separately sent by different RANs. This is not limited in this application. The middleware then deduplicates and integrates the two pieces of information. For details about how the middleware performs deduplication and integration, refer to the foregoing description.

For example, the RAN may inventory tags in a specific time period in an inventory operation process. Therefore, the RAN obtains at least two pieces of information from the tag message reported by the tag in step S1004. It is assumed that the RAN receives two pieces of information in step S1004, where in a first piece of information, type information indicates that a performed operation is an inventory operation, and identification information indicates that tag identifiers on which the inventory operation is performed include a tag 1, a tag 3, and a tag 4; and in a second piece of information, type information indicates that the performed operation is the inventory operation, and the identification information indicates that tag identifiers on which the inventory operation is performed include the tag 1, a tag 2, the tag 3, and a tag 5. The RAN sends the two pieces of information to the middleware by using the first message in step S1005. Optionally, the RAN sends the first piece of information to the middleware by using the first message, and the RAN sends the second piece of information to the middleware by using a second message. The middleware first performs deduplication based on the type information and the identification information that are reported in step S1005. The middleware removes the tag 1 and the tag 3 that are repeatedly calculated from the two pieces of information, and integrates the tag 1, the tag 2, the tag 3, the tag 4, and the tag 5 after the deduplication, to obtain a quantity 5 of tags on which the inventory operation is performed. Finally, the type information in the charging information obtained by the middleware indicates that the operation type is the inventory operation, and the quantity information is 5, thereby indicating that the inventory operation is performed on five tags in total.

Optionally, in a scenario in which the middleware is connected to a plurality of RANs, the middleware performs deduplication and integration based on type information and identification information that are reported by the plurality of RANs (for example, a first RAN and a second RAN). That is, each of the first RAN and the second RAN sends the first message to the middleware in step S1005 based on tag messages received from respective ranges thereof, where the first message is the type information of the first operation and a tag identifier indicating the performed first operation within the respective ranges. Tag identifiers reported by the plurality of RANs may also be repeated, and a specific tag may be within coverage of both the first RAN and the second RAN. Therefore, in step S1006, the middleware further performs deduplication and integration based on the type information of the first operation and the information indicating the non-repetitive tag identifiers on which the first operation is performed that are obtained from the plurality of RANs, thereby obtaining the charging information.

For example, it is assumed that a first piece of information sent by the first RAN indicates that tags on which the inventory operation is performed include a tag 1, a tag 3, and a tag 4, and a second piece of information sent by the second RAN indicates that tags on which the inventory operation is performed include the tag 1, a tag 2, the tag 3, and a tag 5. The tag 1 and the tag 3 exist within coverage of both the first RAN and the second RAN. The middleware removes the tag 1 and the tag 3 that are repeatedly calculated from the two pieces of information, and integrates the tag 1, the tag 2, the tag 3, the tag 4, and the tag 5 after the deduplication, to obtain a quantity 5 of tags on which the inventory operation is performed. Therefore, in step S1006, the type information obtained by the middleware in the charging information indicates that the operation type is the inventory operation, and the quantity information is 5, to indicate that the inventory operation is performed on five tags in total.

It should be understood that the deduplication may also be considered as a specific method of the integration.

The foregoing describes several possible implementations of step S1005 and step S1006. Certainly, the middleware may alternatively obtain the charging information in another manner. This is not limited in this application. Then, the middleware performs step S1007.

S1007: The middleware sends a charging data request to the CHF, where the charging data request carries the charging information in step S1006.

S1008: The CHF creates a CDR.

For example, the CHF receives the charging information, and creates the CDR based on the charging information.

S1009: The CHF sends a charging data response to the middleware, where the charging data response is used to notify the middleware of a result of whether the charging data request is completed.

S1010: The middleware sends an RFID operation result to the server, where the operation result is used to respond to the RFID operation instruction delivered by the server to the middleware in step S1001. A tag operation type included in the RFID operation result may further include at least one of an identifier of a tag on which the operation is performed or a quantity of tags on which the operation is performed. Optionally, if the operation type is a read operation, the operation result further includes data read from a storage area of the tag, and this operation may be performed after S1005.

The middleware in this embodiment can obtain the type information indicating the operation type of the first operation and the quantity of tags on which the first operation is actually performed, and report the charging information to the CHF, so that the charging information better matches an RFID service, and a charging behavior is more reasonable. For example, a charging model for event-based charging represents a service performing quantity based on a quantity of RFID operation instructions delivered by the server, and performs charging based on the quantity. However, an apparatus supporting the CTF does not know what the operation instructions are, and cannot obtain type information of an operation performed on a tag, and cannot obtain quantity information of tags on which the operation needs to be performed. Consequently, charging cannot be performed based on an actually used network resource. For example, based on the charging method in this application, it is assumed that performing one time of inventory operation on a single tag requires a user to spend three yuan, and performing one time of write operation on the single tag requires the user to spend five yuan. This time, an inventory operation is performed on seven tags in total, and a write operation is performed on three tags. Therefore, the user is charged 36 yuan in total for this time of RFID service. If calculation is performed according to the event-based charging model, and the server delivers an instruction for performing the inventory operation and further delivers another instruction for performing the write operation, where each instruction charges 10 yuan, the user needs to be charged 20 yuan for this time of inventory operation. Therefore, according to the solution in this embodiment of this application, because obtaining the operation type and the quantity of tags on which an operation of the operation type is performed can better indicate an actually used network resource, the charging method based on this application is more appropriate.

In addition, the middleware supporting the CTF directly reports the charging information to the CHF, and the charging information may not be forwarded by using another network element. This reduces signaling overheads on a network side and reduces changes to the another network element.

The embodiment shown in FIG. 10 is described by using the RFID as an example. The solution shown in FIG. 10 is also applicable to another technology such as the passive internet of things technology. The passive internet of things technology is used as an example. In the passive internet of things technology, the middleware in this embodiment is a first network element in the passive internet of things technology, the tag may be a terminal in the passive internet of things technology, and the operation instruction may be an operation instruction in the passive internet of things technology. The following embodiments are similar, and details are not described again.

Figure 11A:
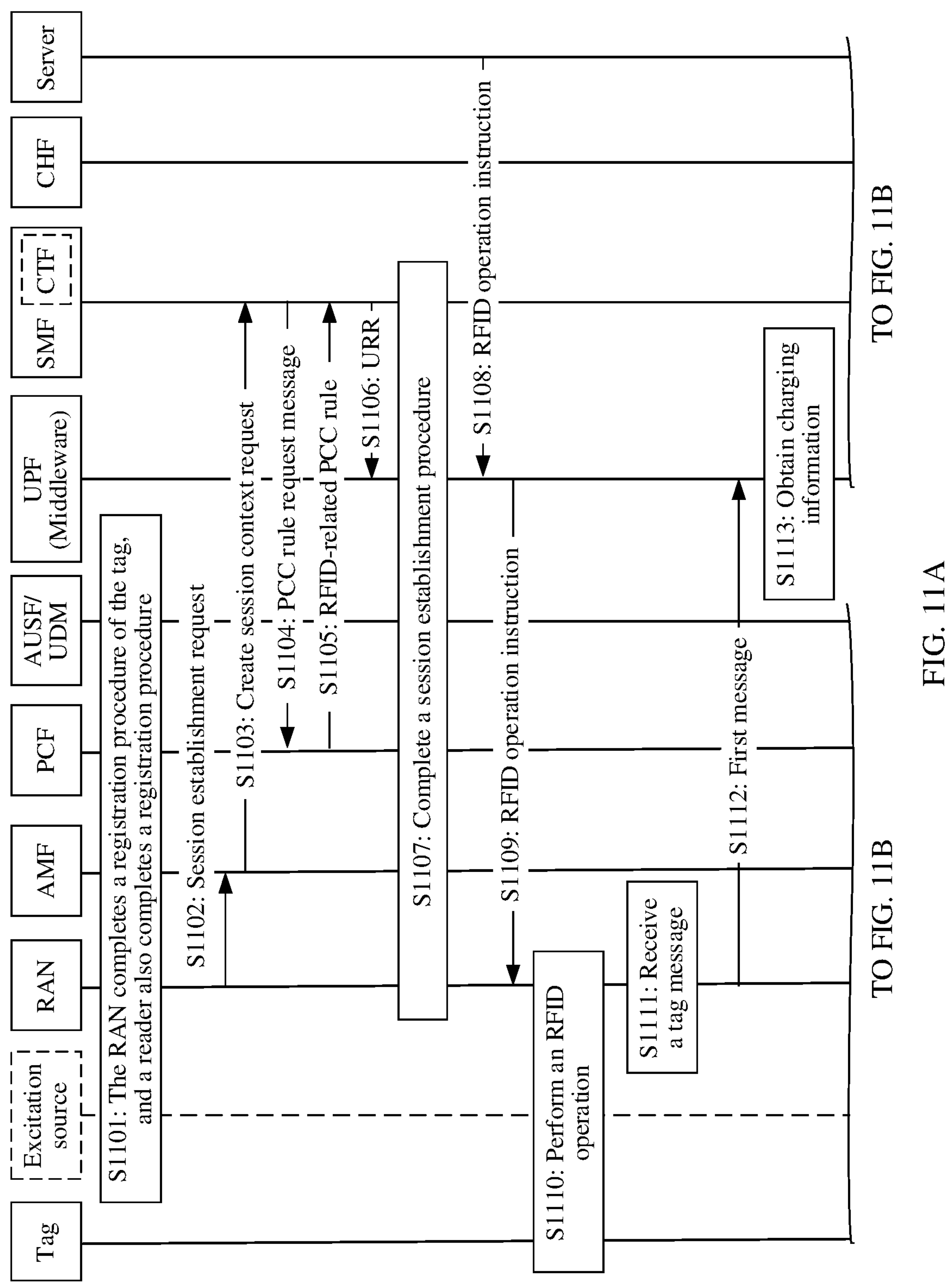
FIG. 11A and FIG. 11B are another schematic flowchart of RFID charging according to an embodiment of this application.
Figure 11B:
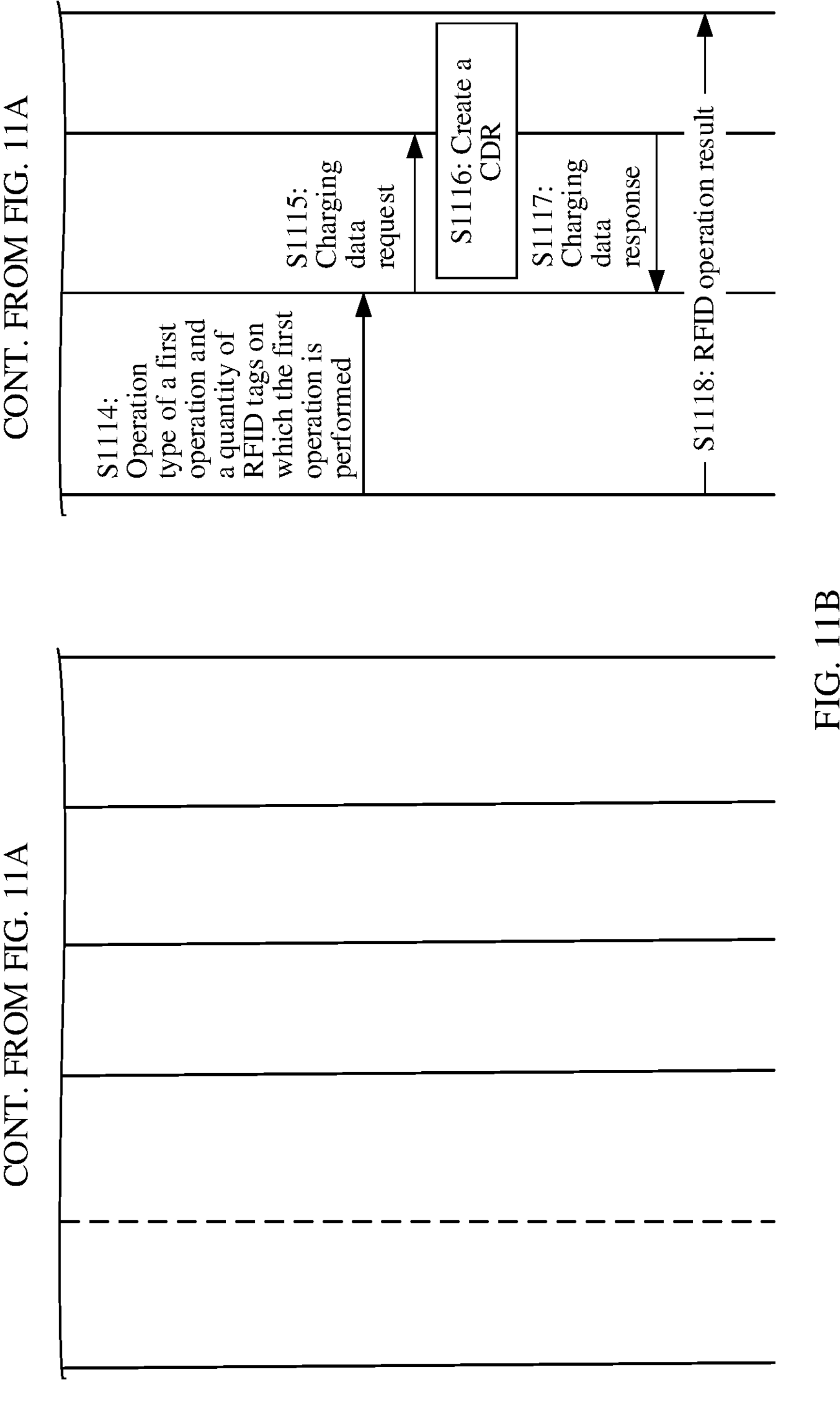
Figure 12:
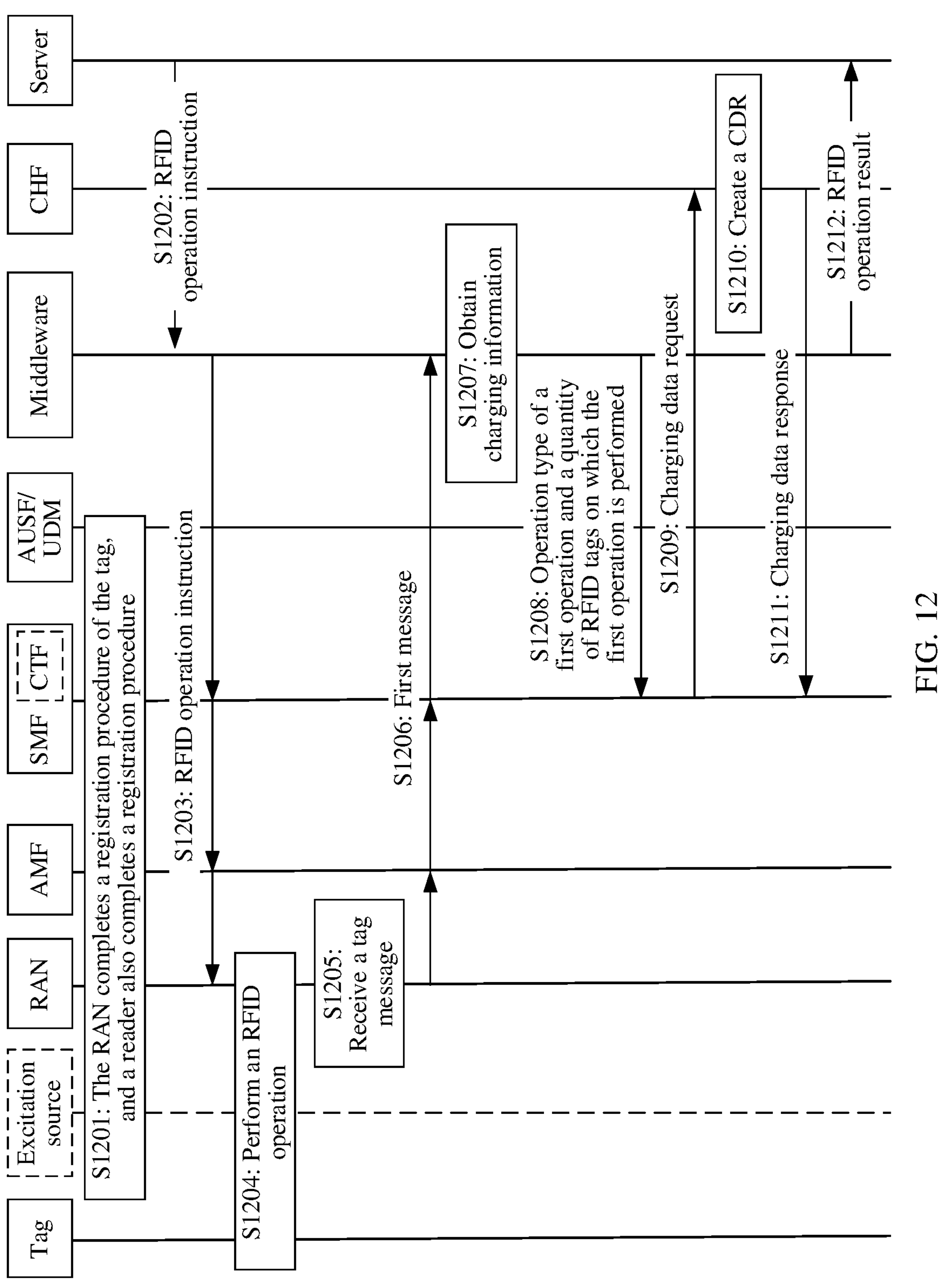
FIG. 12 is still another schematic flowchart of RFID charging according to an embodiment of this application.

FIG. 11A and FIG. 11B, and FIG. 12 in this application each show a charging method of an architecture in which RFID converges with cellular according to an embodiment. In the method shown in FIG. 11A and FIG. 11B and the method shown in FIG. 12, an SMF supports a CTF, and the SMF interacts with a CHF to implement a charging function. In this way, a middleware does not need to support the CTF. The embodiment shown in FIG. 11A and FIG. 11B is applicable to the network architecture shown in FIG. 7, that is, a scenario in which the middleware and the UPF are co-located. However, the embodiment shown in FIG. 12 is applicable to the network architecture shown in FIG. 9. That is, the middleware is independently deployed as a control plane network element in a core network.

The embodiment shown in FIG. 11A and FIG. 11B includes the following steps.

S1101: A RAN completes a registration procedure of a tag, and a reader also completes a registration procedure.

For example, because the tag does not have a non-access stratum (non-access stratum, NAS) protocol layer, the RAN may initiate a registration request message to an AMF on behalf of the tag, to complete the registration procedure of the tag. A purpose of registration by the RAN on behalf of the tag is to establish, on behalf of the tag, a channel to a control plane network element or a channel to a user plane network element. The channel is used to transmit an uplink message or a downlink message of the tag. Optionally, the RAN may complete a device granularity registration procedure. That is, the RAN may establish a shared control plane channel or user plane channel, used to transmit uplink or downlink data of a tag within coverage of the RAN. Optionally, if an excitation source is deployed in a system, the excitation source also completes a registration procedure as user equipment.

S1102: The RAN sends a session establishment request to the AMF. For example, in an optional implementation, the RAN sends a PDU session establishment request to the AMF.

S1103: The AMF sends a create session context request to the SMF.

Optionally, after the SMF receives a create session context request, the SMF feeds back a response message to the AMF.

S1104: The SMF sends a policy and charging control (Policy and Charging Control, PCC) rule request message to a PCF.

For example, the PCC rule request message includes access type information, and the access type information indicates a type of RFID. In an optional manner, if a passive internet of things technology is used, the access type information indicates a type of passive internet of things.

S1105: The PCF identifies, based on the access type information, that RFID is related, and feeds back an RFID-related PCC rule to the SMF. For example, the PCC rule includes a type parameter and a quantity parameter. The type parameter and the quantity parameter indicate the SMF to indicate a UPF to report a type of an RFID operation and a quantity of tags on which the RFID operation is performed.

S1106: The SMF sends a usage reporting rule (URR) to the UPF.

For example, the SMF generates an N4 rule according to the PCC rule sent by the PCF, where the N4 rule includes the URR, and the URR indicates the UPF to report the type of the RFID operation and the quantity of tags on which the RFID operation is performed. For example, the URR includes the foregoing type parameter and the foregoing quantity parameter, to indicate the UPF to report the type of the RFID operation and the quantity of tags on which the RFID operation is performed. The SMF may deliver the N4 rule to the UPF through an N4 interface.

S1107: The RAN, the AMF, the PCF, a UDM, the UPF, and the SMF complete a session establishment procedure.

S1108: A server sends an RFID operation instruction to the UPF.

For example, the operation instruction may indicate an operation type of the RFID. For example, the operation type includes an inventory operation, a read operation, or a write operation. The instruction includes an identifier of a tag on which the RFID operation should be performed. For example, the tag identifier may be an EPC code set.

S1109: The UPF (where the middleware and the UPF are co-located) sends the RFID operation instruction to a corresponding RAN.

S1110: The RAN performs the RFID operation on the tag within a range of the set according to the RFID operation instruction. If no excitation source is deployed in the system, the RAN directly performs the RFID operation on the tag in the set range. If the excitation source is deployed in the system, the RAN performs the RFID operation on the tag in the set range by using the excitation source.

S1111: The RAN receives a tag message, where the tag message is an uplink message sent by the tag to the RAN.

S1112: The RAN sends the first message to the middleware (which may also be understood as the UPF).

Optionally, the RAN further sends a second message to the middleware (which may also be understood as the UPF).

S1113: The middleware (which may also be understood as the UPF) obtains charging information based on the first message (optionally, the second message) received from the RAN. The charging information includes type information and quantity information, the type information indicates an operation type of a first operation, and the quantity information indicates a quantity of RFID tags on which the first operation is performed.

For step S1108 to step S1113, refer to the descriptions of step S1001 to the S1006 in FIG. 10. Details are not described herein again.

S1114: The UPF reports, to the SMF, the operation type of the first operation and the quantity of RFID tags on which the first operation is performed.

S1115: The SMF supporting a CTF sends a charging data request to a CHF, where the charging data request carries the operation type of the first operation and the quantity of RFID tags on which the first operation is performed.

S1116: The CHF creates a CDR.

S1117: After completing charging, the CHF sends a charging data response to the SMF, where the charging data response is used to notify the SMF of a result of whether the charging data request is completed.

S1118: The middleware sends an RFID operation result to the server. For this step, refer to the description of step S1010 in FIG. 10. This step may be performed after step S1112.

The middleware in the embodiment shown in FIG. 11A and FIG. 11B can obtain the type information indicating the operation type of the first operation and the quantity information of tags on which the first operation is actually performed, report the charging information to the CHF, and perform charging based on the type of the operation performed on the tag and the quantity of tags on which the operation is actually performed, so that a charging result is more accurate, an RFID service is better matched, and a charging behavior is more reasonable.

In addition, because the middleware and the UPF are co-located, the middleware may use a channel (for example, the N4 interface) between the UPF and the SMF to report the URR to the SMF. In this scenario, the type parameter and the quantity parameter are added in the PCC rule. The type parameter and the quantity parameter indicate the SMF to indicate the UPF to report the operation type and the quantity of tags on which the operation is performed. Therefore, changes to a core network side apparatus caused by the addition of a function of a charging service such as the RFID or the passive internet of things are reduced.

The embodiment shown in FIG. 12 includes the following steps.

S1201: A RAN completes a registration procedure of a tag, and a reader also completes a registration procedure. For this step, refer to the description of step S1101 in FIG. 11A. Details are not described herein again.

S1202: A server sends an RFID operation instruction to a middleware deployed in a core network. For example, the operation instruction may indicate an operation type of RFID. For example, the operation type is an inventory operation, a read operation, or a write operation. The instruction includes an identifier of a tag on which an RFID operation should be performed. Optionally, the tag identifier may be an EPC code set.

S1203: The middleware serves as a control plane network element to sequentially send the RFID operation instruction to an SMF and an AMF, and finally the AMF sends the RFID operation instruction to a corresponding RAN.

S1204: The RAN performs the RFID operation on the tag within a range of the set according to the RFID operation instruction.

S1205: The RAN receives a tag message, where the tag message is an uplink message sent by the tag to the RAN.

S1206: The RAN sends a first message to the middleware through a control plane channel by sequentially using the AMF and the SMF.

Optionally, the RAN further sends a second message to the middleware.

S1207: The middleware obtains charging information based on the first message (optionally, the second message) received from the RAN. The charging information includes type information and quantity information, the type information indicates an operation type of a first operation, and the quantity information indicates a quantity of RFID tags on which the first operation is performed.

For step S1205 to step S1207, refer to the descriptions of step S1004 to step S1006 in FIG. 10. Details are not described herein again.

S1208: The middleware reports, to the SMF, the operation type of the first operation and the quantity of RFID tags on which the first operation is performed.

S1209: The SMF supporting a CTF sends a charging data request to a CHF, where the charging data request carries the operation type of the first operation and the quantity of RFID tags on which the first operation is performed.

S1210: The CHF creates a CDR.

S1211: After completing charging, the CHF sends a charging data response to the SMF, where the charging data response is used to notify the SMF of a result of whether the charging data request is completed.

S1212: The middleware sends an RFID operation result to the server. For this step, refer to the description of step S1010 in FIG. 10. This step may be performed after step S1206.

The middleware in the embodiment shown in FIG. 12 can obtain the type information indicating the operation type of the first operation and the quantity of tags on which the first operation is actually performed, report the charging information to the CHF, and perform charging based on the operation type and the quantity of tags on which the operation is actually performed, so that a charging result is more accurate, the charging information better matches an RFID service, and a charging behavior is more reasonable.

Figure 13:
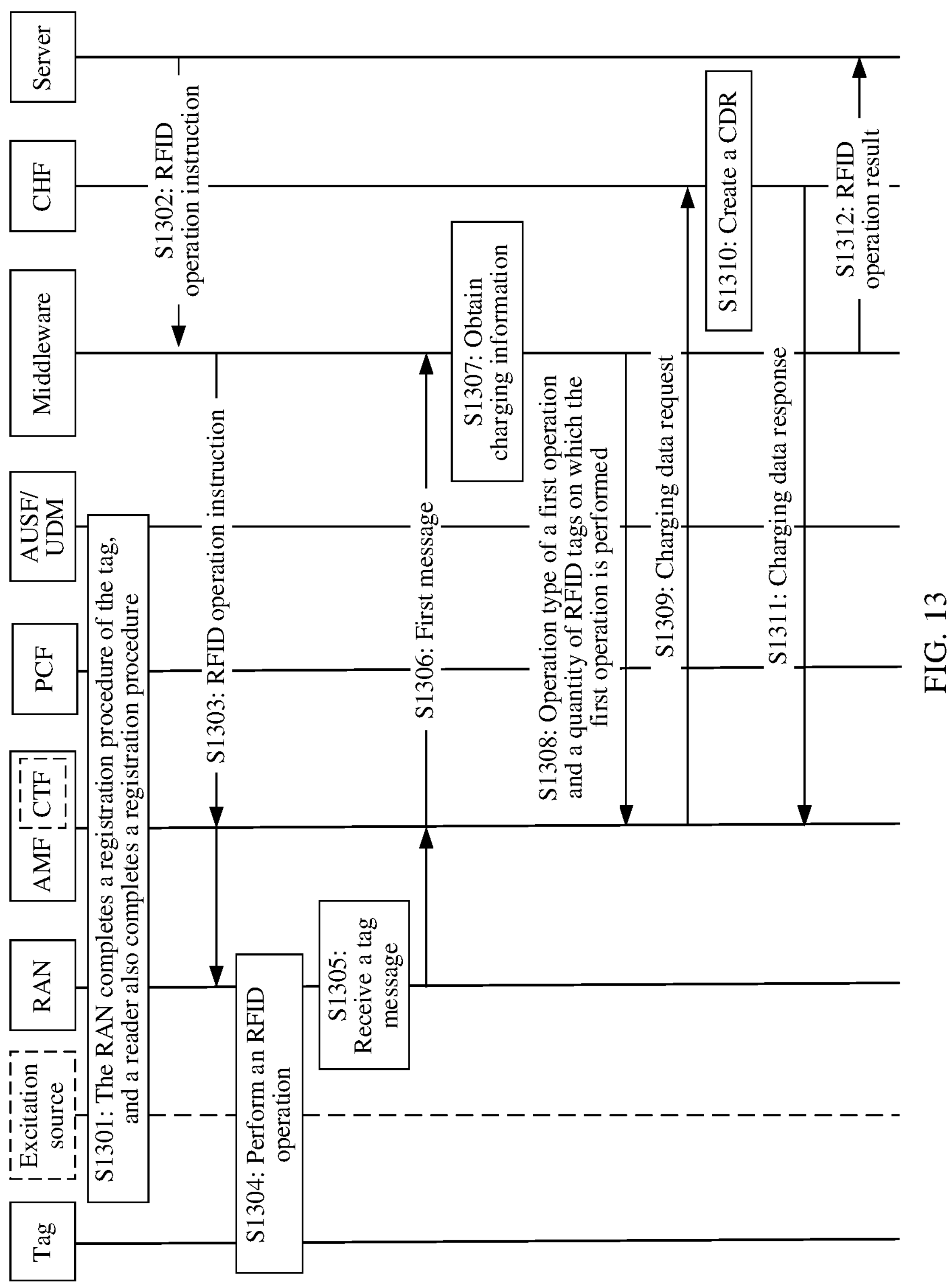
FIG. 13 is yet another schematic flowchart of RFID charging according to an embodiment of this application.

An embodiment of this application provides still another charging method of an architecture in which RFID converges with cellular, as shown in FIG. 13. The method is applicable to the cellular convergence architecture in FIG. 9. In this method, a middleware reports charging data to an AMF supporting a CTF, and the AMF interacts with a CHF to complete charging. The method includes the following steps.

S1301: A RAN completes a registration procedure of a tag, and a reader also completes a registration procedure. For this step, refer to the description of step S1101 in FIG. 11A. Details are not described herein again.

S1302: The server sends an RFID operation instruction to the middleware deployed in a core network. For example, the operation instruction may indicate an operation type of the RFID. For example, the operation type includes an inventory operation, a read operation, or a write operation. This instruction includes an EPC code set of a tag on which an RFID operation should be performed.

S1303: The middleware sends the RFID operation instruction to the AMF, and then the AMF sends the RFID operation instruction to the RAN.

S1304: The RAN performs the RFID operation on the tag within a range of the set according to the RFID operation instruction.

S1305: The RAN receives a tag message, where the tag message is an uplink message sent by the tag to the RAN.

S1306: The RAN sends a first message to the middleware by using the AMF.

Optionally, the RAN further sends a second message to the middleware by using the AMF.

S1307: The middleware obtains charging information based on the first message (optionally, the second message) received from the RAN. The charging information includes type information and quantity information, the type information indicates an operation type of a first operation, and the quantity information indicates a quantity of RFID tags on which the first operation is performed.

For step S1305 to step S1307, refer to the descriptions of step S1004 to step S1006 in FIG. 10. Details are not described herein again.

S1308: The middleware reports, to the AMF, the operation type of the first operation and the quantity of RFID tags on which the first operation is performed.

S1309: The AMF supporting the CTF sends a charging data request to the CHF, where the charging data request carries the operation type of the first operation and the quantity of RFID tags on which the first operation is performed.

S1310: The CHF creates a CDR.

S1311: After completing charging, the CHF sends a charging data response to the AMF, where the charging data response is used to notify the AMF of a result of whether the charging data request is completed.

S1312: The middleware sends an RFID operation result to the server. For this step, refer to the description of step S1010 in FIG. 10. This step may be performed after step S1306.

The middleware in the embodiment shown in FIG. 13 can obtain the type information indicating the operation type of the first operation and the quantity of tags on which the first operation is actually performed, report the charging information to the CHF, and perform charging based on the type of the operation performed on the tag and the quantity of tags on which the operation is actually performed, so that a charging result is more accurate, the charging information better matches an RFID service, and a charging behavior is more reasonable. A difference between this embodiment and the embodiment shown in FIG. 12 lies in that no SMF participates in transmission through a control plane channel. The middleware in this embodiment does not need to support the CTF, and further reduces changes to a core network element.

Figure 14:
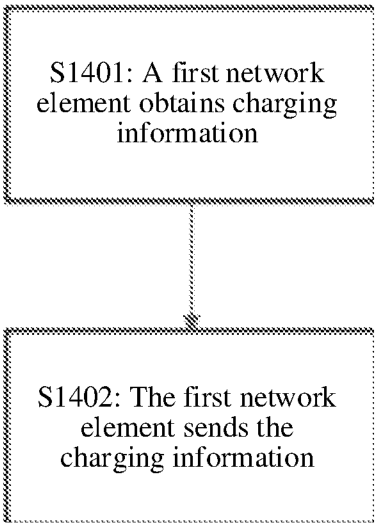
FIG. 14 is a schematic flowchart of RFID charging according to an embodiment of this application.

FIG. 14 is a schematic flowchart of an embodiment according to this application. The schematic diagram is described with reference to FIG. 10 to FIG. 13. FIG. 14 relates to interaction between a terminal, a first network element, and an access network device. For example, the terminal is the tag in FIG. 10 to FIG. 13, the first network element may be the middleware in FIG. 10 to FIG. 13, and the access network device may be the RAN in FIG. 10 to FIG. 13. For example, the method includes the following steps.

Step S1401: The first network element obtains charging information, where the charging information includes type information and first quantity information.

For this step, refer to the descriptions in step S1006 in FIG. 10, step S1113 in FIG. 11A, step S1207 in FIG. 12, and step S1307 in FIG. 13. For example, the step includes the following several cases.

In an optional case, the first network element receives the type information and second quantity information from the access network device, where the second quantity information indicates a second quantity of one or more terminals on which the first operation is performed in a first set. The first quantity is equal to the second quantity. For this case, refer to the first optional implementation of step S1006 in FIG. 10.

In an optional case, the first network element receives the type information and first identification information from the access network device. The first network element determines the first quantity information based on the first identification information. For this case, refer to the second and third optional implementations of step S1006 in FIG. 10.

In an optional case, the first network element receives first information and second information from the access network device (where for example, the first information includes the type information and first identification information, and the second information includes the type information and second identification information). The first network element determines the first quantity information based on the first information and the second information. For this case, refer to the third optional implementation of step S1006 in FIG. 10.

In an optional case, the first network element receives first information and second information from at least two access network devices, where first identification information in the first information indicates identifiers of terminals on which the first operation is performed in a first set in terminals served by a first access network device, and second identification information in the second information indicates identifiers of terminals on which the first operation is performed in a second set in terminals served by a second access network device. The first network element determines the first quantity information based on the first identification information and the second identification information. For this case, refer to an implementation of a plurality of access network devices in the implementations of step S1006 in FIG. 10.

Step S1402: The first network element sends the charging information. This step may include the following cases.

In an optional case, the first network element supporting a CTF sends the obtained charging information to a CHF. For this step, refer to the description in step S1007 in FIG. 10.

In an optional case, the first network element sends the obtained charging information to a network element or apparatus supporting the CTF, and the network element or apparatus supporting the CTF sends the charging information to the CHF to complete interaction. This case further includes the following cases.

In an optional case, the first network element sends the obtained charging information to an SMF supporting the CTF. For this step, refer to the descriptions of step S1114 in FIG. 11B and step S1208 in FIG. 12.

In still another optional case, the first network element sends the obtained charging information to an AMF supporting the CTF. For this step, refer to the description of step S1308 in FIG. 13.

Figure 15:
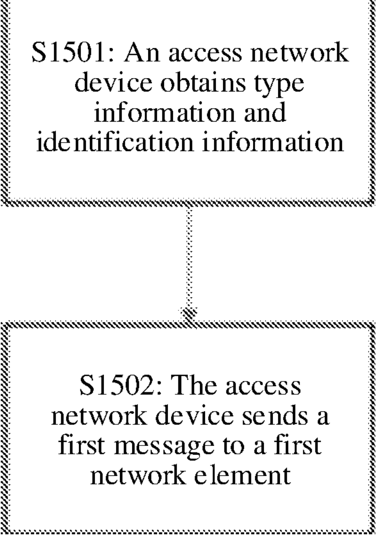
FIG. 15 is a schematic flowchart of RFID charging according to an embodiment of this application.

FIG. 15 is a schematic flowchart of an embodiment according to this application. The schematic diagram is described with reference to FIG. 10 to FIG. 13.

FIG. 15 relates to interaction between a terminal, a first network element, and an access network device. For example, the terminal is the tag in FIG. 10 to FIG. 13, the first network element may be the middleware in FIG. 10 to FIG. 13, and the access network device may be the RAN in FIG. 10 to FIG. 13. For example, the method includes the following steps.

Step S1501: The access network device obtains type information and identification information.

For this step, refer to the descriptions of step S1004 in FIG. 10, step S1111 in FIG. 11A, step S1205 in FIG. 12, and step S1305 in FIG. 13.

Step S1502: The access network device sends a first message to the first network element based on the type information and the identification information in step S1501.

For this step, refer to the descriptions of step S1005 in FIG. 10, step S1112 in FIG. 11A, step S1206 in FIG. 12, and step S1306 in FIG. 13.

Step S1501 and step S1502 in the foregoing may include the following several cases.

In an optional case, the access network device does not deduplicate tag messages received from tags, and obtains the type information and the identification information. In this case, the access network device sends the first message to the first network element, where the first message includes the type information and the identification information. Optionally, a message sent by the access network device to the first network element further includes a second message. For this case, refer to the third optional implementation of step S1006 in FIG. 10.

In an optional case, the access network device deduplicates tag messages received from tags, to obtain identification information of tags that are not repeatedly calculated, and obtains the type information and the identification information. In this case, the access network device sends the first message to the first network element, where the first message includes the type information and the identification information. For this case, refer to the second optional implementation of step S1006 in FIG. 10.

In an optional case, the access network device deduplicates and integrates tag messages received from tags, to obtain identification information of tags that are not repeatedly calculated, and obtains the type information and the identification information. The access network device determines the quantity information based on the identification information. In this case, the access network device sends the first message to the first network element, where the first message includes the type information and the quantity information. For this case, refer to the first optional implementation of step S1006 in FIG. 10.

In the foregoing embodiments, the RFID technology is used as an example to describe the charging method. The charging method in this application is not limited to the RFID technology, and may also be applicable to another technology such as an internet of things technology, for example, applicable to another technology such as a passive internet of things (passive internet of things, passive IoT) technology, a semi-active internet of things technology, or an active internet of things technology. In addition, the charging information in this application includes but is not limited to the type information of the operation type and the quantity information of the one or more terminals (such as a tag) on which the first operation is performed in the foregoing embodiments, and may further include other information, so that the CHF obtains more comprehensive and more charging information, thereby improving charging accuracy.

For example, a first device may obtain the charging information, where the charging information may include/indicate one or more of the following: identification information of one or more terminals on which a first operation is performed, quantity information of the one or more terminals on which the first operation is performed, operation type information corresponding to the first operation, an accumulated quantity of operation times, an accumulated quantity of operation times that corresponds to the first operation, an operation performing frequency, a frequency for performing the first operation, an amount of signaling exchanged in a process of performing the first operation, and an operation requester that performs the first operation. The first device sends the charging information. For example, the first device may send the charging information to the CHF by using a network element supporting a CTF. That is, one or more of information, such as a quantity of one or more terminals on which an operation is performed, the one or more terminals on which the operation is performed, an operation performing frequency, and an operation requester that requests the operation, may be indicated to the CHF, so that the charging information better matches an internet of things service, the charging information can better indicate an actually used network resource, a charging behavior is more reasonable, and a charging result is more accurate.

In this embodiment of this application, the first device may include but is not limited to a terminal, an access network device, a reader, a control plane device, a user plane network element, or a server. The control plane device may include any one of a mobility management device (for example, an AMF), a session management device (for example, an SMF), and a network exposure device (for example, an NEF). The user plane device may include a UPF. The control plane device may alternatively be described as a control plane network element, and the user plane device may alternatively be described as a user plane network element.

Figure 16A:
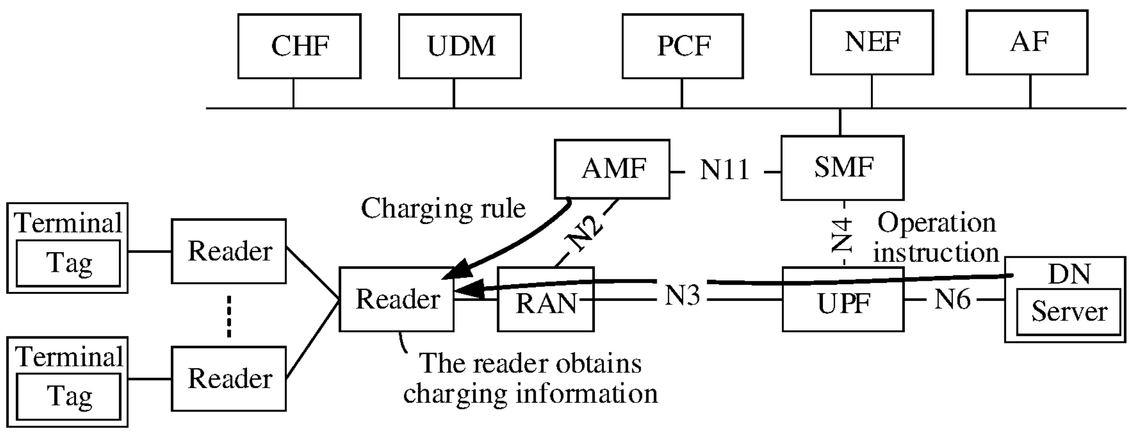
FIG. 16*a* is a first schematic diagram of a network architecture in which internet of things converges with cellular according to an embodiment of this application.
Figure 16B:
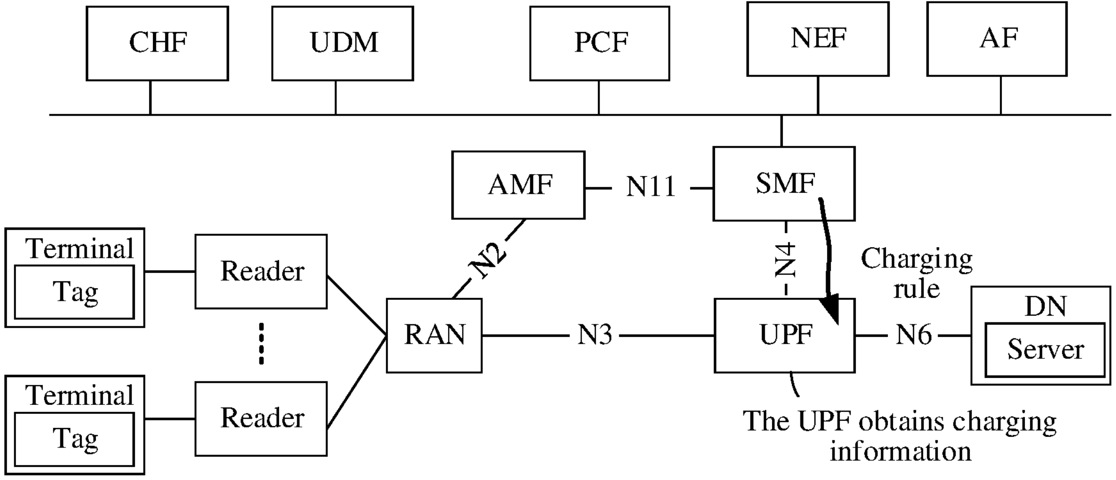
FIG. 16*b* is a second schematic diagram of a network architecture in which internet of things converges with cellular according to an embodiment of this application.
Figure 16C:
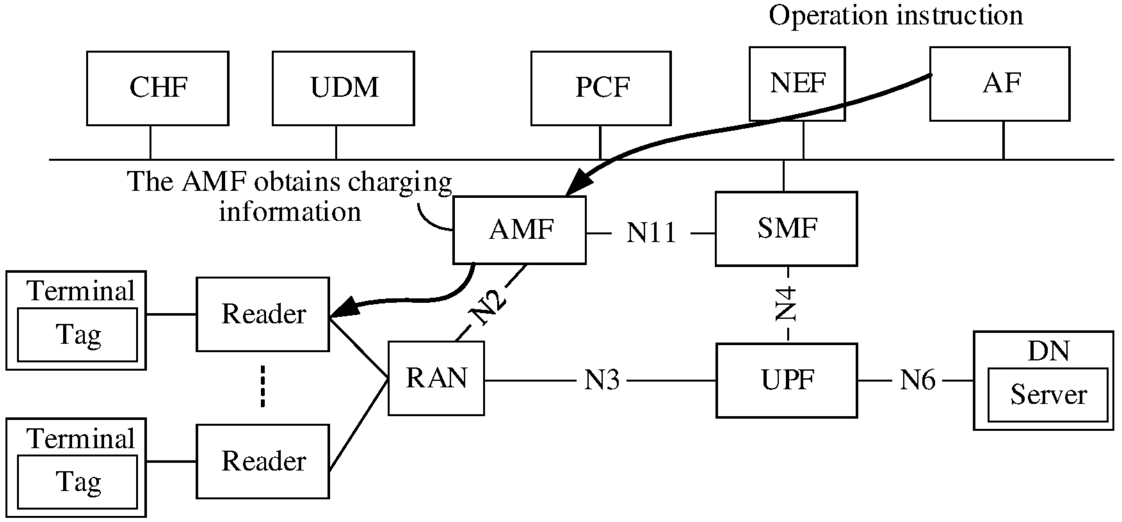
FIG. 16*c* is a third schematic diagram of a network architecture in which internet of things converges with cellular according to an embodiment of this application.

The following uses an example in which a 5G communication system converges with an internet of things technology to describe a convergent system architecture and a charging method with reference to FIG. 16*a* to FIG. 16*c*. For a system architecture and a charging method in which another communication system converges with the internet of things technology, refer to descriptions in this application.

FIG. 16*a* is a schematic diagram of a network architecture in which an internet of things technology converges with cellular according to an embodiment of this application. In the network architecture shown in FIG. 16*a*, a reader may obtain charging information according to a charging rule, and send the obtained charging information to a CHF. Alternatively, a reader (which may also be referred to as a main reader, a reader controller, a reader managing device, or the like in this application) receives charging related information sent by one or more readers connected to the reader, obtains charging information based on the received charging related information sent by the one or more readers, and sends the charging information to a CHF, or sends the charging information to a network element supporting a CTF, and the network element supporting the CTF sends the charging information to a CHF. It should be understood that the main reader, the reader controller, or the reader managing device described in this application may refer to a device that centrally manages one or more readers, and the device may alternatively be understood as a centralized reader controller, a centralized reader managing device, or the like. It should be understood that, for the network architecture shown in FIG. 16*a*, reference may be further made to the descriptions, for example, transmission of the uplink and downlink messages, in FIG. 7 and FIG. 8.

FIG. 16*b* is a schematic diagram of a network architecture in which an internet of things technology converges with cellular according to an embodiment of this application. In the network architecture shown in FIG. 16*b*, a UPF may obtain charging information according to a charging rule, and send the charging information to a CHF. Alternatively, a UPF receives charging related information sent by one or more readers managed/served by the UPF to the UPF. The UPF obtains charging information based on the received charging related information sent by the one or more readers, and sends the charging information to a CHF, or sends the charging information to a network element supporting a CTF, and the network element supporting the CTF sends the charging information to a CHF. In a possible implementation, a reader receives charging related information sent by one or more readers connected to the reader and sends the charging related information to the UPF. In another possible implementation, a reader receives charging related information sent by one or more readers connected to the reader, and the reader processes (for example, integrates, deduplicates, or collects statistics on) the charging related information to obtain charging information or charging related information, and sends the charging information or the charging related information to the UPF.

It should be understood that, for the network architecture shown in FIG. 16*b*, reference may be further made to the descriptions, for example, transmission of the uplink and downlink messages, in FIG. 7 and FIG. 8.

FIG. 16*c* is a schematic diagram of a network architecture in which an internet of things technology converges with cellular according to an embodiment of this application. In the network architecture shown in FIG. 16*c*, an AMF may obtain charging information according to a charging rule, and send the charging information to a CHF, or send the charging information to a network element supporting a CTF, and the network element supporting the CTF sends the charging information to a CHF. Alternatively, an AMF receives charging related information sent by one or more readers managed/served by the AMF. The AMF obtains charging information based on the received charging related information sent by the one or more readers, and sends the charging information to a CHF, or sends the charging information to a network element supporting a CTF, and the network element supporting the CTF sends the charging information to a CHF.

It should be understood that, for the network architecture shown in FIG. 16*c*, reference may be further made to the description, for example, transmission of the uplink and downlink messages, in FIG. 9.

In this embodiment of this application, the charging related information may be used to obtain the charging information, and the charging related information may be referred to as initial information or intermediate information used to obtain the charging information. The charging information in this embodiment of this application may be information that is finally sent to the CHF and is used for charging by the CHF. It should be understood that the charging information and the charging related information in this application may be the same or different. For example, after a first device obtains the charging related information from a second device, if the first device directly sends the obtained charging related information to the CHF without performing any processing on the obtained charging related information, the charging related information and the charging information herein are the same. For another example, after a first device obtains the charging related information from a second device, if the first device processes (for example, integrates, deduplicates, and collects statistics on) the obtained charging related information and then sends the processed charging related information to the CHF, the charging related information herein is different from the charging information. The charging related information may be understood as information used to obtain the charging information, and may be original information that is not integrated or processed, or intermediate information generated after partial integration and processing before the charging information is obtained.

In addition, naming of the charging information and naming of the charging related information are not limited in this application. The charging information may alternatively be named charging data, and the charging related information may alternatively be named charging-related data.

In this embodiment of this application, a device obtaining the charging information may be referred to as the first device. The first device may be a reader, a main reader, a reader controller, a reader managing device, or a user plane device (for example, a UPF), a mobility management device (for example, an AMF), or a session management device (for example, an SMF). Moreover, the first device may alternatively be a device such as an NEF, a PCF, or a server, and this is not limited. A description is provided by using an example in which the first device is the reader, the UPF, or the AMF in this application. For a charging method of another device, refer to the description in this application.

In a possible implementation, the first device obtains the charging information according to a charging rule.

In another possible implementation, the first device receives the charging related information from at least one second device, and the first device determines the charging information based on the charging related information of the at least one second device. For example, the first device deduplicates identification information and/or quantity information of terminals on which the first operation is repeatedly performed in the charging related information of the at least one second device, and uses deduplicated charging related information of the at least one second device as the charging information.

The charging related information of the second device may be obtained by the second device according to a charging rule or is determined by the second device based on charging related information received by the second device from at least one third device.

In this embodiment of this application, the second device may be a reader, a user plane device (a UPF), or a session management device (for example, an SMF). The third device may be a reader.

In this embodiment of this application, the first device may send the charging information to the CHF by using a device supporting the CTF. The device supporting the CTF may be the first device, or may be another device, for example, may be an access network device (such as a RAN), a control plane device (such as an AMF or an SMF), or a user plane device (such as a UPF), or may be another device or a future device supporting the CTF.

With reference to the communication systems shown in FIG. 16*a* to FIG. 16*c*, the following describes the charging method provided in embodiments of this application by using an example in which an internet of things technology converges with a 5G communication system. For actions, terms, and the like involved in the following embodiments, reference may be made to each other. Names of messages exchanged between devices, names of parameters in the messages, and the like in embodiments are merely examples, and other names may also be used in specific implementation. This is not limited. In addition, terms "first", "second", and the like in embodiments of this application are used to distinguish between different objects, but are not used to describe a specific order of the objects. Attributes of different objects represented by "first" and "second" are not limited in embodiments of this application. In addition, "obtaining" in this application may also be understood as generating, collecting statistics, calculating, receiving, and searching. These terms have an equivalent concept and may be used alternatively.

Figure 17:
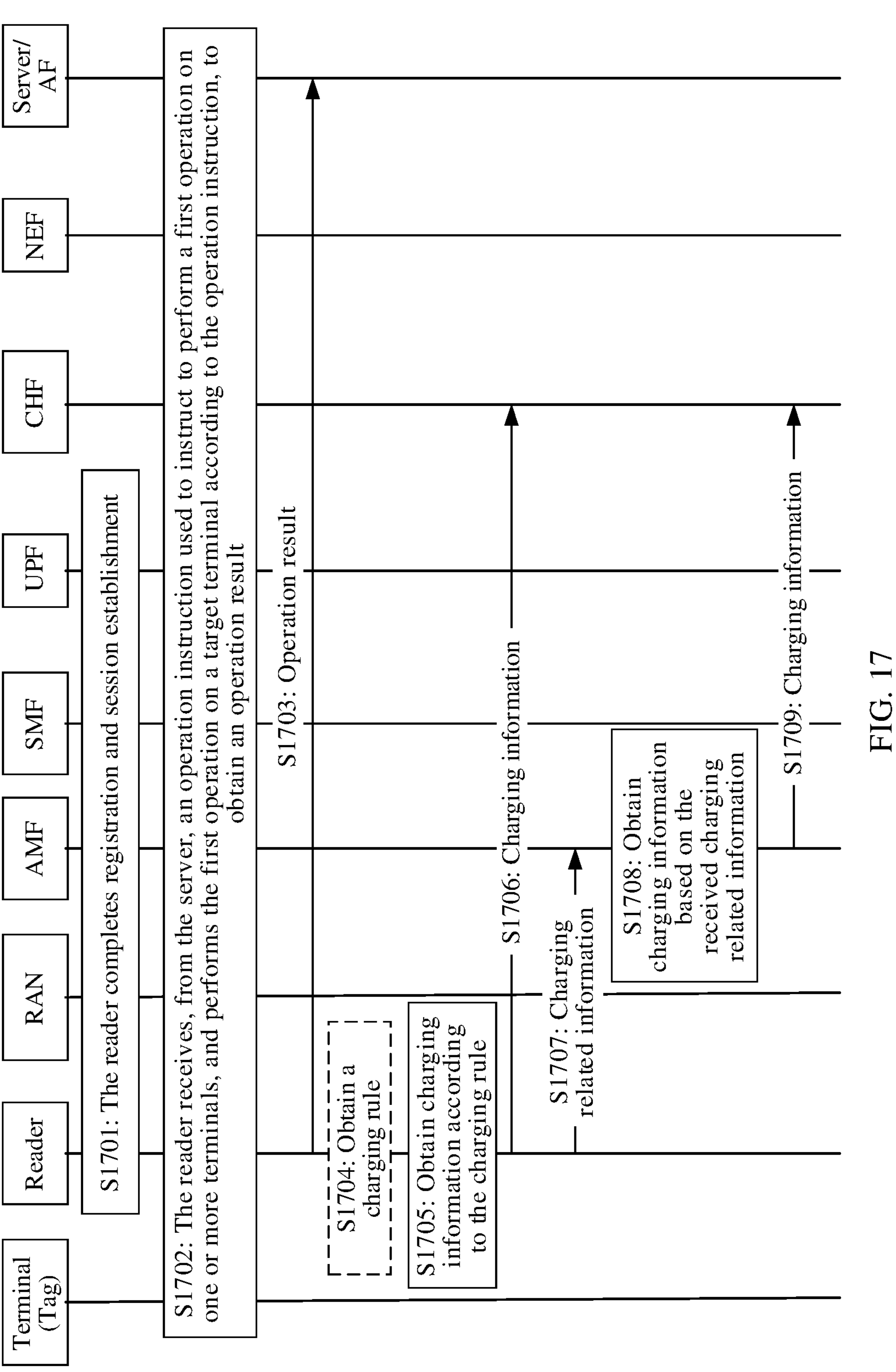
FIG. 17 is a first flowchart of a charging method according to an embodiment of this application.

FIG. 17 is a flowchart of a charging method according to an embodiment of this application. In the method, a reader obtains charging information and sends the charging information to a CHF. Alternatively, a reader obtains charging related information and sends the charging related information to another device, so that the another device obtains charging information based on the charging related information and sends the obtained charging information to a CHF. The embodiment shown in FIG. 17 may be applicable to the cellular convergence architecture in FIG. 16*a*. As shown in FIG. 17, the method includes the following steps.

S1701: The reader completes registration and session establishment.

The registration may be network registration, and the session establishment may be establishment of a user plane channel of the reader, for example, establishment of a connection between the reader and a RAN (which may be establishment of an air interface resource or a wired connection), an N3 tunnel between the RAN and a UPF, and an N6 connection between the UPF and a data network.

S1702: The reader receives, from a server, an operation instruction used to instruct to perform a first operation on one or more terminals, and performs the first operation on a target terminal according to the operation instruction, to obtain an operation result.

The reader may be the reader in FIG. 16*a*. The reader may be independently deployed, or may be deployed in the RAN. If the reader is deployed in the RAN, the reader in this embodiment may be understood as the RAN. In a possible implementation, the reader may be a terminal, or may be a pole station, a micro base station, an integrated access and backhaul node (integrated access and backhaul node, IAB node), or the like. This is not limited in this application.

The terminal may be the tag 101 in FIG. 1 or include the tag 101 shown in FIG. 1. The tag 101 may be a passive tag, a semi-active tag, or an active tag. The target terminal may be a terminal on which the first operation is to be performed. For example, the target terminal may be one or more terminals indicated by the operation instruction sent by the server.

In a possible implementation, the first operation may include one or more of an inventory operation (or referred to as a stocktaking operation), a read operation, a write operation, and an invalidate operation. The first operation herein specifically refers to one or more specific operations. In another possible implementation, the first operation does not specifically refer to a specific operation, but refers to an operation in an application scenario/internet of things technology. For example, the first operation may be a passive internet of things operation, a semi-active internet of things operation, an internet of things operation, a passive internet of things tag operation, a semi-active internet of things tag operation, an internet of things tag operation, or the like.

Specifically, for a process in which the reader performs the first operation on the target terminal according to the operation instruction, refer to the description in the foregoing embodiments. Details are not described again.

In a possible implementation, the reader receives the operation instruction from the server by using the user plane channel of the reader. The user plane channel includes the connection between the reader and the RAN, the N3 tunnel between the RAN and the UPF, and a connection between the UPF and the server. In another possible implementation, the reader receives the operation instruction from the server by using a control plane (for example, an SMF or an AMF).

In this application, the operation instruction may include one or more of the following information: identification information of one or more terminals, information about an operation requester, an operation type, and information about an area (or location information) in which the operation is performed.

For example, the operation type is an inventory operation. For example, tag information may be "500" and "600", indicating that tags whose tag identifiers are 500 and 600 need to be inventoried. The tag information may alternatively be "500-600", indicating that tags whose tag identifiers are in a range of 500 to 600 need to be inventoried. The area information indicates an area range in which the inventory operation is performed. For example, the area information may be specific longitudes and latitudes, coordinate values, cell identifiers, or other area information, for example, information such as "Shanghai Pudong New Area" or "Building 3". If the area information is included, only a reader located within the area information performs the operation according to the instruction.

If the operation succeeds, the operation result may include the information about the operation requester and/or terminal data. The information about the operation requester is described in S1704 below. The terminal data may include data obtained in a process of performing the first operation on the target terminal, for example, information about a terminal (for example, a tag) obtained through inventorying after the inventory operation is performed, data information obtained from a terminal (for example, a tag) after a read operation is performed and information about a terminal that is successfully read, information about a terminal that is successfully written into information after the write operation is performed, information about a tag that is invalidated after the invalidate operation is performed, and the like. If the operation fails, the operation result indicates that the operation fails. Optionally, the operation result further carries/indicates a failure cause value.

S1703: The reader sends the operation result to the server. Correspondingly, the server receives the operation result.

In a possible implementation, the reader may send the operation result to the server by using the user plane channel. For example, the reader sends the operation result to the server by using the UPF; correspondingly, the server receives the operation result by using the UPF.

In another possible implementation, the reader may send the operation result to the server by using the control plane channel, for example, send the operation result to the server by using the AMF; correspondingly, the server receives the operation result by using the AMF.

S1704: Optionally, the reader obtains a charging rule.

In an example, the reader may obtain the charging rule from another device, and the another device may include any one of an AMF, an SMF, a PCF, a UPF, a CHF, or a server. The AMF is used as an example. A charging rule may be preconfigured on the AMF. The AMF may locally obtain the charging rule in a reader registration procedure or after the reader completes the registration procedure, and send the charging rule to the reader. Alternatively, the AMF may obtain the charging rule from another device, and send the obtained charging rule to the reader in a reader registration procedure or after the reader completes the registration procedure.

The SMF is used as an example. A charging rule may be preconfigured on the SMF. The SMF may obtain the charging rule, and the charging rule is sent to the reader in an N2 process (for example, a (creating NGAP UE-TNLA-bindings) process) during a session establishment process, after a session establishment procedure, during a session modification process, or after a session modification procedure.

In another example, a charging rule may be preconfigured on the reader, and the reader may locally obtain the charging rule.

In this embodiment of this application, the charging rule (charging rule(s)) may indicate to-be-obtained charging information, so that the CHF can perform more reasonable and accurate charging based on the charging information. A network or a network operator may formulate the charging rule based on one or more of a service requirement of the operation requester, subscription information between the operation requester and the operator, and permission control. The charging rule may be preconfigured on a specific device, for example, preconfigured on any one or more of the reader, the AMF, the SMF, the PCF, the UPF, the CHF, or the server. The charging rule may alternatively be obtained from another device. The charging rule may be a set of information or a set of related operations. It should be understood that naming of the charging rule is not limited in this application, and the charging rule may alternatively be named a first rule or another name.

For example, the charging rule may indicate to obtain the charging information, and/or the charging rule may indicate content specifically included in the charging information to be obtained (that is, to indicate which content is to be obtained). For example, the charging rule may indicate to obtain one or more of the following: identification information of one or more terminals on which the first operation is performed, quantity information of the one or more terminals on which the first operation is performed, an accumulated quantity of operation times, an accumulated quantity of operation times that corresponds to the first operation, the information about the operation requester, operation type information, an amount of signaling exchanged in an operation process, an operation performing frequency, a frequency for performing the first operation, and time of obtaining the charging information.

In a possible implementation, when the first operation includes one or more of the inventory operation (or referred to as a stocktaking operation), the read operation, the write operation, and the invalidate operation, the charging rule is configured at a granularity of an operation type. The charging rule corresponds to one or more specific operation types, and the charging rule may vary for different operation types, and may be understood as not a general charging rule. In another possible implementation, when the first operation refers to the passive internet of things operation, the semi-active internet of things operation, the internet of things operation, the passive internet of things tag operation, the semi-active internet of things tag operation, the internet of things tag operation, an RFID operation, and the like, and does not refer to a specific operation type, the charging rule is not configured at a granularity of the operation type. In this case, the charging rule corresponds to a specific application scenario or a specific internet of things technology, and the charging rule may be the same for different operation types in the specific internet of things technology, and may be understood as a general charging rule.

It should be understood that the application scenario/the internet of things technology in this application may include but is not limited to passive internet of things, semi-active internet of things, active internet of things, a passive internet of things tag, a semi-active internet of things tag, an internet of things tag, an active internet of things tag, RFID, and the like. In one application scenario/internet of things technology, there may be a plurality of types of operations, for example, there may be one or more of the following types of operations: an inventory operation (or referred to as a stocktaking operation), a read operation, a write operation, and an invalidate operation.

Optionally, the charging rule further indicates not to perform repeated calculation on a same terminal or indicate to perform repeated calculation on a same terminal. In this embodiment of this application, not performing repeated calculation on a same terminal may be referred to as deduplication.

In a possible implementation, when the charging rule corresponds to a specific operation type, the deduplication may be understood as that when a same operation is repeatedly performed on a same terminal, relative to the operation, a quantity of terminals on which the operation is performed is counted as 1, and/or a quantity of performing times of the operation is counted as 1, and/or identification information of the terminal on which the operation is performed appears once in the charging information, and does not appear repeatedly. Alternatively, the deduplication may be understood as that when a same operation is repeatedly performed on a same terminal within a specific time period (where the operation herein may be the inventory operation, the read operation, the write operation, or the invalidate operation), relative to the operation, a quantity of terminals on which the operation is performed within the time period is counted as 1, and/or a quantity of performing times of the operation within the time period is counted as 1, and/or identification information of the terminal on which the operation is performed appears once in the charging information, and does not appear repeatedly. The specific time period may be understood as time required for performing one time of operation indicated by the instruction or may be specific period of time. A definition of the time period is not limited in this application. For example, in an internet of things scenario, if the inventory operation is repeatedly performed on a tag 1 three times and the read operation is repeatedly performed on the tag 1 twice, during deduplication, a quantity of tags 1 on which the inventory operation is performed is counted as 1, and a quantity of tags 1 on which the read operation is performed is counted as 1.

In another possible implementation, when the charging rule is a general rule, the deduplication may be understood as that when an operation (a same operation or different operations) in a same application scenario/internet of things technology is repeatedly performed on a same terminal, no matter how many times the same operation and/or the different operations is/are repeatedly performed on the terminal, for the terminal, a quantity of terminals on which the operation is performed in the application scenario/internet of things technology is counted as 1, and/or a quantity of performing times of the operation in the application scenario/internet of things technology is counted as 1, and/or identification information of the terminal on which the operation is performed in the application scenario/internet of things technology appears once in the charging information, and does not appear repeatedly. Alternatively, the deduplication may be understood as that when an operation (a same operation or different operations) in a same application scenario/internet of things technology is repeatedly performed on a same terminal within a specific time period, a quantity of terminals on which the operation is performed in the application scenario/internet of things technology within the time period is counted as 1, and/or a quantity of performing times of the operation in the time period is counted as 1, and/or identification information of the terminal on which the operation is performed in the application scenario/internet of things technology in the time period appears once in the charging information, and does not appear repeatedly. The specific time period may be understood as time required for performing one time of operation indicated by the instruction or may be specific period of time. A definition of the time period is not limited in this application. For example, in an internet of things scenario, if the inventory operation is repeatedly performed on a tag 1 three times and the read operation is repeatedly performed on the tag 1 twice, and it is assumed that the first operation is an internet of things operation, even though the operation is performed on the tag 1 five times, for the tag 1, in a deduplication scenario, a quantity of tags 1 on which the internet of things operation is performed (the inventory operation and the read operation are performed) is counted as 1.

In this embodiment of this application, performing repeated calculation on a same terminal may be referred to as non-deduplication. In a possible implementation, the performing repeated calculation on a same terminal may be understood as that when a same operation (where the operation herein may be the inventory operation, the read operation, the write operation, or the invalidate operation) is repeatedly performed on the same terminal, a quantity of terminals on which the operation is performed is equal to a quantity of repetition times, and/or a quantity of performing times of the operation is equal to the quantity of repetition times, and/or identification information of the terminal on which the operation is performed repeatedly appears in the charging information, and a quantity of repeated appearance times is equal to the quantity of repetition times. For example, in an internet of things scenario, if the inventory operation is repeatedly performed on a tag 1 three times and the read operation is repeatedly performed on the tag 1 twice, a quantity of tags 1 on which the inventory operation is performed is counted as 3, and a quantity of tags on which the read operation is performed is counted as 2.

In another possible implementation, the performing repeated calculation on a same terminal may be understood as that when an operation (a same operation or different operations) in a same application scenario/internet of things technology is repeatedly performed on the same terminal, a quantity of terminals on which the operation is performed is equal to a quantity of repetition times, and/or a quantity of performing times of the operation in the application scenario/internet of things technology is equal to the quantity of repetition times, and/or identification information of the terminal on which the operation is performed in the application scenario/internet of things technology repeatedly appears in the charging information, and a quantity of repeated appearance times is equal to the quantity of repetition times. For example, in an internet of things scenario, if the inventory operation is repeatedly performed on a tag 1 three times and the read operation is repeatedly performed on the tag 1 twice, and it is assumed that the first operation is an internet of things operation, a quantity of tags 1 on which the internet of things operation is performed is 3+2=5.

In this embodiment of this application, the terminal may be the tag 101 in FIG. 1, the identification information of the terminal may identify the terminal, and the identification information of the terminal may be understood as identification information of the tag. The identification information may be permanent identification information, globally unique identification information, temporary identification information, or non-globally unique identification information. For example, the identification information of the tag may include an EPC of the tag. The identification information of the terminal may alternatively be understood as identification information of the tag used as the terminal (or of a terminal in which the tag is located or a terminal corresponding to the tag). The identification information of the terminal may include a subscription permanent identifier (SUPI), a subscription concealed identifier (SUCI), a 5G globally unique temporary identity (5G-GUTI), a general public subscription identifier (GPSI), a 5G temporary mobile subscriber identity (5G-TMSI), a temporary mobile subscriber identity (TMSI), an international mobile subscriber identity (IMSI), an international mobile equipment identity (IMEI), or a permanent equipment identifier (PEI).

In this embodiment of this application, the quantity information of the one or more terminals on which the first operation is performed may be understood as a quantity of the one or more terminals on which the first operation is performed. The quantity of the one or more terminals may be obtained based on a quantity of times for performing the first operation on the terminals. For example, during deduplication, even though the operation is repeatedly performed on the terminal a plurality of times, a terminal quantity is counted as 1. When deduplication is not performed or non-deduplication is performed, the quantity of the one or more terminals is equal to a quantity of times for repeatedly performing the operation.

In this embodiment of this application, an accumulated quantity of operation times may be understood as a quantity of times for performing the operation within a period of time. The accumulated quantity of operation times that corresponds to the first operation may be understood as a quantity of times of for performing the first operation within a period of time.

In this embodiment of this application, the operation type information may indicate the operation type/operation. The operation type/operation in this application may include one or more of the inventory operation (or referred to as a stocktaking operation), the read operation, the write operation, and the invalidate operation. It should be understood that the operation type introduced in this embodiment of this application is used to describe the technical solution in this embodiment of this application more clearly, and does not constitute a limitation on the technical solution provided in this embodiment of this application, and another operation type may be included in addition to the operation type described in this application. For example, a person of ordinary skill in the art may know that with evolution of a network architecture and emergence of a new service scenario, the technical solution provided in this embodiment of this application are also applicable to another new operation type.

In this embodiment of this application, the operation performing frequency may be a quantity of times for performing an operation within a period of time, or a ratio of a quantity of times for performing an operation within a period of time to total duration of the period of time. The frequency for performing the first operation may be a quantity of times for performing the first operation within a period of time, or a ratio of a quantity of times for performing the first operation within a period of time to total duration of the period of time.

In this embodiment of this application, obtaining time of the charging information may be indicated by using start time of obtaining the charging information and end time of obtaining the charging information, may be indicated by using start time and duration of obtaining the charging information, or may be indicated by using duration and end time of obtaining the charging information. In another possible implementation, the obtaining time of the charging information may be represented by specific time. For example, a preset time period after the time is the obtaining time of the charging information. Alternatively, a preset time period before the time is the obtaining time of the charging information. A representation manner of the obtaining time of the charging information is not limited in this application. For example, the obtaining time of the charging information may be {start time 9:00, end time 10:00}, may be {start time 9:00, duration 1 hour}, or may be {end time 10:00, duration 1 hour}.

In this embodiment of this application, the operation requester may be referred to as a requester. The operation requester may be understood as a device sending the operation instruction. For example, the operation requester may be a server (for example, an internet of things server), an application function (AF), or another device sending the operation instruction. The operation requester may correspond to a specific type of user. The specific type of user includes an enterprise, a tenant, a third party, or a company, and this is not limited. That the operation requester corresponds to a specific type of user may be understood as that the operation requester belongs to this type of user and is managed by this type of user. The information about the operation requester may indicate the operation requester and/or a terminal corresponding to the operation requester. The terminal corresponding to the operation requester may be understood as a terminal that the operation requester is allowed to operate or a terminal allowed to perform an operation indicated by the operation requester.

Specifically, the information of the operation requester may include: name information of the operation requester (for example, a name of the server or the application function, or a name of the company/enterprise/third party), identification information of the operation requester (for example, an identifier of the server or the application function, or code name or code of the company/enterprise/third party), data network name (DNN) information corresponding to the operation requester, slice information corresponding to the operation requester (for example, network slice selection assistance information (NSSAI) or single network slice selection assistance information (S-NSSAI)), address information of the operation requester (for example, address information of the server or the application function), port information of the operation requester (for example, port information of the server or the application function, where the port information may include a port ID and/or port status information, and the like), identification information of the one or more terminals corresponding to the operation requester (for example, identification information of one or more terminals that the server or the application function is allowed to operate). The data network name information may indicate a data network (DN) corresponding to the operation requester. The address information of the operation requester may include, but is not limited to, an internet protocol (IP) address or a media access control (MAC) address. The terminal corresponding to the operation requester may include a terminal belonging to the operation requester or a terminal managed by the operation requester, or include a terminal on which an operation requested by the operation requester is allowed to perform.

Further, as shown in S1705 and S1706, the reader may obtain the charging information according to the charging rule, and send the charging information to the CHF by using a device supporting a CTF. That is, it may be understood as that the reader may directly obtain, according to the charging rule, information finally used for charging by the CHF. Alternatively, as shown in S1707 to S1709, the reader obtains the charging related information according to the charging rule, and sends the charging related information to a device capable of obtaining the charging information or capable of deduplication and integration. Further, when repeated information exists in the charging related information, the device obtains the charging information based on the charging related information sent by the reader, and sends the charging information to the CHF, or sends the charging information to the CHF by using a device supporting a CTF. That is, it may be understood as that the reader obtains, according to the charging rule, intermediate information (or referred to as initial information) used to obtain/acquire the charging information.

It should be understood that the charging information and the charging related information in this application may be the same or different. When the charging related information is different from the charging information, the charging related information may be understood as information used to obtain the charging information, and may be original information that is not integrated or processed, or the intermediate information partially integrated and processed before the charging information is obtained. In addition, naming of the charging information and naming of the charging related information are not limited in this application. The charging information may alternatively be named charging data, and the charging related information may alternatively be named charging-related data.

S1705: The reader obtains the charging information.

The charging information may include/indicate one or more parameters of identification information of one or more terminals on which the first operation is performed, quantity information of the one or more terminals on which the first operation is performed, operation type information corresponding to the first operation, an accumulated quantity of operation times, an accumulated quantity of operation times that corresponds to the first operation, an operation performing frequency, a frequency for performing the first operation, an amount of signaling exchanged in a process of performing the first operation, and an operation requester that performs the first operation.

It should be understood that, when the first operation is one or more specific operations specified in the inventory operation, the read operation, the write operation, and the invalidate operation, the charging information may be specific to a specific operation type. When the first operation is the foregoing internet of things operation, that is, the specific operation type is not considered, and the charging information does not correspond to the operation type, the charging information is used for related information of the terminals on which the operation is performed.

Optionally, when S1704 is performed, the reader may obtain the charging information according to the charging rule. It should be understood that the obtaining the charging information according to the charging rule in this application may be obtaining a parameter or data indicated by the charging rule, and/or obtaining a parameter or data related to a parameter indicated by the charging rule. For example, it is assumed that the charging rule indicates to obtain identification information of a tag on which the inventory operation is performed. In this case, the charging information obtained according to the charging rule may include a tag {tag 1, tag 2} on which the inventory operation is performed and/or a quantity 2 of tags on which the inventory operation is performed.

For example, that the reader obtains the charging information according to the charging rule may include: When the charging rule indicates to obtain the identification information of the one or more terminals on which the first operation is performed, the reader obtains, based on the operation result, the identification information of the one or more terminals on which the first operation is performed. Further, if the charging rule further indicates to perform deduplication, the identification information of the one or more terminals on which the first operation is performed is deduplicated, so that the obtained charging information does not include identification information of repeated/a plurality of same terminals. When the charging rule indicates to obtain the quantity information of the one or more terminals on which the first operation is performed, the reader obtains the quantity information of the one or more terminals on which the first operation is performed based on the operation result.

Further, if the charging rule further indicates to perform deduplication, deduplication is performed on the terminals on which the first operation is performed, and a same terminal on which the operation is repeatedly performed is not calculated based on a quantity of operation times a plurality of times, but is counted as 1. When the charging rule indicates to obtain the accumulated quantity of operation times, the reader collects statistics on a total quantity of times for performing the operation within a period of time based on the operation result, to obtain the accumulated quantity of operation times.

When the charging rule indicates to obtain the accumulated quantity of operation times that corresponds to the first operation, the reader collects statistics, based on the operation result, on a total quantity of times for performing the first operation within a period of time, to obtain the accumulated quantity of operation times that corresponds to the first operation.

When the charging rule indicates to obtain the operation type information, the reader collects statistics on an operation type based on the operation result.

When the charging rule indicates to obtain the information about the operation requester, the reader collects statistics on the information about the operation requester based on the operation result, for example, obtains the information about the operation requester from the operation result.

When the charging rule indicates to obtain the amount of signaling exchanged in the operation process, the reader obtains the amount of signaling exchanged in the operation process based on an amount of signaling that needs to be sent and/or received in completion of the operation process indicated by the operation instruction sent by the server. The amount of signaling exchanged in the operation process may be equal to the amount of sent signaling, may be equal to the amount of received signaling, or may be equal to a sum of the amount of sent signaling and the amount of received signaling. For example, the operation instruction indicates to perform the inventory operation on a tag 1 to a tag 50, and 10 pieces of signaling need to be sent and 5 pieces of signaling need to be received to complete the process. In this case, an amount of signaling exchanged in the operation process is counted as 10, 5, or 15, depending on whether the amount of signaling is the amount of sent signaling, the amount of received signaling, or the amount of sent and received signaling. When the charging rule indicates to obtain the operation performing frequency, the reader collects statistics on the operation performing frequency based on the operation result.

When the charging rule indicates to obtain the frequency for performing the first operation, the reader collects statistics on the frequency for performing the first operation based on the operation result.

When the charging rule indicates to obtain the obtaining time of the charging information, the reader obtains the obtaining time of the charging information based on information such as the start time and the end time of obtaining the charging information by the reader.

For example, the reader may inventory tags in a specific time period in an inventory operation process, and obtain two operation results, namely, an operation result 1 {inventory operation, tag 1, tag 3, tag 4}, and an operation result 2 {inventory operation, tag 1, tag 2, tag 3, tag 5}. If the charging rule indicates not to perform deduplication, the charging information includes {inventory operation, identification information {tag 1, tag 3, tag 4, tag 1, tag 2, tag 3, tag 5} of terminals on which the inventory operation is performed, quantity information of the terminals on which the inventory operation is performed being 7}. If the charging rule indicates to perform deduplication, the reader removes the tag 1 and the tag 3 that are repeatedly calculated from the two operation results, where the charging information includes {inventory operation, identification information {tag 1, tag 2, tag 3, tag 4, tag 5} of terminals on which the inventory operation is performed, quantity information 5 of the terminals on which the inventory operation is performed}.

S1706: The reader sends the charging information to the CHF by using the device supporting the CTF.

For example, as shown in FIG. 17, the reader supports the CTF. In this case, the reader may be considered as the device supporting the CTF, and the reader may directly send the charging information to the CHF.

For another example, it is assumed that the reader does not have a function of supporting the CTF, but the AMF supports the CTF, and the AMF is a device supporting the CTF. In this case, the reader may send the charging information to the AMF, and the AMF sends the charging information to the CHF.

S1707: The reader obtains the charging related information, and sends the charging related information to a first device. Correspondingly, the first device receives the charging related information. Optionally, when S1704 is performed, the reader may obtain the charging related information according to the charging rule.

As described above, the charging related information may be information used to obtain the charging information/acquire the charging information through calculation. The charging related information may include/indicate one or more of identification information of one or more terminals on which a first operation is performed, quantity information of the one or more terminals on which the first operation is performed, operation type information corresponding to the first operation, an accumulated quantity of operation times, an accumulated quantity of operation times that corresponds to the first operation, an operation performing frequency, a frequency for performing the first operation, an amount of signaling exchanged in a process of performing the first operation, and an operation requester that performs the first operation. It should be understood that the identification information, indicated by the charging related information, of the one or more terminals on which the first operation is performed may be deduplicated identification information of one or more terminals, or may be identification information of terminals that are not deduplicated. The quantity information, indicated by the charging related information, of the one or more terminals on which the first operation is performed may be deduplicated quantity information of one or more terminals, or may be quantity information of terminals that are not deduplicated.

It should be understood that the one or more readers in this application may obtain the charging related information according to the charging rule, and the one or more readers may send the charging related information obtained by the one or more readers to a first device corresponding to the one or more readers. The first device may receive charging related information sent by one or more readers managed/served by the first device.

As shown in FIG. 17, the first device is an AMF. In this case, the reader sends the charging related information to the AMF.

S1708: The AMF obtains the charging information based on the received charging related information.

It should be understood that the charging related information received by the AMF is charging related information sent by one or more readers.

For example, that the AMF obtains the charging information based on the received charging related information may include: The AMF deduplicates identification information and/or quantity information of one or more terminals on which the first operation is repeatedly performed in the charging related information sent by the one or more readers, and uses deduplicated information as the charging information.

In a possible implementation, the identification information, indicated by the charging related information, of the terminal on which the first operation is performed may be deduplicated identification information of terminals on which the first operation is performed, and the quantity information, indicated by the charging related information, of the terminal on which the first operation is performed may be deduplicated quantity information of terminals on which the first operation is performed. In this case, repeated/same information exists in the charging related information sent by the one or more readers, and the AMF deduplicates identification information and quantity information of the one or more terminals that are repeatedly calculated in the charging related information sent by the one or more readers, and integrates deduplicated charging related information as the charging information. For example, if identification information of one terminal appears in all N pieces of charging related information, and N is an integer greater than or equal to 2, N−1 pieces of identification information are deduplicated, and (N−1) is subtracted from quantity information of the one or more terminals on which the first operation is performed.

For example, it is assumed that one piece of charging related information sent by a first reader indicates {inventory operation, tag 1, tag 3, tag 4, quantity information of terminals being 3}, and one piece of charging related information sent by a second reader indicates {inventory operation, tag 1, tag 2, tag 3, tag 5, quantity information of the terminals being 4}. The tag 1 and the tag 3 exist within coverage of both the first reader and the second reader. The AMF removes the tag 1 and the tag 3 that are repeatedly calculated from the two pieces of charging related information, and integrates the tag 1, the tag 2, the tag 3, the tag 4, and the tag 5 after the deduplication, to obtain quantity information 5 of tags on which the inventory operation is performed, and further obtain the charging information as {inventory operation, tag 1, tag 2, tag 3, tag 4, tag 5, quantity information of terminals being 5}.

In another possible implementation, the identification information, indicated by the charging related information, of the terminal on which the first operation is performed is identification information of terminals that are not deduplicated, and the quantity information, indicated by the charging related information, of the terminal on which the first operation is performed is quantity information of terminals that are not deduplicated. In this case, repeated/same information exists in the charging related information sent by the reader, and the AMF deduplicates identification information and quantity information of the one or more terminals that are repeatedly calculated in the charging related information sent by the one or more readers. Further, if repeated/same information still exists in deduplicated charging related information corresponding to the one or more readers, the AMF may further deduplicate identification information and quantity information of the one or more terminals that are repeatedly calculated in the deduplicated charging related information corresponding to the one or more readers, and integrates the deduplicated charging related information as the charging information. Alternatively, the AMF may not deduplicate identification information and quantity information of the one or more terminals that are repeatedly calculated in the deduplicated charging related information corresponding to the one or more readers.

For example, it is assumed that one piece of charging related information sent by a first reader indicates {inventory operation, tag 1, tag 3, tag 4, tag 3, quantity information of terminals being 4}, and one piece of charging related information sent by a second reader indicates {inventory operation, tag 1, tag 2, tag 3, tag 5, tag 1, tag 3, quantity information of terminals being 6}. In this case, the AMF deduplicates the charging related information sent by the first reader to obtain {inventory operation, tag 1, tag 3, tag 4, quantity information of terminals being 3}, and deduplicates the charging related information sent by the second reader to obtain {inventory operation, tag 1, tag 2, tag 3, tag 5, quantity information of terminals being 4}. Both the tag 1 and the tag 3 still exist in the two pieces of deduplicated charging related information. The AMF removes the tag 1 and the tag 3 that are repeatedly calculated from the two pieces of deduplicated charging related information, and obtains the charging information as {inventory operation, tag 1, tag 2, tag 3, tag 4, tag 5, quantity information of terminals being 5}.

S1709: The AMF sends the charging information to the CHF by using the device supporting the CTF. Correspondingly, the CHF receives the charging information by using the device supporting the CTF.

For example, as shown in FIG. 17, the AMF supports the CTF. In this case, the AMF may be considered as the device supporting the CTF, and the AMF may directly send the charging information to the CHF.

For another example, it is assumed that the AMF does not have a function of supporting the CTF, but the SMF supports the CTF, and the SMF is the device supporting the CTF. In this case, the AMF may send the charging information to the SMF, and the SMF sends the charging information to the CHF.

Further, the CHF may create a CDR based on the charging information.

Based on the method shown in FIG. 17, information related to internet of things is obtained by the reader or the AMF for charging. For example, the charging is performed based on the operation type information, the quantity (a quantity after repeated calculation or deduplication) of the one or more terminals on which the operation is performed, the identification information (identification information that may be repeated or is deduplicated) of the one or more terminals on which the operation is performed, the amount of signaling exchanged in the operation process, the operation frequency information, information about the accumulated quantity of operation times, and information about the operation requester (identifying which operation requester is requesting the operation). Because the charging information is more comprehensive and specific, the charging is more reasonable and accurate. Further, optionally, a deduplication operation is further performed on the charging related information, to avoid repeated charging.

The foregoing embodiment shown in FIG. 17 describes a process of obtaining the charging information in the scenario shown in FIG. 16*a*. Alternatively, in this application, a user plane device (for example, the UPF) may obtain the charging information and send the charging information to the CHF. Specifically, the method may be described with reference to FIG. 18A and FIG. 18B below.

Figure 18A:
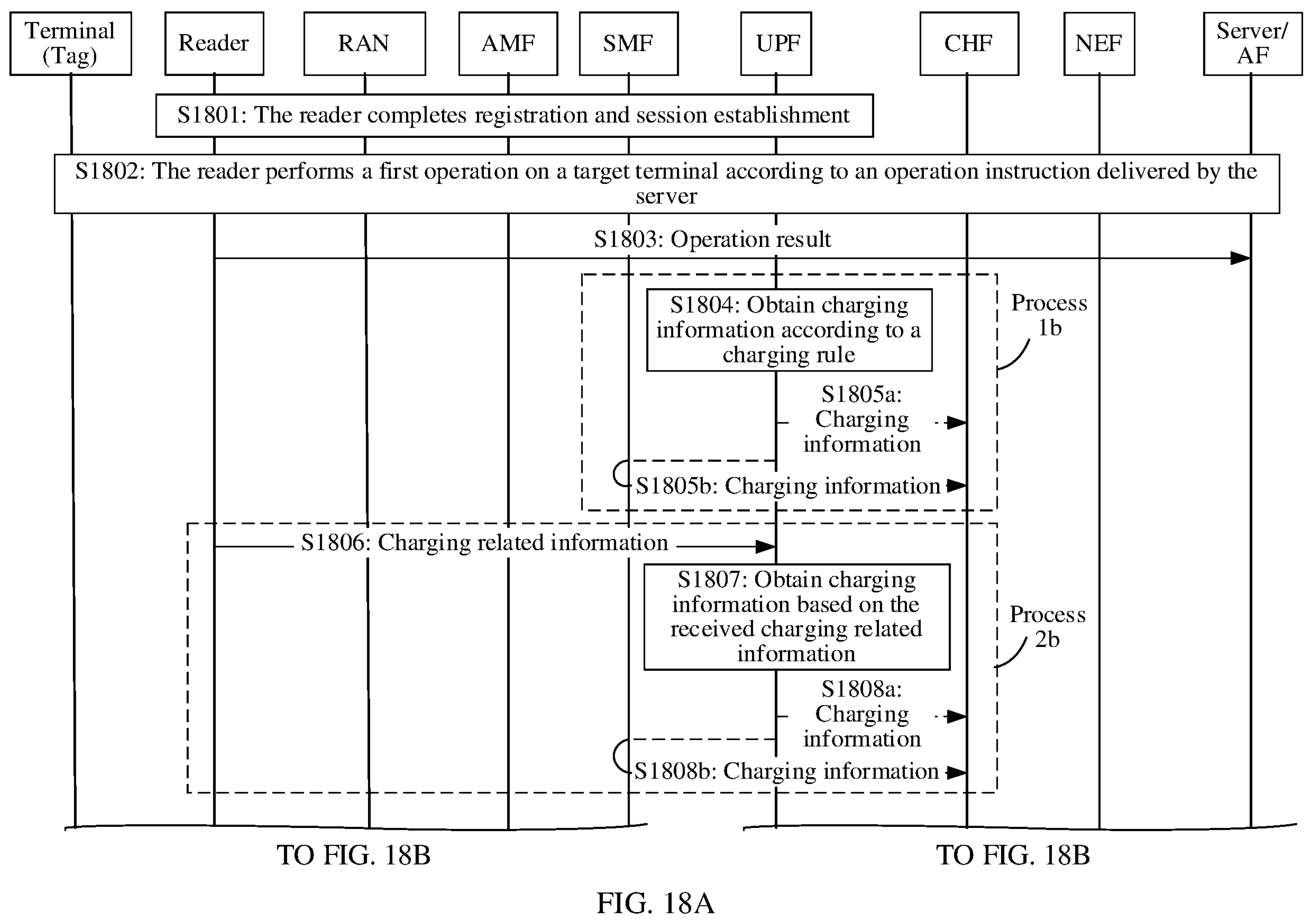
FIG. 18A and FIG. 18B are a second flowchart of a charging method according to an embodiment of this application.
Figure 18B:
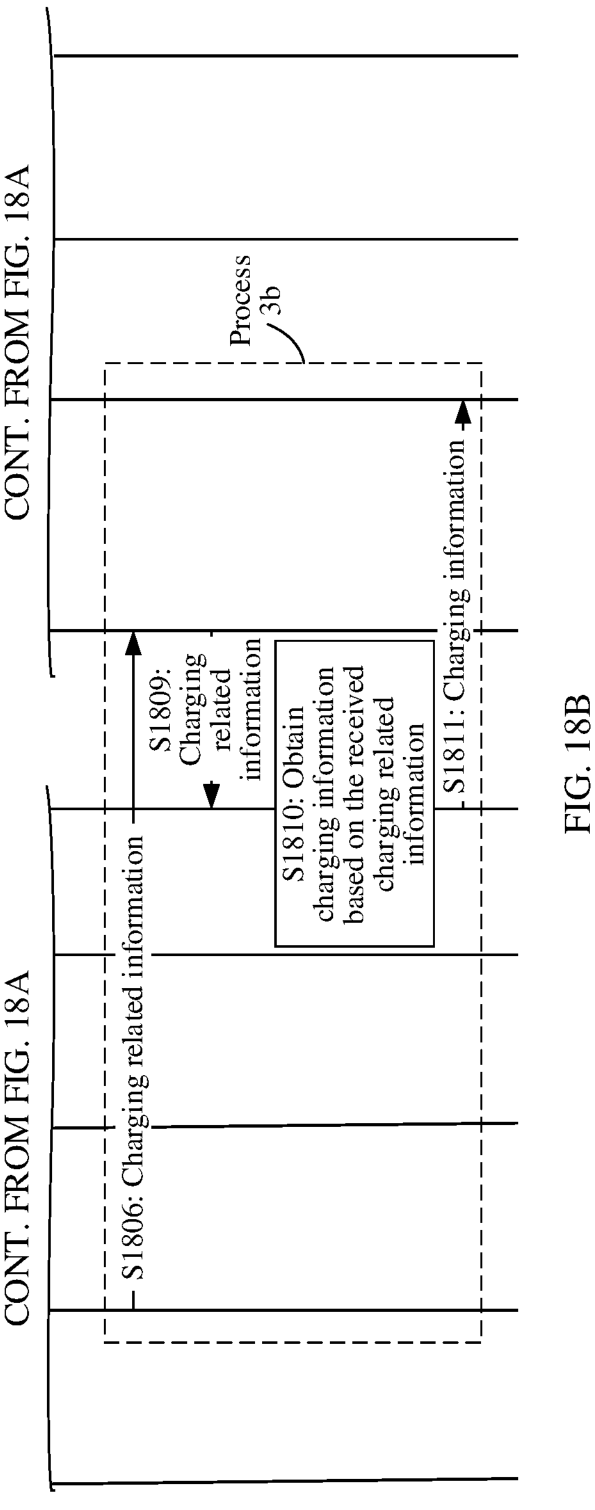

FIG. 18A and FIG. 18B show another charging method according to an embodiment of this application. The method is applicable to the scenario shown in FIG. 16*b*. A UPF may obtain charging information according to a charging rule, or the UPF may obtain, based on charging related information obtained from a reader, charging information finally used for charging by a CHF. The method may include:

S1801: The reader completes registration and session establishment.

The registration may be network registration, and the session establishment may be establishment of a user plane channel of the reader, for example, establishment of a connection between the reader and a RAN (for example, establishment of an air interface resource or a wired connection), an N3 tunnel between the RAN and the UPF, and an N6 connection established between the UPF and a data network.

S1802: The reader performs a first operation on a target terminal according to an operation instruction delivered by a server.

S1802 is the same as S1702, and details are not described again.

S1803: The reader sends an operation result to the server through the user plane channel. For example, the reader sends the operation result to the server by using the UPF; correspondingly, the server receives the operation result by using the UPF.

S1803 is the same as S1703, and details are not described again.

Further, after the operation is completed, a process 1*b*, namely, S1804 and S1805 (for example, S1805*a* or S1805*b*), is performed, where the UPF obtains the charging information, and sends the charging information to the CHF. Alternatively, a process 2*b*, namely, S1806 to S1808 (for example, S1808*a* or S1808*b*), is performed, where the UPF obtains the charging related information from the reader, deduplicates and integrates the obtained charging related information to obtain the charging information, and sends the charging information to the CHF. Alternatively, a process 3*b*, namely, S1806 and S1809 to S1811, is performed, where the UPF obtains the charging related information from the reader, and sends the charging related information to another device to deduplicate and integrate the charging related information, so that the another device sends the deduplicated and integrated charging information to the CHF.

S1804: The UPF obtains the charging information. In a possible implementation, the UPF obtains the charging information according to the charging rule.

For related descriptions of the charging rule and the charging related information, refer to the descriptions in the embodiment shown in FIG. 17. For a method for obtaining the charging related information by the UPF according to the charging rule, refer to the process in which the reader obtains the charging information according to the charging rule in the embodiment shown in FIG. 17. Details are not described again.

For example, the charging rule may be preconfigured on the UPF. Alternatively, the UPF may obtain the charging rule from another device, for example, obtain the charging rule from the reader, a control plane device (an AMF, an SMF, an NEF, or the CHF), the UPF, the server, or the RAN.

S1805: The UPF sends the charging information to the CHF.

In a possible implementation, as shown in S1805*a* in FIG. 18A, when the UPF has a CTF (or the UPF supports the CTF), the UPF sends the charging information to the CHF. In another possible implementation, as shown in S1805*b*, the SMF has a CTF (or the SMF supports the CTF), and the UPF sends the charging information to the CHF by using the SMF.

S1806: The reader obtains the charging related information according to the charging rule, and the reader sends the charging related information to the UPF. Correspondingly, the UPF receives the charging related information.

It should be understood that the UPF may manage/serve one or more readers, and the UPF may receive charging related information sent by the one or more readers managed/served by the UPF.

Further, after obtaining the charging related information sent by the one or more readers, the UPF may have different processing manners, which are respectively the following processing manners of S1807 and S1808 (for example, S1808*a* or S1808*b*) or processing manners of S1809 to S1811.

S1807: The UPF obtains the charging information based on the received charging related information.

In a possible implementation, the UPF may deduplicate the charging related information sent by the one or more readers, to avoid repeated calculation. (For example, the charging rule indicates not to perform repeated calculation on a same tag or a same terminal, or not to perform repeated calculation on a same tag or a same terminal in an operation process indicated by a same instruction.)

For example, a specific tag or a specific terminal may be located within coverage of a plurality of readers (that is, at an intersection of coverage of two or more readers). In this case, the tag may be simultaneously inventoried by the plurality of readers. Therefore, the two or more readers may obtain identification information of the tag. After receiving the charging related information that is sent by the one or more readers and that carries the identification information of the same tag, the UPF may deduplicate the identification information of the tag.

S1808: The UPF sends the charging information to the CHF.

In a possible implementation, as shown in S1808*a* in FIG. 18A, the UPF has a CTF or the UFP supports the CTF, and the UPF sends the charging information to the CHF. In another possible implementation, as shown in S1808*b*, the SMF has a CTF or the SMF supports the CTF, and the UPF sends the charging information to the CHF by using the SMF.

S1809: The UPF sends the charging related information to the SMF. Correspondingly, the SMF receives the charging related information.

It should be understood that, that the UPF sends the charging related information to the SMF shown in FIG. 18A and FIG. 18B is used as an example for description, and the UPF may alternatively send the charging related information to another device that has a capability of obtaining the charging information, for example, send the charging related information to the NEF, the CHF, the server, or the like, so that these devices are enabled to deduplicate and integrate the charging related information to obtain the charging information.

S1810: The SMF obtains the charging information based on the charging related information sent by the UPF.

The SMF may further deduplicate charging information sent by one or more UPFS. For example, a specific tag or a specific terminal may be within coverage of two readers (that is, the coverage of the two readers has an intersection), and UPFs serving the two readers are different UPFs. Therefore, charging related information sent by the two UPFs to the SMF may include identification information of the same tag. After receiving the charging related information that is sent by the one or more UPFs and that carries the identification information of the same tag, the SMF may deduplicate the identification information of the tag.

Specifically, for related descriptions and examples related to the deduplication in the embodiment shown in FIG. 18A and FIG. 18B, reference may be made to the descriptions in FIG. 17. Details are not described again.

S1811: The SMF sends the charging information to the CHF. Correspondingly, the CHF receives the charging information.

Optionally, after the CHF receives charging information sent by one or more devices (for example, the reader, the UPF, the SMF, or the AMF described above), if repeated information exists in the charging information sent by the one or more devices in a same operation area, further, the CHF may further deduplicate the charging information sent by the one or more other devices, to avoid repeated charging or inaccurate charging caused by the repeated information. For example, a specific tag or a specific terminal may be within coverage of two readers (that is, the coverage of the two readers has an intersection), and AMFs serving the two readers are different AMFs. Therefore, charging information sent by the two AMFs to the CHF may include tag information of the same tag. The CHF may deduplicate the charging information.

Further, the CHF may create a CDR based on the charging information.

Based on the method shown in FIG. 18A and FIG. 18B, information related to internet of things is obtained by the UPF or the SMF for charging. For example, the charging is performed based on operation type information, a quantity (a quantity after repeated calculation or deduplication) of one or more terminals on which the operation is performed, identification information (identification information that may be repeated or is deduplicated) of the one or more terminals on which the operation is performed, an amount of signaling exchanged in the operation process, operation frequency information, information about an accumulated quantity of operation times, and information about an operation requester (identifying which operation requester is requesting the operation). Because the charging information is more comprehensive and specific, the charging is more reasonable and accurate. Further, optionally, a deduplication operation is further performed on the charging related information, to avoid repeated charging.

The foregoing embodiment shown in FIG. 17 describes a process of obtaining the charging information in the scenario shown in FIG. 16*a*. The foregoing embodiment shown in FIG. 18A and FIG. 18B describes a process of obtaining the charging information in the scenario shown in FIG. 16*b*. Alternatively, in this application, a control plane device (for example, the AMF) may obtain the charging information and send the charging information to the CHF. Specifically, the method may be described with reference to FIG. 19A and FIG. 19B below.

Figure 19A:
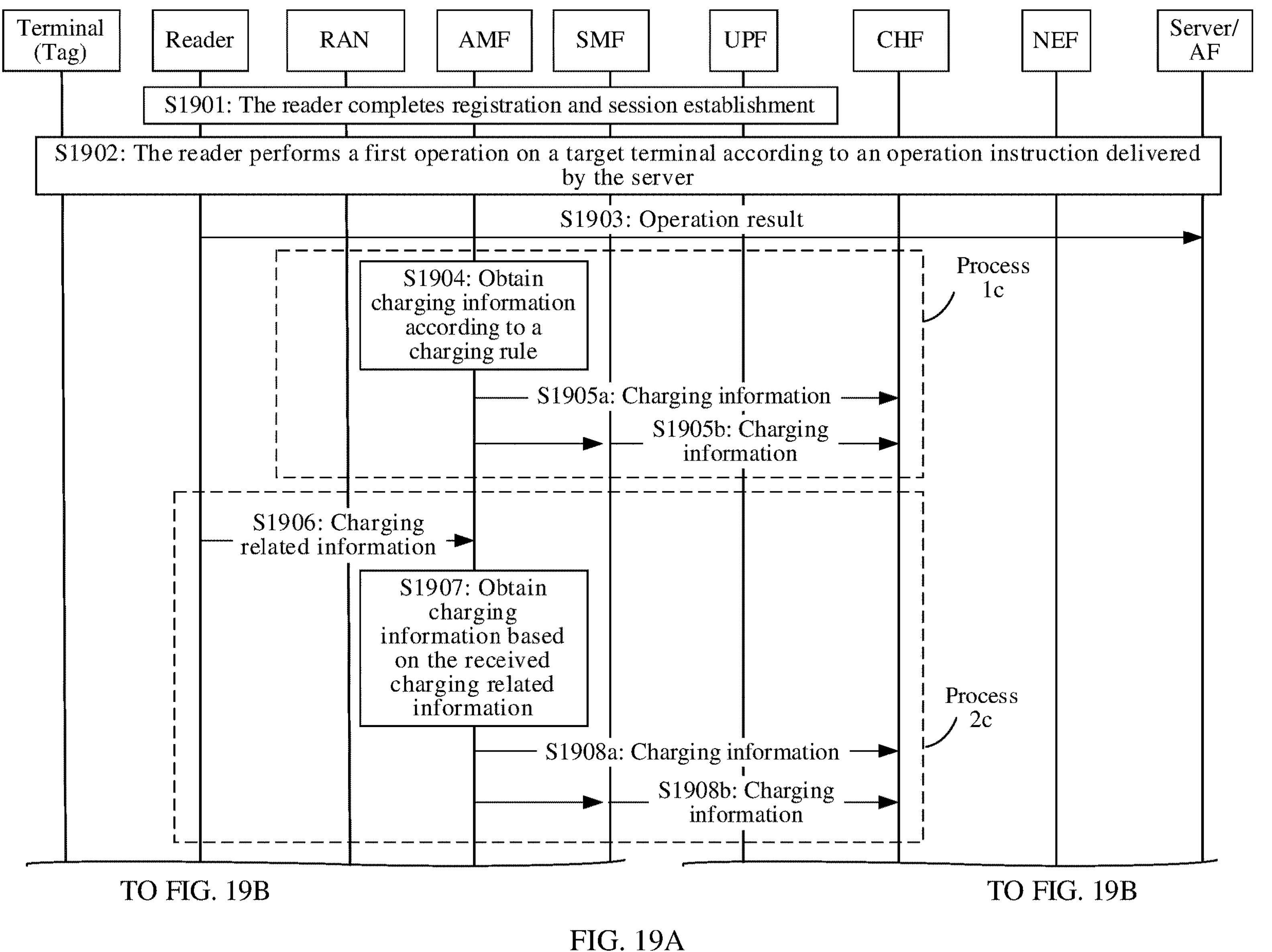
FIG. 19A and FIG. 19B are a third flowchart of a charging method according to an embodiment of this application.
Figure 19B:
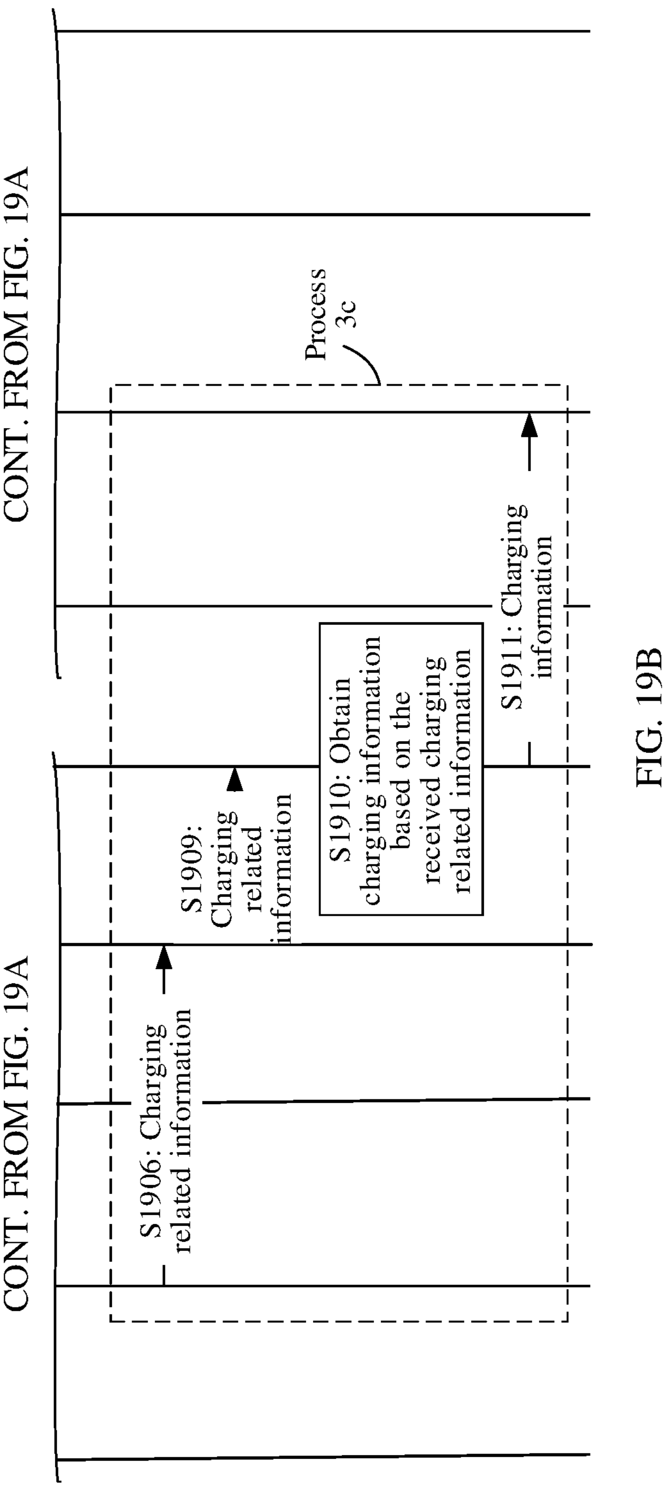

FIG. 19A and FIG. 19B show still another charging method according to an embodiment of this application. The method is applicable to the scenario shown in FIG. 16*c*. An AMF may obtain charging information according to a charging rule, or the AMF may obtain, based on charging related information obtained from a reader, charging information finally used for charging by a CHF. The method may include:

S1901: The reader completes registration and session establishment.

The registration may be network registration, and the session establishment may be establishment of a user plane channel of the reader, for example, establishment of a connection between the reader and a RAN (for example, establishment of an air interface resource or a wired connection), an N3 tunnel between the RAN and a UPF, and a connection between the UPF and a data network.

S1902: The reader performs a first operation on a terminal according to an operation instruction delivered by a server.

S1902 is the same as S1702, and details are not described again.

S1903: The reader sends an operation result to the server through the user plane channel. For example, the reader sends the operation result to the server by using the AMF; correspondingly, the server receives the operation result by using the AMF.

S1903 is the same as S1703, and details are not described again.

Further, after the operation is completed, a process 1*c*, namely, S1904 and S1905 (for example, S1905*a* or S1905*b*), is performed, where the AMF obtains the charging information, and sends the charging information to the CHF. Alternatively, a process 2*c*, namely, S1906 to S1908 (for example, S1908*a* or S1908*b*), is performed, where the AMF obtains the charging related information from the reader, deduplicates and integrates the obtained charging related information to obtain the charging information, and sends the charging information to the CHF. Alternatively, a process 3*c*, namely, S1906 and S1909 to S1911, is performed, where the AMF obtains the charging related information from the reader, and sends the charging related information to another device to deduplicate and integrate the charging related information, so that the another device sends the deduplicated and integrated charging information to the CHF.

S1904: The AMF obtains the charging information. In a possible implementation, the AMF obtains the charging information according to the charging rule.

For related descriptions of the charging rule and the charging related information, refer to the descriptions in the embodiment shown in FIG. 17. For a method for obtaining the charging related information by the AMF according to the charging rule, refer to the process in which the reader obtains the charging information according to the charging rule in the embodiment shown in FIG. 17. Details are not described again.

For example, the charging rule may be preconfigured on the AMF. Alternatively, the AMF may obtain the charging rule from another device, for example, obtain the charging rule from the reader, a control plane device (an SMF, an NEF, or the CHF), the UPF, the server, or the RAN.

S1905: The AMF sends the charging information to the CHF.

In a possible implementation, as shown in S1905*a* in FIG. 19A, the AMF has a CTF or the AMF supports the CTF, and the AMF sends the charging information to the CHF. In another possible implementation, as shown in S1905*b*, the SMF has a CTF or the SMF supports the CTF, and the AMF sends the charging information to the CHF by using the SMF.

S1906: The reader may obtain the charging related information according to the charging rule, and the reader sends the charging related information to the AMF. Correspondingly, the AMF receives the charging related information.

It should be understood that the AMF may manage/serve one or more readers, and the AMF may receive charging related information sent by the one or more readers managed/served by the AMF.

Further, after obtaining the charging related information sent by the one or more readers, the AMF may perform different processing manners, which are respectively the following processing manners of S1907 and S1908 or processing manners of S1909 to S1911.

S1907: The AMF obtains the charging information based on the received charging related information.

In a possible implementation, the AMF may deduplicate the charging related information sent by the one or more readers, to avoid repeated calculation. (For example, the charging rule indicates not to perform repeated calculation on a same tag, or not to perform repeated calculation on a same tag in an operation process indicated by a same instruction.)

For example, a specific tag or a specific terminal may be located within coverage of a plurality of readers (that is, at an intersection of coverage of two or more readers). In this case, the tag or the terminal may be simultaneously inventoried by the plurality of readers. Therefore, the two or more readers may obtain identification information of the tag or the terminal. After receiving the charging related information that is sent by the one or more readers and that carries the identification information of the same tag or the same terminal, the AMF may deduplicate the identification information of the tag.

S1908: The AMF sends the charging information to the CHF.

In a possible implementation, as shown in S1908*a* in FIG. 19A, the AMF has a CTF or the AMF supports the CTF, and the AMF sends the charging information to the CHF. In another possible implementation, as shown in S1908*b*, the SMF has a CTF or the SMF supports the CTF, and the AMF sends the charging information to the CHF by using the SMF.

S1909: The AMF sends the charging related information to the SMF. Correspondingly, the SMF receives the charging related information.

It should be understood that, that the AMF sends the charging related information to the SMF shown in FIG. 19A and FIG. 19B is used as an example for description, and the AMF may alternatively send the charging related information to another device that has a capability of obtaining the charging information, for example, send the charging related information to the NEF, the CHF, the server, or the like, so that these devices are enabled to deduplicate and integrate the charging related information to obtain the charging information.

S1910: The SMF obtains the charging information based on the charging related information sent by the AMF.

The SMF may further deduplicate charging information sent by one or more AMFs. For example, a specific tag or a specific terminal may be within coverage of two readers (that is, the coverage of the two readers has an intersection), and AMFs serving the two readers are different AMFs. Therefore, charging related information sent by the two AMFs to the SMF may include identification information of the same tag or the same terminal. After receiving the charging related information that is sent by the one or more AMFs and that carries the identification information of the same tag or the same terminal, the SMF may deduplicate the identification information of the tag or the terminal.

Specifically, for related descriptions and examples related to the deduplication in the embodiment shown in FIG. 19A and FIG. 19B, reference may be made to the descriptions in FIG. 17. Details are not described again.

S1911: The SMF sends the charging information to the CHF.

Optionally, after the CHF receives charging information sent by one or more devices (for example, the reader, the UPF, the SMF, or the AMF described above), if repeated information exists in the charging information sent by the one or more devices in a same operation area, further, the CHF may further deduplicate the charging information sent by the one or more other devices, to avoid repeated charging or inaccurate charging caused by the repeated information. For example, a specific tag or a specific terminal may be within coverage of two readers (that is, the coverage of the two readers has an intersection), and AMFs serving the two readers are different AMFs. Therefore, charging information sent by the two AMFs to the CHF may include identification information of the same tag or the same terminal. The CHF may deduplicate the charging information.

Further, the CHF may create a CDR based on the charging information.

Based on the method shown in FIG. 19A and FIG. 19B, information related to internet of things is obtained by the AMF or the SMF for charging. For example, the charging is performed based on operation type information, a quantity (a quantity after repeated calculation or deduplication) of one or more terminals on which the operation is performed, identification information (identification information that may be repeated or is deduplicated) of the one or more terminals on which the operation is performed, an amount of signaling exchanged in the operation process, operation frequency information, information about an accumulated quantity of operation times, and information about an operation requester (identifying which operation requester is requesting the operation). Because the charging information is more comprehensive and specific, the charging is more reasonable and accurate. Further, optionally, a deduplication operation is further performed on the charging related information, to avoid repeated charging.

The foregoing mainly describes the solutions provided in embodiments of this application from a perspective of interaction between the network elements. Correspondingly, an embodiment of this application further provides a communication apparatus. The communication apparatus may be the middleware in the foregoing method embodiment, an apparatus including the foregoing functions of the middleware, or a component that can be used in the middleware. Alternatively, the communication apparatus may be the RAN in the foregoing method embodiment, an apparatus including the foregoing functions of the RAN, or a component that can be used in the RAN. It may be understood that, to implement the foregoing functions, the communication apparatus includes a hardware structure and/or a software module for performing a corresponding function. A person skilled in the art should be easily aware that, in combination with units and algorithm steps in the examples described in embodiments disclosed in this specification, this application can be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

Figure 20:
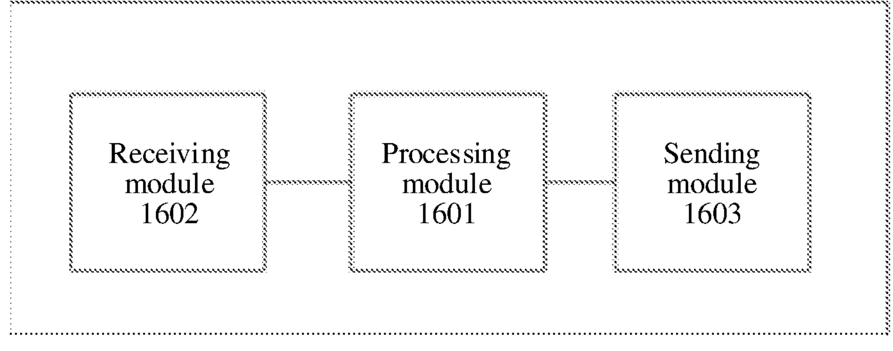
FIG. 20 is a schematic diagram of a communication apparatus according to an embodiment of this application.

FIG. 20 is a schematic diagram of a communication apparatus according to an embodiment of this application.

The communication apparatus includes a processing module 1601, a receiving module 1602, and a sending module 1603. The processing module 1601 is configured to implement data processing by the communication apparatus. The receiving module 1602 is configured to receive content between the communication apparatus and another unit or network element, and the sending module 1603 is configured to send the content between the communication apparatus and the another unit or network element. It should be understood that the processing module 1601 in this embodiment of this application may be implemented by a processor or a processor-related circuit component (or referred to as a processing circuit), and the receiving module 1602 may be implemented by a receiver or a receiver-related circuit component. The sending module 1603 may be implemented by a transmitter or a transmitter-related circuit component.

For example, the communication apparatus may be a communication apparatus device, or may be a chip applied to the communication apparatus device, or another combined device or component that has a function of the communication apparatus device.

For example, the communication apparatus may be the middleware or the first network element in any one of FIG. 10 to FIG. 15, may be the RAN or the access network device in any one of FIG. 10 to FIG. 15, may be the SMF in FIG. 11A and FIG. 11B or FIG. 12, or may be the PCF in FIG. 11A and FIG. 11B or FIG. 13.

When the communication apparatus is the middleware the first network element, the processing module 1601 is configured to obtain charging information by using type information and identification information that are received by the receiving module 1602 (for example, step S1006 in FIG. 10, step S1113 in FIG. 11A, step S1207 in FIG. 12, step S1307 in FIG. 13, and step S1401 in FIG. 14), where the charging information includes the type information and first quantity information, the type information indicates a type of a first operation, and the first quantity information indicates a first quantity of one or more terminals on which the first operation is performed. The sending module 1603 is configured to send the charging information (for example, step S1007 in FIG. 10, step S1114 in FIG. 11B, step S1208 in FIG. 12, step S1308 in FIG. 13, and step S1402 in FIG. 14).

When the communication apparatus is the first network element, the processing module 1601 is configured to receive, by using the receiving module 1602, charging information that includes/indicates one or more of identification information of a terminal on which a first operation is performed, quantity information of the one or more terminals on which the first operation is performed, operation type information corresponding to the first operation, an accumulated quantity of operation times, an accumulated quantity of operation times that corresponds to the first operation, an operation performing frequency, a frequency for performing the first operation, an amount of signaling exchanged in a process of performing the first operation, and an operation requester that performs the first operation (for example, step S1705 and step S1708 in FIG. 17, step S1804, step S1807, and step S1810 in FIG. 18B, and step S1904, step S1907, and step S1910 in FIG. 19B). The sending module 1603 is configured to send the charging information (for example, step S1706 and step S1709 in FIG. 17, step S1805, step S1808, and step S1811 in FIG. 18B, and step S1905, step S1908, and step S1911 in FIG. 19B).

In addition, the foregoing modules may be further configured to support another process of the technology described in this specification. For beneficial effects, refer to the foregoing descriptions. Details are not described herein again.

When the communication apparatus is the RAN or the access network device, the processing module 1601 is configured to obtain, by using type information and identification information that are received by the receiving module 1602, the type information and the identification information (for example, step S1004 in FIG. 10, step S1111 in FIG. 11A, step S1205 in FIG. 12, step S1305 in FIG. 13, and step S1501 in FIG. 15), where the type information indicates a type of a first operation, and the identification information identifies an identifier of one or more terminals on which the first operation is performed. The sending module 1603 is configured to send a first message to the first network element based on the type information and the identification information (for example, step S1005 in FIG. 10, step S1112 in FIG. 11A, step S1206 in FIG. 12, step S1306 in FIG. 13, and step S1502 in FIG. 15).

In addition, the foregoing modules may be further configured to support another process of the technology described in this specification. For beneficial effects, refer to the foregoing descriptions. Details are not described herein again.

When the communication apparatus is the PCF, the receiving module 1602 is configured to receive a PCC rule request message from the SMF (for example, step S1104 in FIG. 11A). The sending module 1603 is configured to deliver, to the SMF, a PCC rule related to a first operation (for example, step S1105 in FIG. 11A). In addition, the foregoing modules may be further configured to support another process of the technology described in this specification. For beneficial effects, refer to the foregoing descriptions. Details are not described herein again.

When the communication apparatus is the SMF, the receiving module 1602 is configured to receive a PCC rule from the PCF (for example, step S1105 in FIG. 11A). The sending module 1603 is configured to send a URR to a UPF according to the PCC rule (for example, step S1106 in FIG. 11A). In addition, the foregoing modules may be further configured to support another process of the technology described in this specification. For beneficial effects, refer to the foregoing descriptions. Details are not described herein again.

Figure 21:
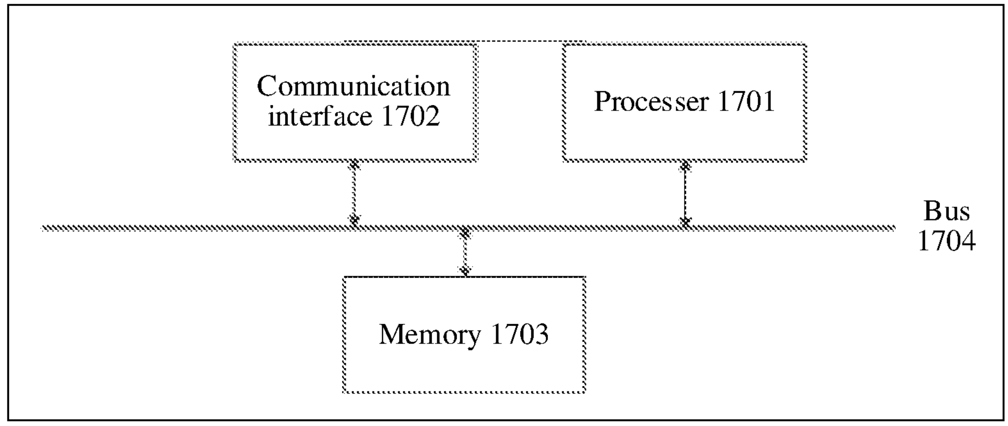
FIG. 21 is a schematic diagram of another communication apparatus according to an embodiment of this application.

FIG. 21 is a schematic diagram of another communication apparatus according to an embodiment of this application. The communication apparatus includes: a processor 1701, a communication interface 1702, and a memory 1703. The processor 1701, the communication interface 1702, and the memory 1703 may be connected to each other by using a bus 1704. The bus 1704 may be a peripheral component interconnect (PCI) bus, an extended industry standard architecture (EISA) bus, or the like. The bus 1704 may be classified into an address bus, a data bus, a control bus, and the like. For ease of representation, only one line is used for representation in FIG. 21, but this does not mean that there is only one bus or only one type of bus. The processor 1701 may be a central processing unit (CPU), a network processor (NP), or a combination of the CPU and the NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The memory 1703 may be a volatile memory or a nonvolatile memory, or may include both the volatile memory and the nonvolatile memory. The nonvolatile memory may be a read-only memory (ROM), a programmable read-only memory (PROM), an erasable programmable read-only memory (EPROM), an electrically erasable programmable read-only memory (electrically EPROM, EEPROM), or a flash memory. The volatile memory may be a random access memory (RAM) that is used as an external cache.

For example, the communication apparatus may be the middleware or the first network element in any one of FIG. 10 to FIG. 15, may be the RAN or the access network device in any one of FIG. 10 to FIG. 15, may be the SMF in FIG. 11A and FIG. 11B or FIG. 12, or may be the PCF in FIG. 11A and FIG. 11B or FIG. 13.

The processor 1701 is configured to implement a data processing operation of the communication apparatus, and the communication interface 1702 is configured to implement a receiving operation and a sending operation of the communication apparatus.

When the communication apparatus is the middleware or the first network element, the processor 1701 is configured to obtain charging information (for example, step S1006 in FIG. 10, step S1113 in FIG. 11A, step S1207 in FIG. 12, step S1307 in FIG. 13, and step S1401 in FIG. 14), where the charging information includes type information and first quantity information, the type information indicates a type of a first operation, and the first quantity information indicates a first quantity of one or more terminals on which the first operation is performed. The communication interface 1702 is configured to send the charging information (for example, step S1007 in FIG. 10, step S1114 in FIG. 11B, step S1208 in FIG. 12, step S1308 in FIG. 13, and step S1402 in FIG. 14). In addition, the foregoing modules may be further configured to support another process of the technology described in this specification. For beneficial effects, refer to the foregoing descriptions. Details are not described herein again.

When the communication apparatus is the RAN or the access network device, the processor 1701 is configured to obtain type information and identification information (for example, step S1004 in FIG. 10, step S1111 in FIG. 11A, step S1205 in FIG. 12, step S1305 in FIG. 13, and step S1501 in FIG. 15), where the type information indicates a type of a first operation, and the identification information identifies an identifier of one or more terminals on which the first operation is performed. The communication interface 1702 is configured to send a first message to the first network element based on the type information and the identification information (for example, step S1005 in FIG. 10, step S1112 in FIG. 11A, step S1206 in FIG. 12, step S1306 in FIG. 13, and step S1502 in FIG. 15).

In addition, the foregoing modules may be further configured to support another process of the technology described in this specification. For beneficial effects, refer to the foregoing descriptions. Details are not described herein again.

When the communication apparatus is the PCF, the communication interface 1702 is configured to receive a PCC rule request message from the SMF (for example, step S1104 in FIG. 11A). The communication interface 1702 is configured to deliver, to the SMF, a PCC rule related to a first operation (for example, step S1105 in FIG. 11A). In addition, the foregoing modules may be further configured to support another process of the technology described in this specification. For beneficial effects, refer to the foregoing descriptions. Details are not described herein again.

When the communication apparatus is the SMF, the communication interface 1702 is configured to receive a PCC rule from the PCF (for example, step S1105 in FIG. 11A). The communication interface 1702 is configured to send a URR to a UPF according to the PCC rule (for example, step S1106 in FIG. 11A). In addition, the foregoing modules may be further configured to support another process of the technology described in this specification. For beneficial effects, refer to the foregoing descriptions. Details are not described herein again.

An embodiment of this application provides a communication system, including the foregoing first network element (for example, the middleware) and access network device (for example, the RAN). The first network element performs the method performed by the middleware in any one of embodiments shown in FIG. 10, FIG. 12, and FIG. 15, and the access network device performs the method performed by the RAN in any one of embodiments shown in FIG. 10 and FIG. 12 to FIG. 15.

An embodiment of this application further provides a communication system, including the foregoing PCF and SMF. The PCF performs the method performed by the PCF in the embodiment shown in FIG. 11A and FIG. 11B, and the SMF performs the method performed by the SMF in the embodiment shown in FIG. 11A and FIG. 11B.

An embodiment of this application further provides a computer-readable storage medium. The computer-readable storage medium stores a computer program. When the computer program is executed by a computer, the computer can implement a procedure related to the middleware or the first network element in any one of embodiments shown in FIG. 10 to FIG. 15 provided in the foregoing method embodiments, the computer can implement a procedure related to the RAN or the access network device in any one of embodiments shown in FIG. 10 to FIG. 15 provided in the foregoing method embodiments, the computer can implement a procedure related to the SMF in the embodiment shown in FIG. 11A and FIG. 11B or FIG. 12 provided in the foregoing method embodiments, or the computer can implement a procedure related to the PCF in the embodiment shown in FIG. 11A and FIG. 11B or FIG. 13 provided in the foregoing method embodiments.

An embodiment of this application further provides a computer program product. The computer program product is configured to store a computer program. When the computer program is executed by a computer, the computer can implement a procedure related to the middleware or the first network element in any one of embodiments shown in FIG. 10 to FIG. 15 provided in the foregoing method embodiments, the computer can implement a procedure related to the RAN or the access network device in any one of embodiments shown in FIG. 10 to FIG. 15 provided in the foregoing method embodiments, the computer can implement a procedure related to the SMF in the embodiment shown in FIG. 11A and FIG. 11B or FIG. 12 provided in the foregoing method embodiments, or the computer can implement a procedure related to the PCF in the embodiment shown in FIG. 11A and FIG. 11B or FIG. 13 provided in the foregoing method embodiments.

This application further provides a chip, including a processor. The processor is configured to read and run a computer program stored in a memory, to perform a corresponding operation and/or procedure in the middleware, the RAN, the SMF, or the PCF in the charging method provided in this application. Optionally, the chip further includes the memory, the memory and the processor are connected to the memory by using a circuit or an electric wire, and the processor is configured to read and execute the computer program in the memory. Further, optionally, the chip further includes a communication interface, and the processor is connected to the communication interface. The communication interface is configured to receive data and/or information to be processed, and the processor obtains the data and/or information from the communication interface and processes the data and/or information. The communication interface may be an input/output interface, an interface circuit, an output circuit, an input circuit, a pin, a related circuit, or the like on the chip. The processor may also be embodied as a processing circuit or a logic circuit.

The chip may alternatively be replaced with a chip system, and details are not described herein again.

The terms "include", "have", and any variation thereof in this application are intended to cover non-exclusive inclusions. For example, a process, method, system, product, or device that includes a series of steps or units is not necessarily limited to those steps or units that are clearly listed, but may include other steps or units that are not explicitly listed or are inherent to such a process, method, product, or device.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, division into the units is merely logical function division or may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual conditions to achieve the objectives of the solutions in embodiments.

In addition, functional units in embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

In addition, the terms "first", "second", and the like in the specification, claims, and accompanying drawings of this application are intended to distinguish between different objects, but are not intended to describe a specific order. In addition, the terms such as "include" and "have" and any other variants thereof are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device.

Although this application has been described with reference to specific features and embodiments thereof, it is clear that various modifications and combinations may be made to this application without departing from the spirit and scope of this application. Correspondingly, the specification and the accompanying drawings are merely example descriptions of this application defined by the appended claims, and are deemed to have covered any and all modifications, variations, combinations, or equivalents that fall within the scope of this application. It is clearly that a person skilled in the art can make various modifications and variations to this application without departing from the spirit and scope of this application. This application is intended to cover these modifications and variations of this application provided that they fall within the scope of protection defined by the claims of this application and their equivalent technologies.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:

receiving, by a first device, charging related information of at least one second device from the at least one second device;

obtaining, by the first device, charging information based on the charging related information of the at least one second device, wherein the charging information indicates identification information of one or more terminals on which a first operation is performed, quantity information of the one or more terminals on which the first operation is performed, operation type information corresponding to the first operation, an accumulated quantity of operation times that corresponds to the first operation, an operation performing frequency, a frequency for performing the first operation, an amount of signaling exchanged in a process of performing the first operation, and an operation requester that performs the first operation; and sending, by the first device, the charging information; and wherein determining, by the first device, the charging information based on the charging related information of the at least one second device comprises:

de-duplicating, by the first device, identification information or quantity information of terminals on which the first operation is repeatedly performed in the charging related information of the at least one second device, to obtain de-duplicated charging related information of the at least one second device, and using the de-duplicated charging related information of the at least one second device as the charging information.

2. The method according to claim 1, wherein obtaining, by the first device, the charging information based on the charging related information of the at least one second device comprises:

obtaining, by the first device, the charging information according to a charging rule.

3. The method according to claim 2, wherein the charging rule indicates to obtain the charging information based on the charging related information of the at least one second device; or the charging rule indicates to obtain one or more of the following information based on the charging related information of the at least one second device:

the identification information of the one or more terminals on which the first operation is performed, the quantity information of the one or more terminals on which the first operation is performed, the accumulated quantity of operation times that corresponds to the first operation, information about the operation requester, the operation type information, the amount of signaling exchanged in the operation process, the operation performing frequency, the frequency for performing the first operation, and a time of obtaining the charging information.

4. The method according to claim 1, wherein:

the identification information of the one or more terminals on which the first operation is performed comprises identification information of terminals that are not de-duplicated; and the quantity information of the one or more terminals on which the first operation is performed comprises quantity information of terminals that are not de-duplicated.

5. The method according to claim 1, wherein the charging related information of the at least one second device is obtained according to a charging rule or is obtained based on charging related information received by the at least one second device from at least one third device.

6. The method according to claim 5, wherein the third device is a tag reader.

7. The method according to claim 1, wherein the second device comprises a tag reader.

8. The method according to claim 1, wherein the first device supports a charging trigger function, and sending, by the first device, the charging information comprises:

sending, by the first device, the charging information to a charging function device.

9. The method according to claim 1, wherein sending, by the first device, the charging information comprises:

sending, by the first device, the charging information to a charging function device by using a device supporting a charging trigger function, wherein the device supporting the charging trigger function comprises an access network device, a control plane device, or a user plane device.

10. The method according to claim 9, wherein the first device is a tag reader, a mobility management device, a user plane device, or a session management device.

11. The method according to claim 1, wherein the second device comprises a user plane device.

12. A communication apparatus, comprising:

at least one processor, wherein the at least one processor is configured to read instructions from at least one memory and run the instructions, and running the instructions causes the at least one processor to:

receive charging related information of at least one second device from the at least one second device;

obtain charging information based on the charging related information of the at least one second device, wherein the charging information indicates identification information of one or more terminals on which a first operation is performed, quantity information of the one or more terminals on which the first operation is performed, operation type information corresponding to the first operation, an accumulated quantity of operation times that corresponds to the first operation, an operation performing frequency, a frequency for performing the first operation, an amount of signaling exchanged in a process of performing the first operation, and an operation requester that performs the first operation; and send the charging information; and wherein determining the charging information based on the charging related information of the at least one second device comprises:

de-duplicating identification information or quantity information of terminals on which the first operation is repeatedly performed in the charging related information of the at least one second device, to obtain de-duplicated charging related information of the at least one second device, and using the de-duplicated charging related information of the at least one second device as the charging information.

13. The communication apparatus according to claim 12, wherein obtaining the charging information based on the charging related information of the at least one second device comprises:

obtaining the charging information based on the charging related information of the at least one second device according to a charging rule.

14. The communication apparatus according to claim 13, wherein:

the charging rule indicates to obtain the charging information based on the charging related information of the at least one second device; or the charging rule indicates to obtain one or more of the following information based on the charging related information of the at least one second device:

the identification information of the one or more terminals on which the first operation is performed, the quantity information of the one or more terminals on which the first operation is performed, the accumulated quantity of operation times that corresponds to the first operation, information about the operation requester, the operation type information, the amount of signaling exchanged in the operation process, the operation performing frequency, the frequency for performing the first operation, and a time of obtaining the charging information.

15. The communication apparatus according to claim 12, wherein:

the identification information of the one or more terminals on which the first operation is performed comprises identification information of terminals that are not de-duplicated; and the quantity information of the one or more terminals on which the first operation is performed comprises quantity information of terminals that are not de-duplicated.

16. The communication apparatus according to claim 12, wherein the charging related information of the at least one second device is obtained according to a charging rule.

17. The communication apparatus according to claim 12, wherein:

the communication apparatus supports a charging trigger function, and sending the charging information comprises sending the charging information to a charging function device.

18. The communication apparatus according to claim 12, wherein the charging related information of the at least one second device is obtained based on charging related information received by the at least one second device from at least one third device.

19. The communication apparatus according to claim 12, wherein:

the communication apparatus is a tag reader or a mobility management device.

20. The communication apparatus according to claim 12, wherein:

the communication apparatus is a user plane device, or a session management device.

* * * * *